(12) United States Patent
Tani et al.

(10) Patent No.: US 9,599,181 B2
(45) Date of Patent: Mar. 21, 2017

(54) SHOCK ABSORBER

(75) Inventors: Naoto Tani, Nagoya (JP); Masao Sodeno, Nagoya (JP); Teruo Tamada, Yamato (JP)

(73) Assignee: KYORAKU CO., LTD., Kyoto (JP)

( * ) Notice: Subject to any disclaimer, the term of this patent is extended or adjusted under 35 U.S.C. 154(b) by 382 days.

(21) Appl. No.: 14/006,487

(22) PCT Filed: Apr. 5, 2012

(86) PCT No.: PCT/JP2012/059420
§ 371 (c)(1),
(2), (4) Date: Oct. 31, 2013

(87) PCT Pub. No.: WO2012/137892
PCT Pub. Date: Oct. 11, 2012

(65) Prior Publication Data
US 2014/0048367 A1 Feb. 20, 2014

(30) Foreign Application Priority Data

Apr. 5, 2011 (JP) .................................. 2011-083970

(51) Int. Cl.
*B60R 21/04* (2006.01)
*F16F 7/12* (2006.01)
(Continued)

(52) U.S. Cl.
CPC ............... *F16F 7/12* (2013.01); *B60J 5/0451* (2013.01); *B60R 21/04* (2013.01); *B60R 21/34* (2013.01);
(Continued)

(58) Field of Classification Search
CPC .. F16F 7/003; F16F 7/12; B60R 21/04; B60R 21/045; B60R 21/34;
(Continued)

(56) References Cited

U.S. PATENT DOCUMENTS 3,606,434 A * 9/1971 Barton .................... B60R 19/44
  293/143
6,565,116 B1 * 5/2003 Tajima ................ B60R 13/0206
  24/297

(Continued)

FOREIGN PATENT DOCUMENTS

JP  4-15523  2/1992
JP  8-11539  1/1996

(Continued)

OTHER PUBLICATIONS

International Search Report, mail date is Jun. 12, 2012.
Japan Official Action in Application No. 2013-508936 and English translation thereof, dated May 24, 2016.

*Primary Examiner* — Bradley King
(74) *Attorney, Agent, or Firm* — Greenblum & Bernstein, P.L.C.

(57) ABSTRACT

A shock absorber which can be easily attached and which can reduce the installation space is provided. The shock absorber in accordance with the present invention is characterized by including a front wall to receive shock, a rear wall opposing the front wall, and peripheral walls connecting peripheries of the front wall and the rear wall, and at least one attaching section to attach onto an attaching object is formed to be integral with the rear wall, and shock received by the front wall is propagated via the rear wall to the attaching object.

9 Claims, 52 Drawing Sheets

(51) Int. Cl.
  *B60J 5/04* (2006.01)
  *B60R 21/34* (2011.01)
  *B60R 21/00* (2006.01)
  *B60R 19/18* (2006.01)

(52) U.S. Cl.
  CPC ....... *B60R 19/18* (2013.01); *B60R 2021/0051* (2013.01); *B60R 2021/343* (2013.01)

(58) Field of Classification Search
  CPC ...... B60R 2021/0051; B60R 2021/343; B60R 19/18; B60J 5/0541
  See application file for complete search history.

(56) References Cited

U.S. PATENT DOCUMENTS

| | | | | |
|---|---|---|---|---|
| 8,408,613 B1* | 4/2013 | Tanton | ............... | B60R 19/18 293/109 |
| 2004/0124572 A1* | 7/2004 | Tamada | ............... | B60R 19/18 267/136 |
| 2007/0210615 A1* | 9/2007 | Tamada | ............... | B60R 19/18 296/187.03 |
| 2008/0036242 A1* | 2/2008 | Glance | ............... | B60R 13/0225 296/187.09 |
| 2008/0054614 A1* | 3/2008 | Drascher | ............... | B60R 21/045 280/752 |
| 2008/0185851 A1* | 8/2008 | Evans | ............... | B60R 19/18 293/120 |
| 2009/0230589 A1* | 9/2009 | Rossi | ............... | B29C 43/42 264/292 |
| 2011/0080012 A1* | 4/2011 | Ruder | ............... | B60R 19/18 293/142 |
| 2012/0153644 A1* | 6/2012 | Bobba | ............... | B60R 19/18 293/120 |
| 2015/0061322 A1* | 3/2015 | Tamada | ............... | B60R 19/18 296/187.05 |

FOREIGN PATENT DOCUMENTS

| | | |
|---|---|---|
| JP | 2002-522286 | 7/2002 |
| JP | 2004-231143 | 8/2004 |
| JP | 2005-161882 | 6/2005 |
| JP | 2006-130936 | 5/2006 |
| JP | 2008-030629 | 7/2006 |
| JP | 2008-120110 | 5/2008 |
| JP | 2008-213577 | 9/2008 |
| JP | 2011-230603 | 11/2011 |
| WO | 2006/127644 | 11/2006 |
| WO | 2011/109351 | 9/2011 |

* cited by examiner (a)

(b)

(a)

(b)

(a)

(b)

SHOCK ABSORBER

TECHNICAL FIELD

The present invention relates to a shock absorber, and in particular, to a shock absorber suitable for a knee bolster, a bumper absorber, and the like.

BACKGROUND ART

In vehicles such as a car, shock absorbers to absorb shock are installed in installation spaces between interior parts highly probable to make contact with a person in the car at occurrence of an accident of collision and body constituent parts such as various panels configuring part of the body located on the opposing side (rear side) of the compartment side for the interior parts. Due to the shock absorbers, when the person in the car makes contact with interior parts at occurrence of an accident of collision or the like, shock applied onto the person is mitigated, to thereby protect the person. As a shock absorber of this kind, a knee bolster can be considered.

Further, recently, there has been designed a bumper configuration which is capable of reducing, at an accident resulting in injury or death, the load imposed onto the legs of a pedestrian, to mitigate the value of damages of the pedestrian; as a shock absorber employed in the bumper configuration, a bumper absorber can be mentioned. The bumper absorber is ordinarily installed in the installation space between a bumper fascia and a bumper reinforce.

For example, in patent document 1 (Published Patent Publication No. 2002-522286) as a patent document filed before the present invention, an expandable knee bolster is disclosed.

Further, in patent document 2 (Japanese Patent Laid-Open Pub. No. 2006-130936), a shock absorber suitable for a door, a roof, a hood, and the like of a car is disclosed.

Moreover, in patent document 3 (Japanese Patent Laid-Open Pub. No. 2008-213577), there is disclosed a bumper absorber to be allocated in a bumper system of a car.

PRIOR ART REFERENCE

Patent Document

Patent Document 1: Published Patent Publication No. 2002-522286
Patent Document 2: Japanese Patent Laid-Open Pub. No. 2006-130936
Patent Document 3: Japanese Patent Laid-Open Pub. No. 2008-213577

SUMMARY OF THE INVENTION

Problems to be Solved by the Invention

Incidentally, most shock absorbers described above are designed in shapes corresponding to installation spaces and are installed in the installation spaces. Also, ordinarily, to secure attachment onto an attaching object, the shock absorber described above includes an attaching flange and the attaching flange is fixed onto the attaching object by use of attaching tools such as bolts, screws, vis, and the like.

Hence, the attaching operation of the shock absorber is complicated in the present situation. Further, since the configuration includes the attaching flange, the installation space is excessively required; hence, the installation space of the shock absorber is not efficiently utilized in the present situation.

The present invention has been made in consideration of the situation above and aims at providing a shock absorber which can be easily attached and which can reduce the installation space.

Means for Solving to the Problems

To achieve the object, the present invention has the following aspects.

A shock absorber in accordance with the present invention is characterized by including:
a front wall to receive shock;
a rear wall opposing the front wall; and
peripheral walls connecting peripheries of the front wall and the rear wall to each other, wherein
at least one attaching section to attach onto an attaching object is formed to be integral with the rear wall, and
shock received by the front wall is propagated via the rear wall to the attaching object.

Advantageous Effects of the Invention

In accordance with the present invention, it can be easily attached and the installation space can be reduced.

DESCRIPTION OF THE EMBODIMENTS (Outline of the Shock Absorber 10 of the Present Embodying Mode)

Figure 2:
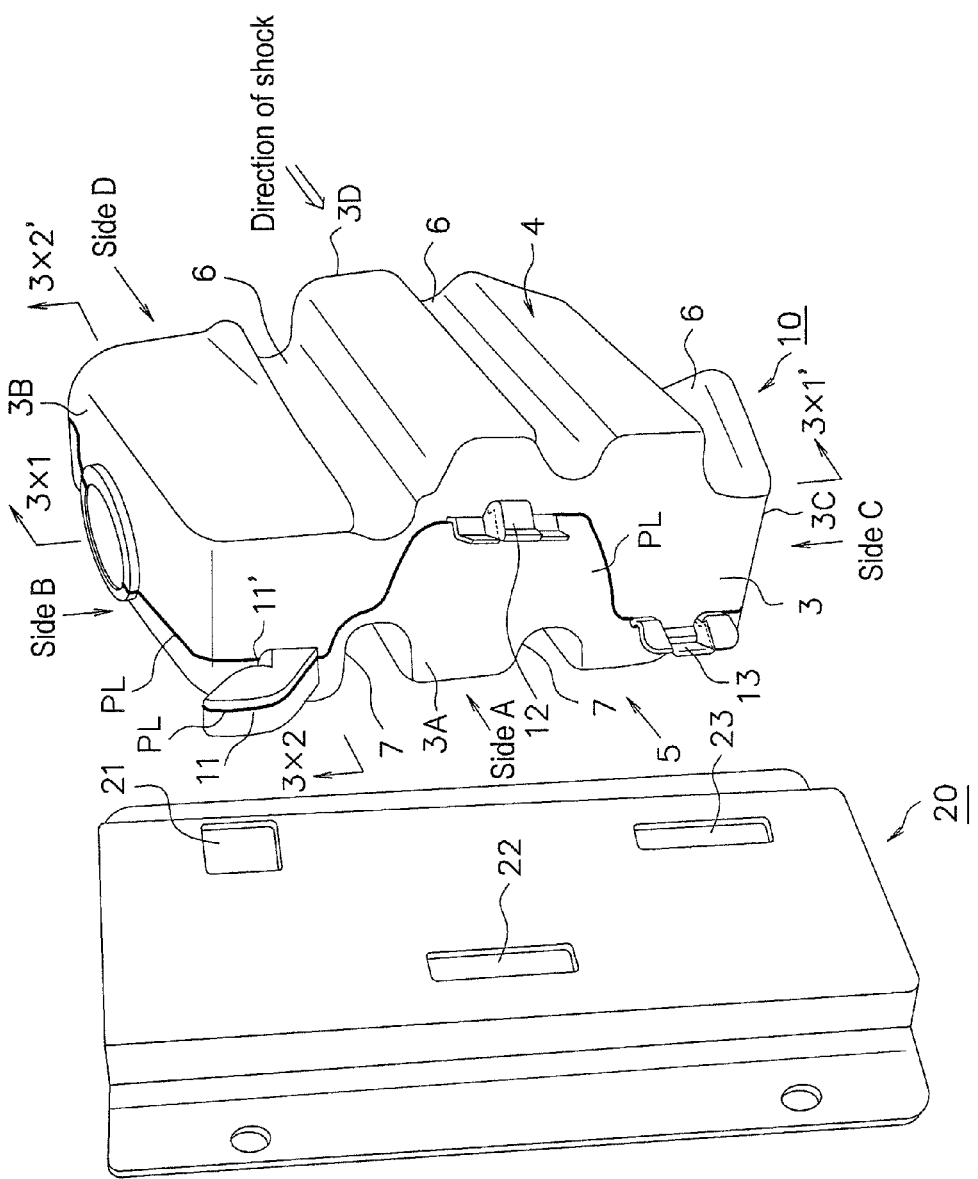
FIG. 2 is a diagram showing an overall configuration example of a shock absorber 10 in a first embodying mode and an attaching object 20 onto which the shock absorber 10 is attached.

First, by referring to FIG. 2, description will be given of an outline of the shock absorber 10 of the present embodying mode. FIG. 2 shows an overall configuration example of the shock absorber 10 of the present embodying mode.

The shock absorber 10 of the present embodying mode is characterized by including a front wall 3D to receive shock, a rear wall 3A opposing the front wall 3D, and peripheral walls (corresponding to an upper wall 3B, a first sidewall 4, a lower wall 3C, and a second sidewall 5) which connect the peripheries of the front wall 3D and the rear wall 3A to each other, and at least one attaching section (corresponding to attaching pawls 11 to 13) to attach onto the attaching object 20 is formed to be integral with the rear wall 3A, and shock received by the front wall 3D is propagated via the rear wall 3A to the attaching object 20.

The shock absorber 10 of the present embodying mode can be, since the attaching sections 11 to 13 are formed to be integral with the rear wall 3A, easily attached and the installation space can be reduced. Next, by referring to the accompanying drawings, description will be given in detail of the shock absorber 10 of the present embodying mode.

First Embodying Mode Example

<Attaching Example of Shock Absorber 10>

Figure 1:
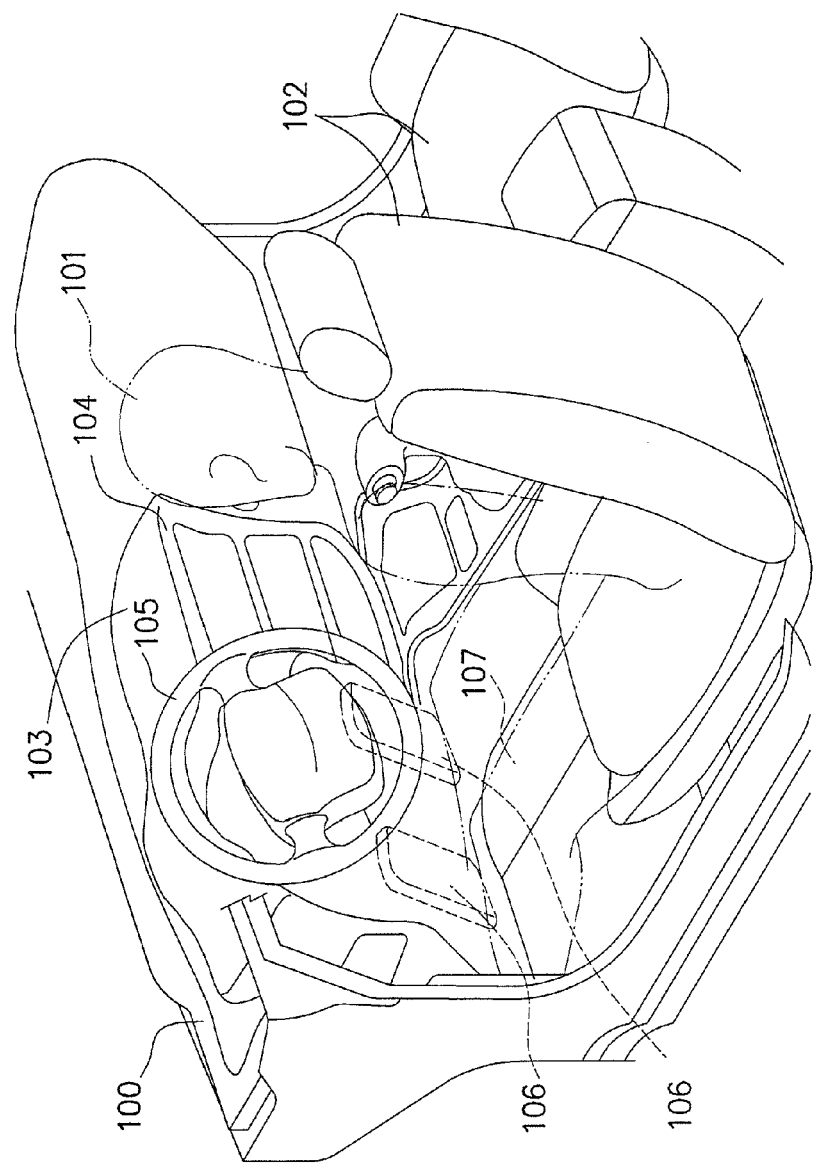
FIG. 1 is a diagram showing a state in which a shock absorber 10 of the present embodying mode is installed as a knee bolster 106 in a car 100.

First, by referring to FIG. 1, description will be given of an attaching example of the shock absorber 10 of the present embodying mode. FIG. 1 shows a state in which the shock absorber 10 shown in FIGS. 2 to 10 is installed as a shock absorber of a knee bolster 106 in a car 100.

The car 100 shown in FIG. 1 includes a compartment 103 having a front seat 102 for a car user including a driver 101, and a meter 104 is placed on a side surface of a steering wheel 105. The steering wheel 105 is coupled with a steering column, not shown, and a steering support member to support the steering column is supported by an inner wall surface of the car body to be installed in a car-width direction. The shock absorber 10 of the present embodying mode (reference is to be made to FIGS. 2 to 10) is attached on both sides of the steering column as a knee bolster 106 on the driver's seat side to interpose the steering column therebetween. However, each space on both sides of the steering column is elongated in association with the installing spaces of other car constituting members (a meter 104, a navigator, an air-conditioner, etc.); hence, in the elongated space, the knee bolster 106 is installed to be adjacent to each knee 107 of the driver 101. As a result, when the car 100 receives shock, the knees 107 of the driver 101 make contact with the respective knee bolsters 106 and the knee bolsters 106 absorb the shock to reduce the shock applied onto the knees 107. Incidentally, FIG. 1 shows the knee bolsters 106 on the driver's seat side; however, also on the assistant driver's seat side as on the driver's seat side, the knee bolsters are installed to be adjacent to the knees of the car user sitting on the assistant driver's seat.

<Configuration Example of Shock Absorber 10>

Figure 4:
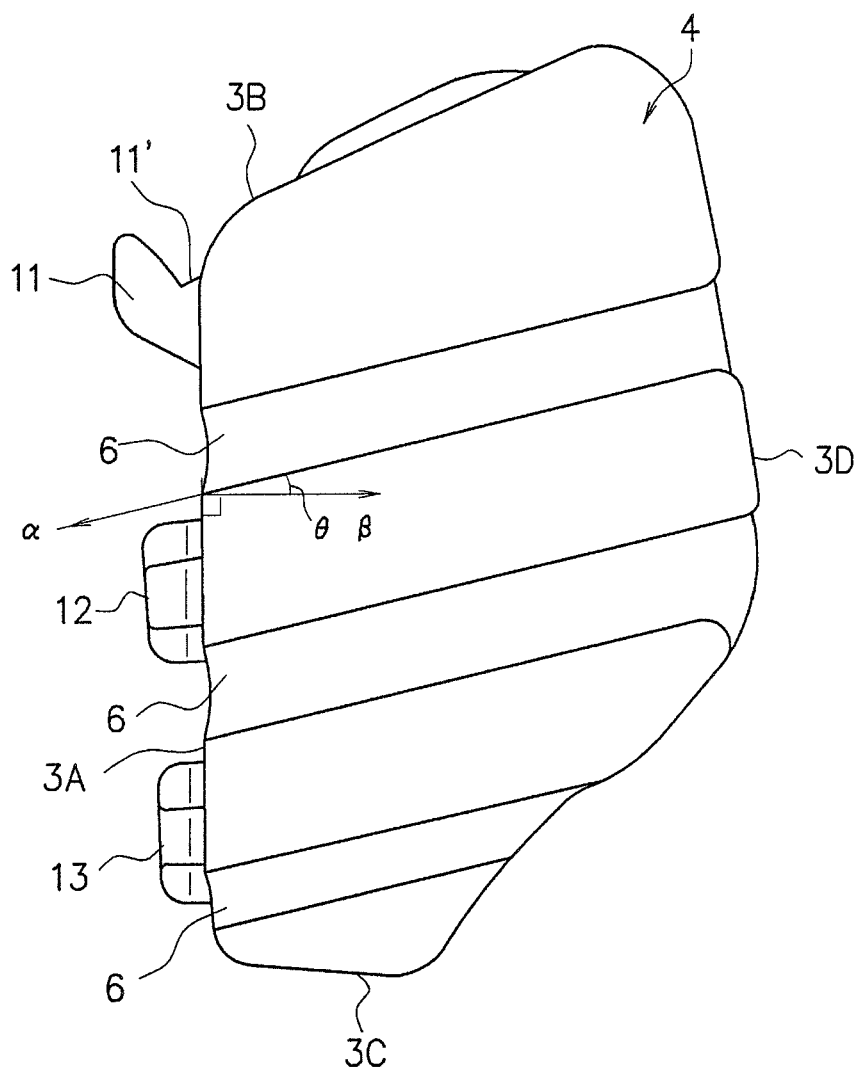
FIG. 4 is a diagram showing a configuration example, on the side of a first sidewall 4, of the shock absorber 10 shown in FIG. 2.
Figure 5:
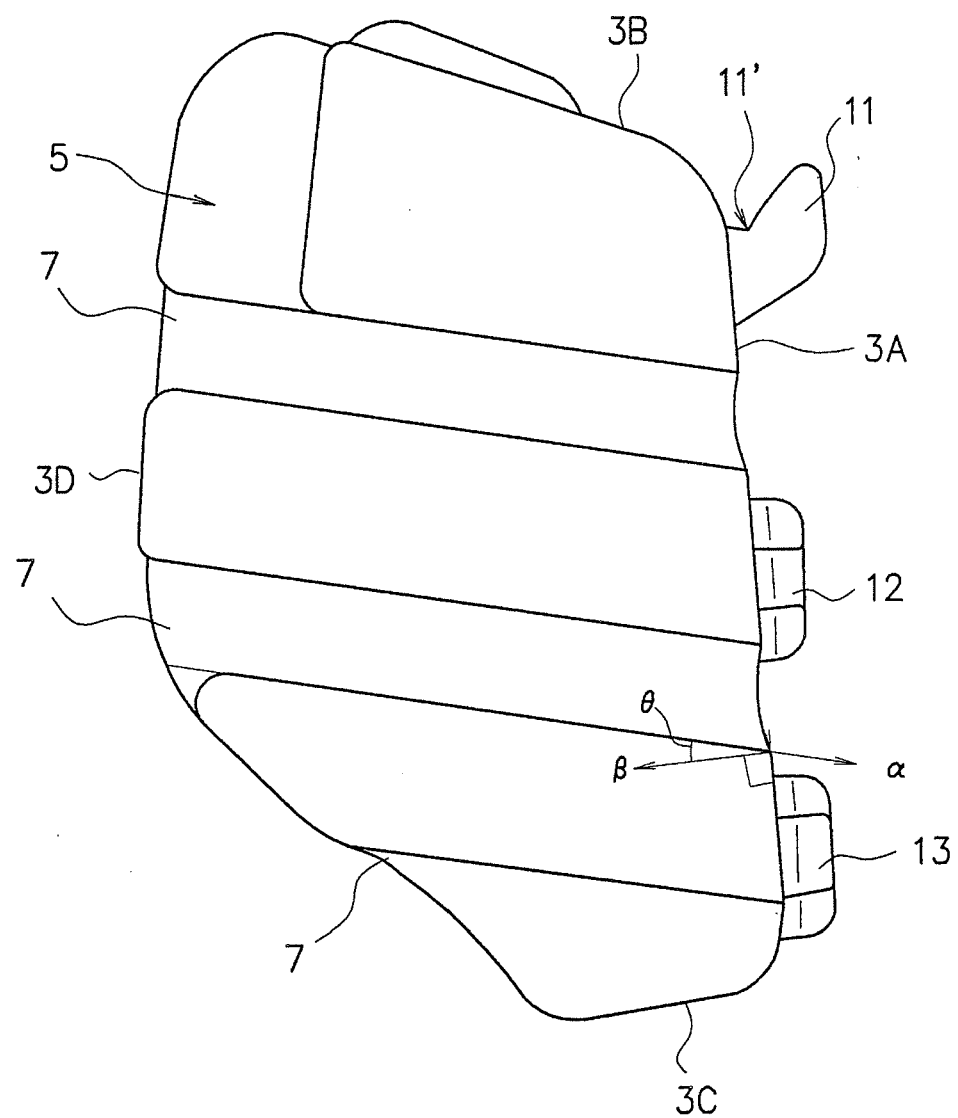
FIG. 5 is a diagram showing a configuration example, on the side of a second sidewall 5, of the shock absorber 10 shown in FIG. 2.
Figure 6:
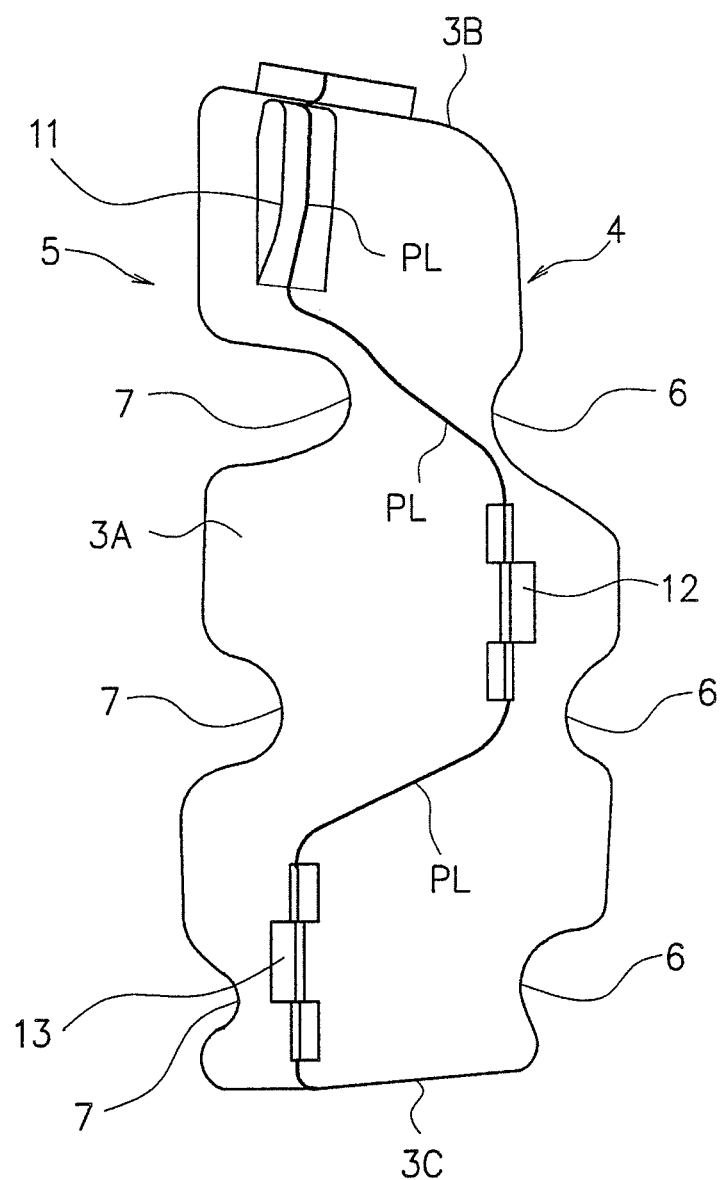
FIG. 6 is a diagram showing a configuration example, on side A (side of a rear wall 3A), of the shock absorber 10 shown in FIG. 2.
Figure 7:
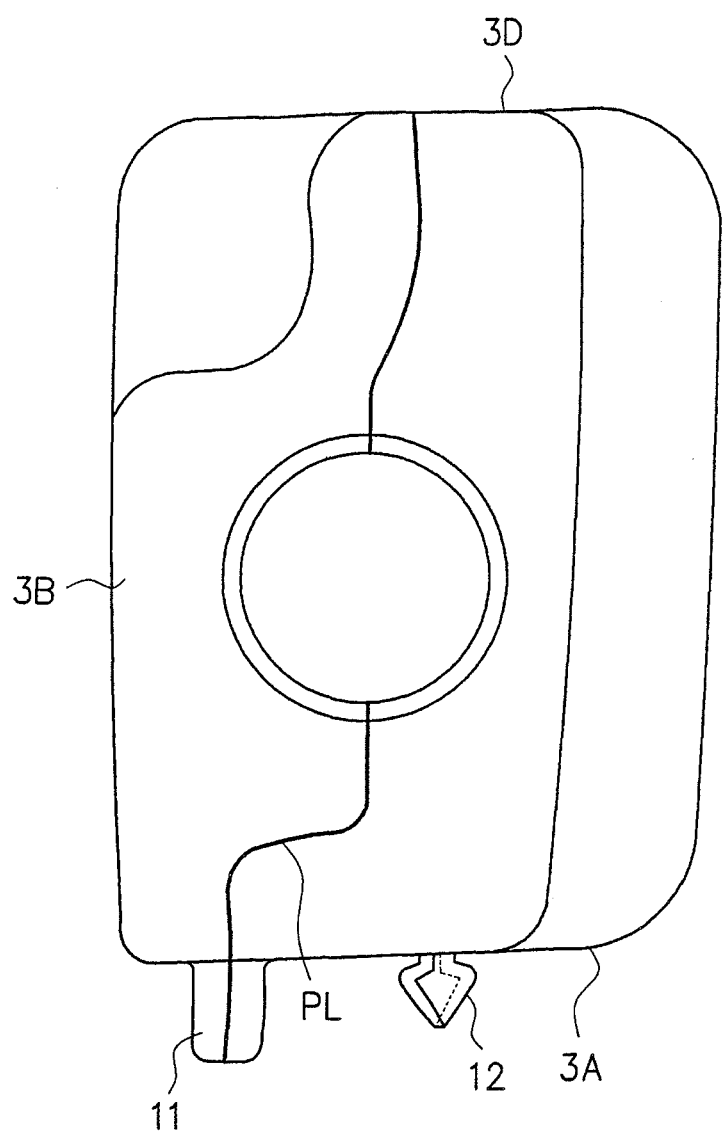
FIG. 7 is a diagram showing a configuration example, on side B (side of an upper wall 3B) of the shock absorber 10 shown in FIG. 2.
Figure 8:
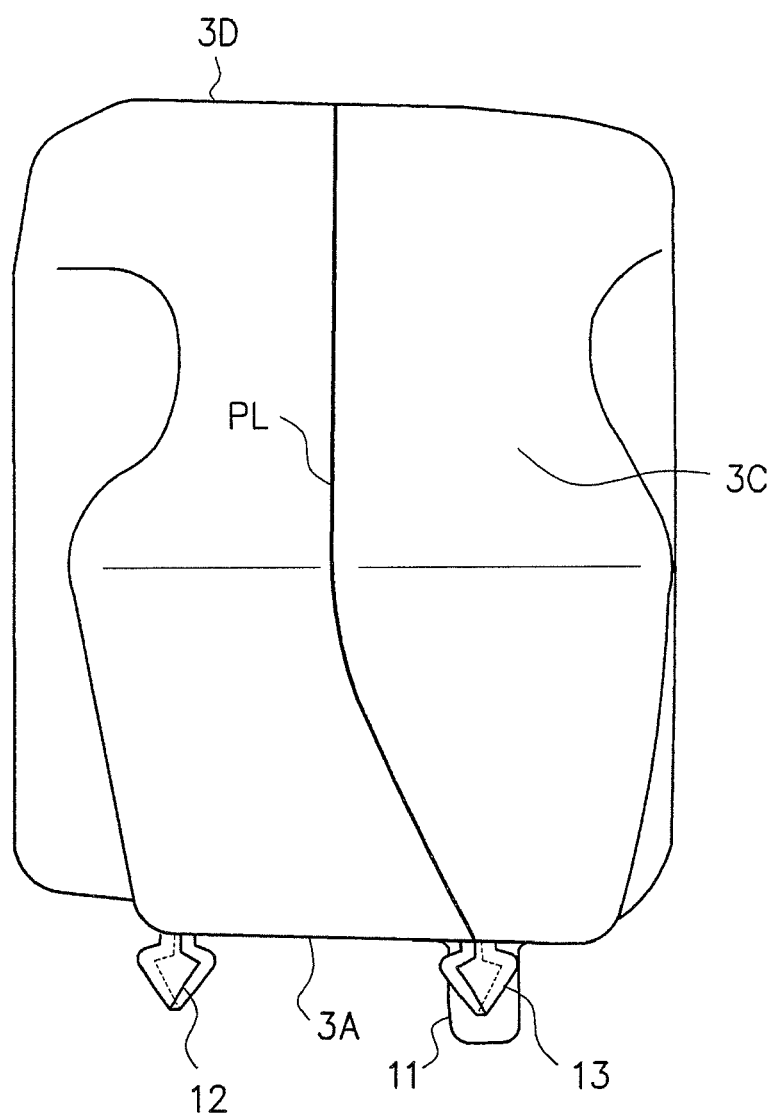
FIG. 8 is a diagram showing a configuration example, on side C (side of a lower wall 3C), of the shock absorber 10 shown in FIG. 2.
Figure 9:
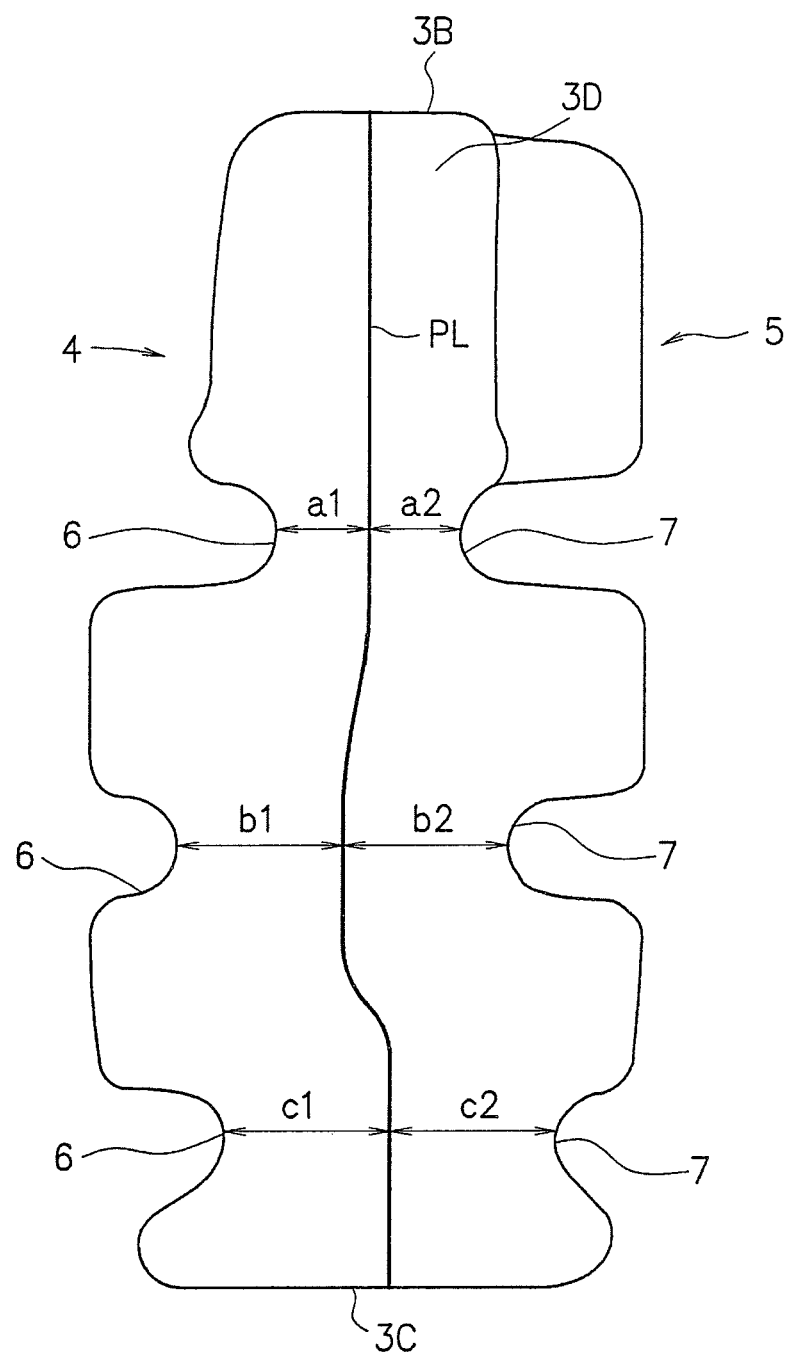
FIG. 9 is a diagram showing a configuration example, on side D (side of a front wall 3D), of the shock absorber 10 shown in FIG. 2.
Figure 10:
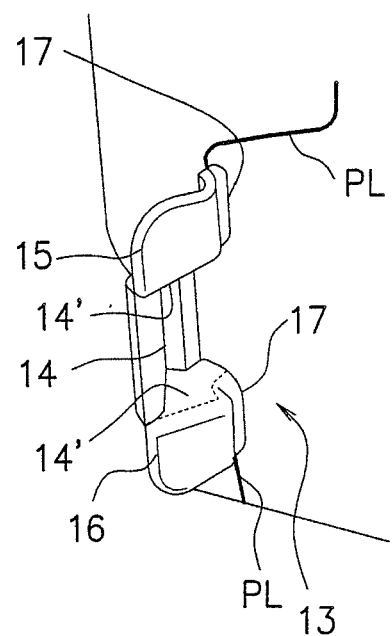
FIG. 10 is a magnified configuration example of a third attaching pawl 13 of the shock absorber 10.
Figure 10:
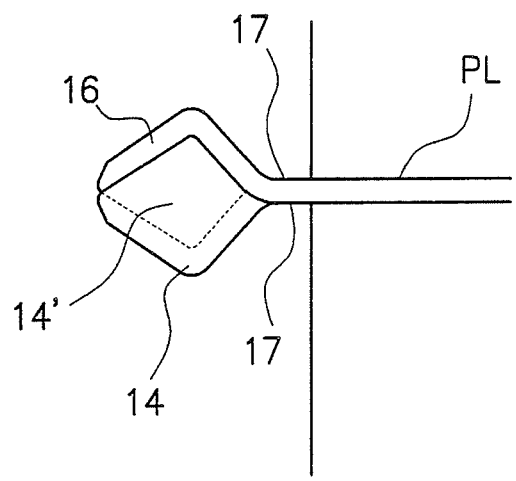

Next, referring to FIGS. 2 to 10, description will be given of a configuration example of the shock absorber 10 of the present embodying mode. FIG. 2 is a diagram showing an overall configuration example of the shock absorber 10 of the present embodying mode and the attaching object 20 onto which the shock absorber 10 is attached, FIG. 3 (a) shows a cross-sectional configuration example along line 3X1-3X1' of the shock absorber 10 shown in FIG. 2, and FIG. 3 (b) shows a cross-sectional configuration example along line 3X2-3X2' of the shock absorber 10 shown in FIG. 2. FIG. 4 shows a configuration example of the shock absorber 10 shown in FIG. 2 on the side of the first sidewall 4 and FIG. 5 shows a configuration example of the shock absorber 10 shown in FIG. 2 on the side of the second sidewall 5. FIG. 6 shows a configuration example of the shock absorber 10 shown in FIG. 2 on side A (side of the rear wall 3A) and FIG. 7 shows a configuration example of the shock absorber 10 shown in FIG. 2 on side B (side of the upper wall 3B). FIG. 8 shows a configuration example of the shock absorber 10 shown in FIG. 2 on side C (side of the lower wall 3C) and FIG. 9 shows a configuration example of the shock absorber 10 shown in FIG. 2 on side D (side of the front wall 3D). FIG. 10 shows a magnified configuration example of the third attaching pawl 13 of the shock absorber 10. Incidentally, in conjunction with the present embodying mode, description will be given of a situation in which a sheet of metal is employed as the attaching object 20. However, the attaching object 20 is not limited to the sheet of metal, but any member may be applicable.

Figure 3:
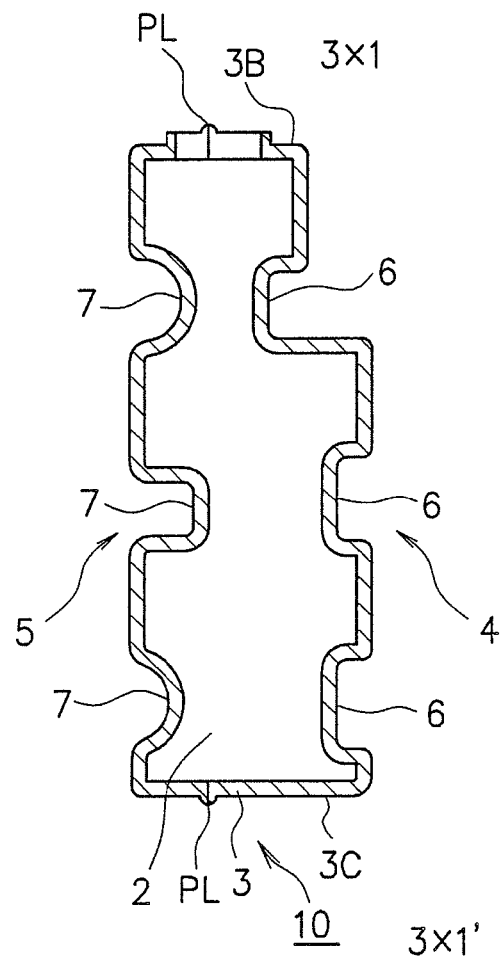
FIG. 3 is a diagram showing a cross-sectional configuration example (a) along line 3X1-3X1' and a cross-sectional configuration example (b) along line 3X2-3X2' of the shock absorber 10 shown in FIG. 2.
Figure 3:
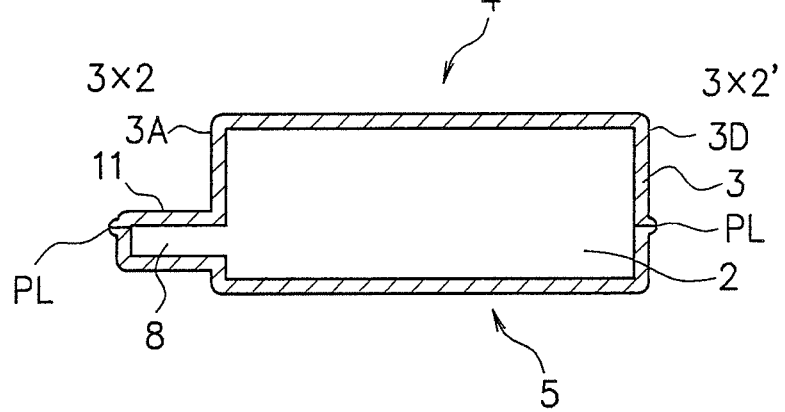

The shock absorber 10 of the present embodying mode is molded in a hollow shape by conducting blow molding on thermoplastic resin and includes, as shown in FIG. 3 (a), a plurality of groove-shaped ribs 6 and 7 formed by depressing, respectively toward the opposing sides, the first sidewall 4 and the second sidewall 5 opposing to each other of the body 3 including a hollow section 2. The groove-shaped ribs 6 and 7 formed on the first sidewall 4 and the second sidewall 5 extend, as shown in FIG. 2, from the front wall 3D to the rear wall 3A, and the extending direction is favorably equal to the direction of shock. This makes it possible to increase rigidity against shock from the shock direction.

The body 3 of the shock absorber 10 of the present embodying mode includes six walls which are the upper wall 3B, the rear wall 3A, the lower wall 3C, the front wall 3D, the first sidewall 4, and the second sidewall 5; and the upper wall 3B, the first sidewall 4, the lower wall 3C, and the second sidewall 5 configure a peripheral wall of the body 3. The shock absorber 10 of the present embodying mode is configured, as shown in FIG. 2, such that the gap between the upper wall 3B and the lower wall 3C has a longer shape than the gap between the first sidewall 4 and the second sidewall 5.

In the shock absorber 10 of the present embodying mode, the front wall 3D shown in FIG. 9 receives shock and then the shock received by the front wall 3D is propagated, via the rear wall 3A which opposes the front wall 3D and which is shown in FIG. 6, to the attaching object 20. In the shock absorber 10 of the present embodying mode, the parting line PL extends along the upper wall 3B, the front wall 3D, the lower wall 3C, and the rear wall 3A, to enhance rigidity of the shock absorber 10. This makes it possible that when the front wall 3D receives shock, the shock absorber 10 is not easily cracked.

Incidentally, when the shock absorber 10 of the present embodying mode is employed as the knee bolster 106 described above, the contour of the shock absorber 10 becomes small; hence, the position of the load point (hit point) to receive shock is easily moved in the perpendicular direction or in the horizontal direction relative to the ideal position, and the incoming angle of shock at which the shock advances toward the front wall 3D is easily shifted in the perpendicular direction or in the horizontal direction relative to the ideal incoming angle. Incidentally, the movement described above takes place more remarkably in the perpendicular direction than in the horizontal direction. In the shock absorber 10 of the present embodying mode, the parting line PL extends along the upper wall 3B, the front wall 3D, the lower wall 3C, and the rear wall 3A; hence, it is possible that even the front wall 3D receives shock in a state wherein such movement takes place, the shock absorber 10 does not easily crack.

Also, for the front wall 3D, the parting line PL extends, as shown in FIG. 9, along the upper edge (side of the upper wall 3B) and the lower edge (side of the lower wall 3C), to increase rigidity of the front wall 3D. This makes it possible that when the front wall 3D receives shock, the front wall 3D does not easily crack. Further, in the front wall 3D, the groove-shaped ribs 6 and 7 are disposed such that one and the same distance exists from the bottom sections of the groove-shaped ribs 6 and 7 to the parting line PL (a1=a2, b1=b2, c1=c2). Incidentally, the distances from the bottom sections of the groove-shaped ribs 6 and 7 to the parting line PL are the values measured in a state in which lines connecting the bottom sections of the groove-shaped ribs 6 and 7 to the parting line PL vertically intersect the parting line PL. By equalizing the distance (a1,b1,c1) from the bottom section of the groove-shaped rib 6 disposed in the first sidewall 4 to the parting line PL to the distance (a2,b2,c2) from the bottom section of the groove-shaped rib 7 disposed in the second sidewall 5 to the parting line PL, it is possible to uniformalize the rib-shaped ribs 6 and 7 in thickness. As a result, even when the position (hit point) to receive shock on the front wall 3D is moved relative to the ideal position or even when the incoming angle of shock at which the shock advances toward the front wall 3D is shifted relative to the ideal incoming angle, a desired load can be stably retained; hence, it is possible to secure a desired quantity of shock absorption. Incidentally, the contour of the parting line PL is not particularly restricted only if the parting line PL meets the conditions above and extends along the upper edge and the lower edge, and it is possible to configure it in any contour such as the contour of a straight line, the contour of a curved line, and the like.

Further, in the first sidewall 4 and the second sidewall 5 which are peripheral walls to link the peripheries of the front wall 3D and the rear wall 3A to each other, there are formed, as shown in FIGS. 4 and 5, the groove-shaped ribs 6 and 7 extending from the front wall 3D to the rear wall 3A. The groove-shaped ribs 6 and 7 are formed in the first sidewall 4 and the second sidewall 5 such that the extending direction α of the groove-shaped ribs 6 and 7 and the vertical direction β vertical to the rear wall 3A form the predetermined angle θ therebetween. Incidentally, the predetermined angle θ is an angle for which the extending direction α of the groove-shaped ribs 6 and 7 is equal to the direction of shock when the rear wall 3A is attached onto the attaching object 20. This makes it possible that when the front wall 3D receives shock, rigidity thereof against the shock is increased and the groove-shaped ribs 6 and 7 efficiently absorb the shock.

Incidentally, in the present embodying mode, as shown in FIGS. 4 and 5, the slender groove-shaped ribs 6 and 7 are successively formed in series in the extending direction α; however, the ribs are not limited to the slender groove-shaped ribs 6 and 7, but ribs of any contour may be successively formed in the extending direction α. For example, it is also possible to successively form rectangular or trapezoidal groove-shaped ribs 6 and 7 in the extending direction α. In this case, it is favorable that the groove-shaped rib 6 formed on the first sidewall 4 side is equal in the contour to the groove-shaped rib 7 formed on the second sidewall 5 side. This makes it possible that the shock is uniformly absorbed by both groove-shaped ribs 6 and 7. Further, in the present embodying mode, the slender groove-shaped ribs 6 and 7 are successively formed in the extending direction α. However, it is also possible to form, without forming the groove-shaped ribs 6 and 7 in a part of the region in the extending direction α, the groove-shaped ribs 6 and 7 in an intermittent fashion (partly) in the extending direction α. Also in this case, since the extending direction α of the groove-shaped ribs 6 and 7 is equal to the direction of shock, the shock can be efficiently absorbed by the groove-shaped ribs 6 and 7. However, as in the present embodying mode, it is favorable that the groove-shaped ribs 6 and 7 are successively formed in series in the extending direction α. This makes it possible that the groove-shaped ribs 6 and 7 successively formed in the extending direction α are inflected to be convex in the direction to approach the mutually opposing first and second sidewalls 4 and 5 or in a direction to be apart from the mutually opposing first and second sidewalls 4 and 5.

As thermoplastic resin to constitute the shock absorber 10 of the present embodying mode, known resin is applicable. The resin may include resin having high mechanical strength such as rigidity, the resin being, for example, polyolefin-based resin including polyethylene and polypropylene; styrene-based resin including polystyrene and ABS resin; polyester-based resin including polyethylene terephthalate, polyamide, and a mixture of these resins.

Also, in the range not to deteriorate mechanical strength (anti-shock property), there may be included one kind or two or more kinds of additives utilized in the relevant field, for example, fillers including silica; pigments, dyes, thermal stabilizers, optical stabilizers, plasticizers, antistatic agents, fire retardants, flame retardants, antiaging agents, ultraviolet-ray absorbers, antioxidants, antifogging agents, and slip additives.

Further, the shock absorber 10 of the present embodying mode includes, as shown in FIG. 2, attaching pawls 11 to 13 on the rear wall 3A side of the body 3, and by engaging the attaching pawls 11 to 13 with holes 21 to 23 disposed in the attaching object 20, it is possible to install the shock absorber 10 in a car, on the rear wall 3A of the body 3. However, to install the shock absorber 10 of the present embodying mode in a car, it is required that the attaching object 20 is beforehand mounted on a part of the car. As a result, the shock absorber 10 of the present embodying mode can be easily installed in the car without using attaching tools such as vis and screws.

The shock absorber 10 of the present embodying mode includes the first attaching pawl 11 formed in a hollow shape by blow molding and the second and third attaching pawls 12 and 13 formed in a solid, planar shape by compression.

The first attaching pawl 11 is formed, as shown in FIG. 3 (b), in a hollow shape to enhance rigidity. Incidentally, the hollow section 8 formed in the first attaching pawl 11 is integral with the hollow section 2 formed in the body 3 and air is able to flow between the hollow section 2 of the body 3 and the hollow section 8 of the first attaching pawl 11 in the configuration.

Also, since the first attaching pawl 11 of the present embodying mode is the start point to attach the shock absorber 10 onto the attaching object 20, the tip end of the first attaching pawl 11 is tapered. Additionally, the first attaching pawl 11 is configured in a shape such that when the first attaching pawl 11 is inserted in the hole 21 corresponding thereto, the first attaching pawl 11 is caught by the edge of the hole 21. As a result, it is possible that only the first attaching pawl 11 is easily inserted in the hole 21 to set a state in which the shock absorber 10 is caught by the attaching object 20.

In the present embodying mode, as shown in FIG. 2, in the contacting section between the body 3 and the first attaching pawl 11, there is formed a concave-shaped notch section 11' depressed toward the inside of the first attaching pawl 11 such that the first attaching pawl 11 is caught by the edge of the hole 21 by use of the notch section 11'. Further, the shape of the notch section 11' is not particularly limited, but any shape is applicable only if it is possible that the first attaching pawl 11 is caught by the edge of the hole 21. In addition, a thin section (burr) is formed in the notch section 11', and when the first attaching pawl 11 is caught by the edge of the hole 21, the thin section elastically deforms along the edge of the hole 21 such that the notch section 11' tightly makes contact with the edge of the hole 21. This makes it possible that the notch section 11' is tightly brought into contact with the edge of the hole 21 and the first attaching pawl 11 is caught by the edge of the hole 21. Also, when the shock absorber 10 of the present embodying mode is formed by blow molding, the thin section is formed between the first attaching pawl 11 and the body 3; however, when the first attaching pawl 11 is caught by the edge of the hole 21, the thin section elastically deforms along the edge of the hole 21; hence, it is not required to cut off the thin section.

The second and third attaching pawls 12 and 13 are formed in a solid planar shape by compression, to enhance elasticity. Specifically, as shown in FIG. 10, a step is disposed in the attaching pawl 13, to form a central planar section 14 constituting the central section of the attaching pawl 13 and both-end planar sections 15 and 16 constituting both ends of the attaching pawl 13 such that the both-end planar sections 15 and 16 on both ends of the attaching pawl 13 inflect toward the side of the central planar section 14.

Also, coupling sections 14' and 14' in which the central planar section 14 is coupled with the both-end planar sections 15 and 16 are formed as thin sections such that the both-end planar sections 15 and 16 elastically deform by the coupling sections 14' and 14', which makes it easy to engage the attaching pawl 13 in the hole 23. In addition, even when the shape of the attaching pawl 13 is larger than the shape of the hole 23 corresponding to the attaching pawl 13, the both-end planar sections 15 and 16 elastically deform by the coupling sections 14' and 14', which makes it easy to engage the attaching pawl 13 in the hole 23. Further, after the attaching pawl 13 is engaged with the hole 23, the both-end planar sections 15 and 16 will return to the original state of their shape; hence, it is possible to keep fixed the state in which the attaching pawl 13 is engaged with the hole 23. Incidentally, the coupling sections 14' and 14' are favorably formed with thickness raging from 0.01 mm to 0.5 mm. As a result, the both-end planar sections 15 and 16 inflect by use of the coupling sections 14' and 14', which facilitates the elastic deformation of the both-end planar sections 15 and 16. Incidentally, the width of the central planar section 14 is favorably longer than that of the both-end planar sections 15 and 16 in the configuration. This makes it possible that the both-end planar sections 15 and 16 easily inflect by using the central planar section 14 as the central axis.

Further, in the contacting section between the body 3 and the attaching pawl 13, there is formed a concave-shaped notch section 17 such that when the attaching pawl 13 is inserted in the hole 23, the edge of the hole 23 engages with the notch 17. Incidentally, the shape of the notch section 17 is not particularly limited, but any shape is applicable only if it is possible to engage with the edge of the hole 23. Also, the central planar section 14 forms, due to the coupling sections 14' and 14' standing at both ends of the central planar section 14 to couple them with each other, a concave shape depressed toward the side of the second sidewall 5 relative to the both-end planar sections 15 and 16, and the coupling sections 14' and 14' are thin sections. Incidentally, the more the depth of the concave shape of the central planar section 14 is, the more the resin of the portion to form the coupling sections 14' and 14' is extended; hence, it is possible to make the coupling sections 14' and 14' thin. Incidentally, it is favorable that the coupling sections 14' and 14' are inclined by a predetermined angle in the configuration such that the concave shape of the central planar section 14 is a trapezoidal shape. This makes it easy that the both-end planar sections 15 and 16 elastically deform toward the central planar section 14.

Further, the attaching pawl 13 of the present embodying mode prevents the contacting position at which the central planar section 14 makes contact with the body 3 and the contacting position at which the both-end planar sections 15 and 16 make contact with the body from being on one and the same straight line. Hence, it is possible to increase strength of the contacting section between the attaching pawl 13 and the body 3. Additionally, the attaching pawl 13 of the present embodying mode is configured such that the tip-end side of the central planar section 14 is inclined upward and the tip-end sides of the both-end planar sections 15 and 16 are inclined downward to place the tip-end section of the central planar section 14 and the tip-end sections of the both-end planar sections 15 and 16 on substantially one and the same line, and the tip-end side of the attaching pawl 13 has an acute shape. This makes it possible that the tip-end side of the attaching pawl 13 is elastically deformed so that the attaching pawl 13 is easily engaged with the hole 23. Also, when the attaching pawl 13 is engaged with the hole 23, it makes contact with the hole 23 in the vicinity of the contacting section having increased strength between the attaching pawl 13 and the body 3; hence, after the attaching pawl 13 is engaged with the hole 23, it is possible to fixedly attach the shock absorber 10 onto the attaching object 20.

Incidentally, while FIG. 10 shows a magnified configuration example of the third attaching pawl 13, the second attaching pawl 12 is also configured in the same way as for the third attaching pawl 13. However, while the central planar section 14 of the third attaching pawl 13 has a concave shape depressed toward the second sidewall 5 side, the central planar section 14 of the second attaching pawl 12 has a concave shape depressed toward the first sidewall 4 side. Hence, the concave-shaped section of the central planar section 14 of the third attaching pawl 13 and the concave-shaped section of the central planar section 14 of the second attaching pawl 12 face each other toward the center of the body 3.

Figure 11:
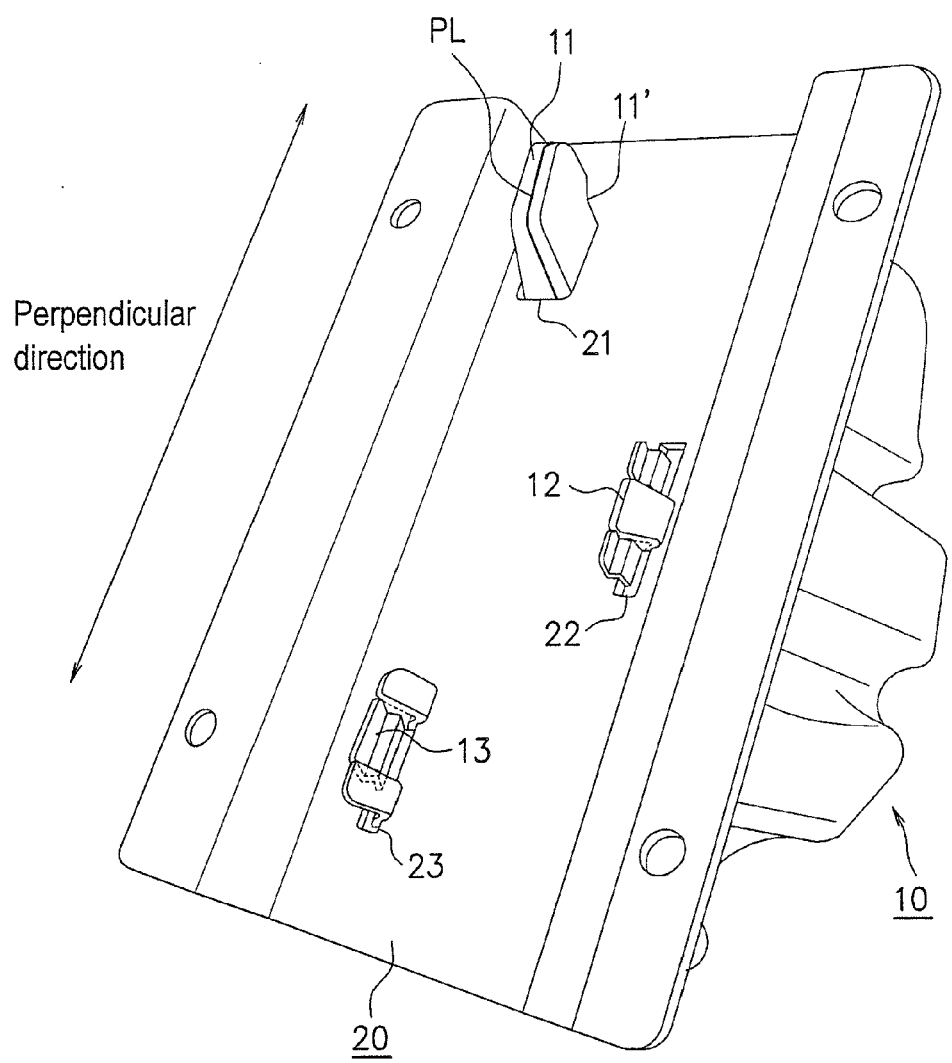
FIG. 11 is a first diagram showing a state in which the shock absorber 10 is attached onto the attaching object 20 and is a diagram showing a state viewed from the side of the attaching object 20.
Figure 12:
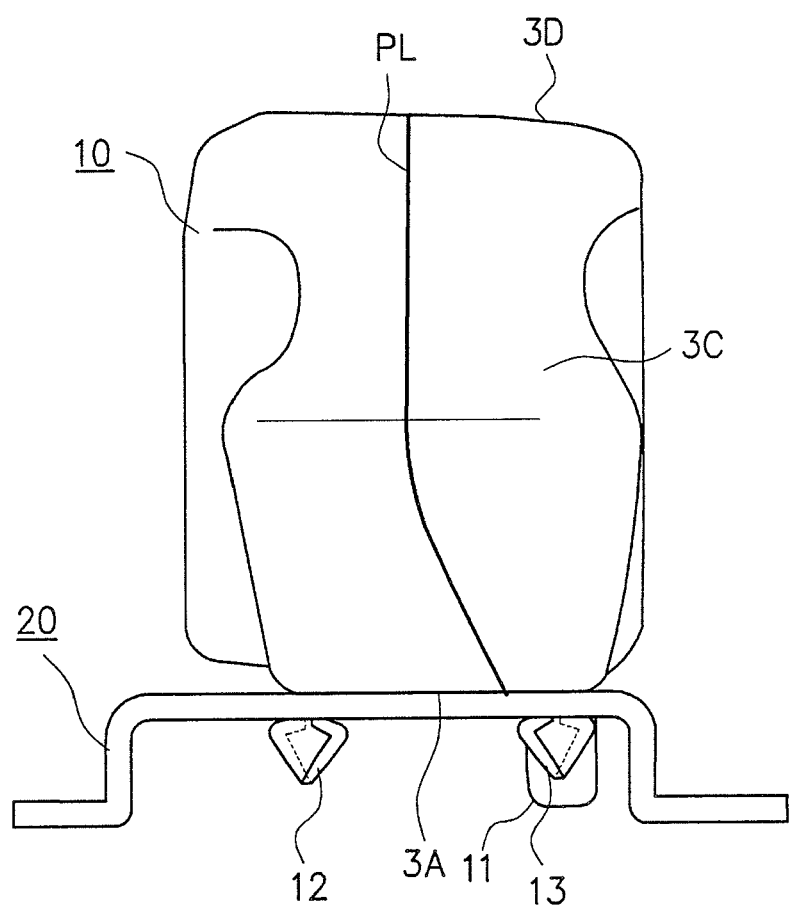
FIG. 12 is a second diagram showing a state in which the shock absorber 10 is attached onto the attaching object 20 and is a diagram showing a state viewed from the side of the lower wall 3C.
Figure 13:
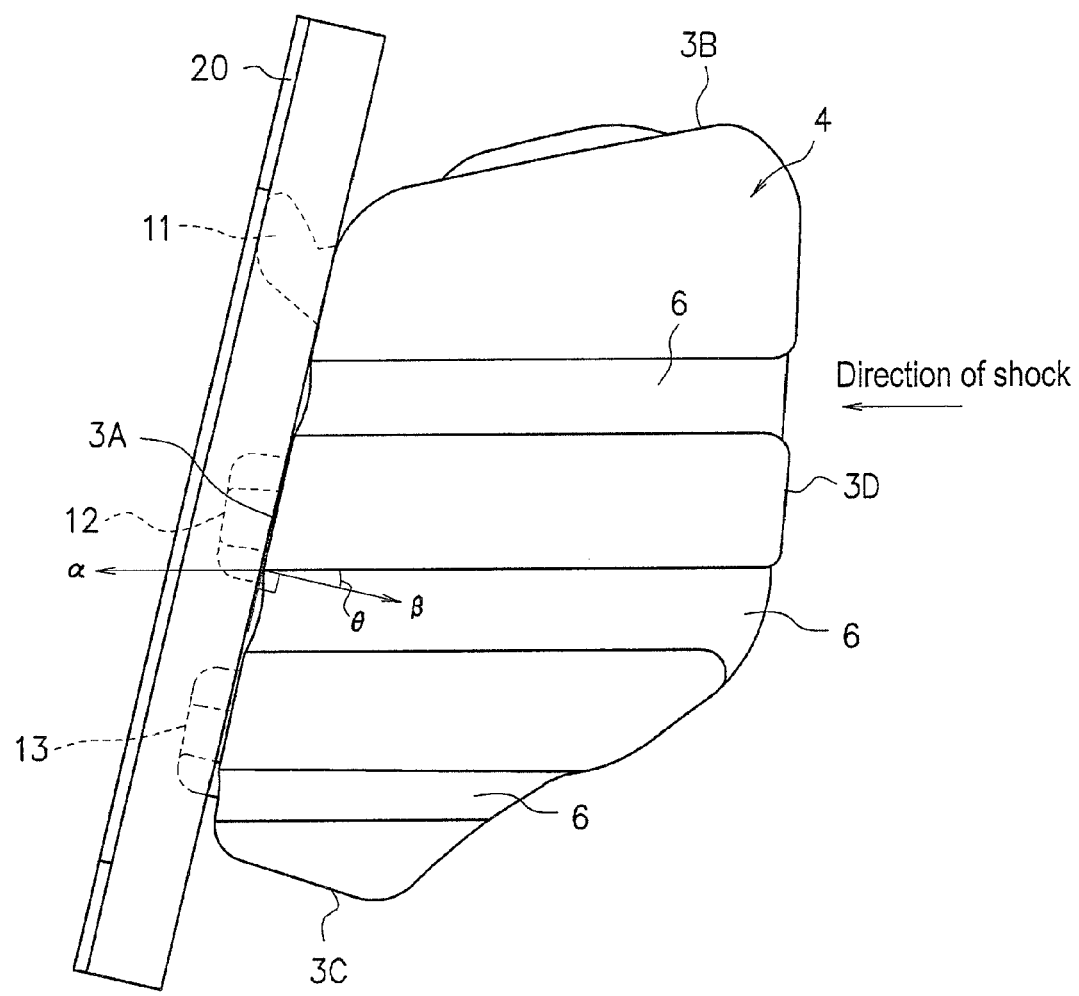
FIG. 13 is a third diagram showing a state in which the shock absorber 10 is attached onto the attaching object 20 and is a diagram showing a state viewed from the side of the first sidewall 4.
Figure 14:
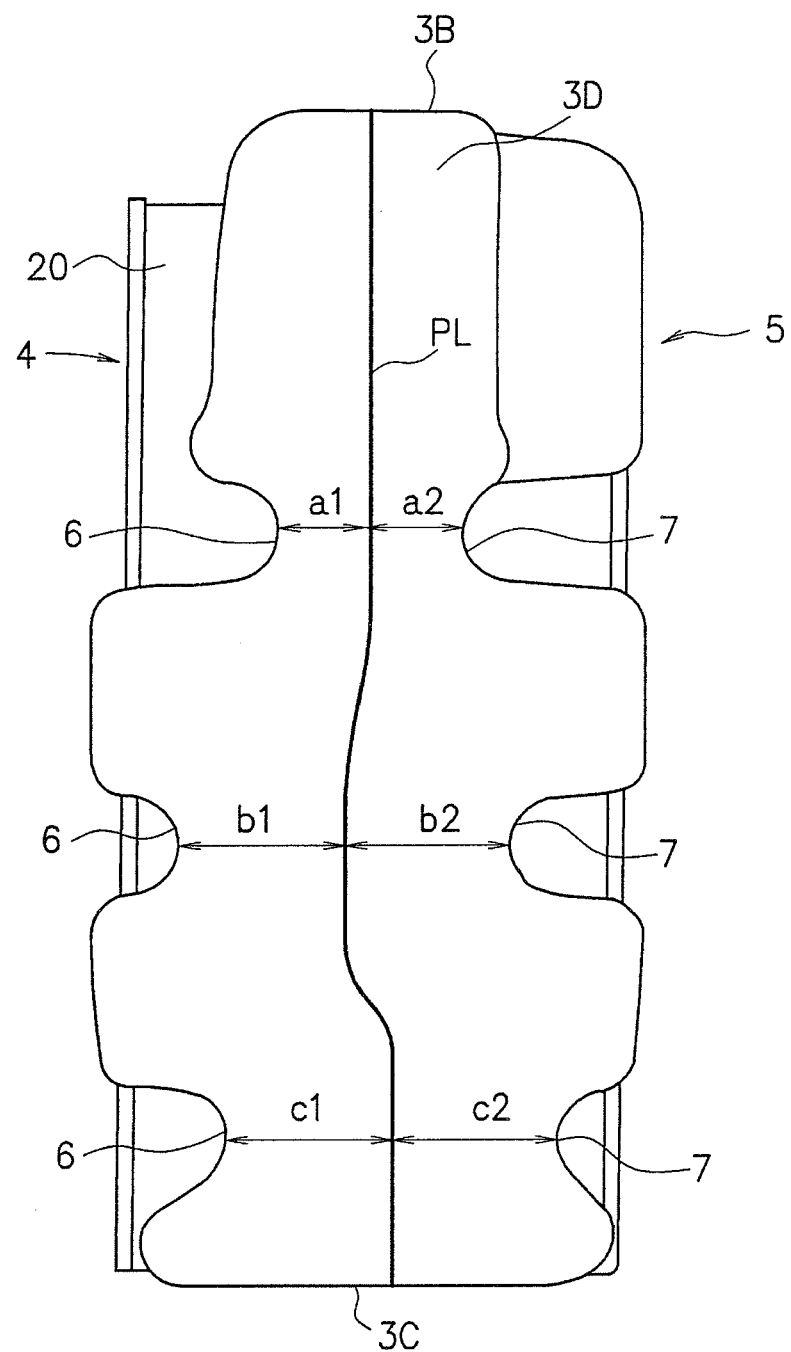
FIG. 14 is a fourth diagram showing a state in which the shock absorber 10 is attached onto the attaching object 20 and is a diagram showing a state viewed from the side of the front wall 3D.

In the installation of the shock absorber 10 of the present embodying mode in a car, first, by using the first attaching pawl 11 having rigidity as the start point, only the first attaching pawl 11 is inserted in the hole 21 associated with the first attaching pawl 11 in a state in which the first attaching pawl 11 is caught by the hole 21 by use of the notch section 11' of the first attaching pawl 11. Next, the second and third attaching pawls 12 and 13 having elasticity are inserted in the holes 22 and 23 associated with the second and third attaching pawls 12 and 13, to engage the second and third attaching pawls 12 and 13 in the holes 22 and 23. This makes it possible, as shown in FIGS. 11 to 14, to install the shock absorber 10 in the car. Incidentally, FIGS. 11 to 14 show states in which the attaching pawls 11 to 13 of the shock absorber 10 are engaged with the holes 21 to 23 disposed in the attaching object 20, wherein FIG. 11 shows a state viewed from the side of the attaching object 20 in which the attaching pawls 11 to 13 are engaged with the holes 21 to 23, FIG. 12 shows a state viewed from the side of the lower wall 3C, FIG. 13 shows a state viewed from the side of the first sidewall 4, and FIG. 14 shows a state viewed from the side of the front wall 3D.

In the shock absorber 10 of the present embodying mode, as shown in FIG. 13, the groove-shaped rib 6 extending from the front wall 3D to the rear wall 3A is formed in the first sidewall 4, and the extending direction α of the groove-shaped rib 6 and the vertical direction β vertical to the rear wall 3A form the predetermined angle θ therebetween. Hence, the groove-shaped rib 6 extends in a direction inclined with respect to the vertical direction β vertical to the rear wall 3A. This makes it possible, as shown in FIG. 13, that when the rear wall 3A is attached onto the attaching object 20, the extending direction α of the groove-shaped rib 6 is equal to the direction of shock. As a result, it is possible that at reception of shock by the front wall 3D, rigidity against the shock is enhanced and the shock is efficiently absorbed by the groove-shaped rib 6. Incidentally, while FIG. 13 shows the extending direction α of the groove-shaped rib 6 on the first sidewall 4 side, the extending direction α of the groove-shaped rib 7 on the second sidewall 5 side is also the same as for the groove-shaped rib 6 on the first sidewall 4 side. FIG. 13 shows a state viewed from a direction vertical to the first sidewall 4, and the extending direction α of the groove-shaped rib 6 is inclined with respect to the vertical direction β vertical to the rear wall 3A.

Incidentally, to install the shock absorber 10 of the present embodying mode in a car, it is required that the attaching object 20 is beforehand mounted on a part of the car. As a result, the shock absorber 10 of the present embodying mode can be easily installed in the car without using attaching tools such as vis and screws. As a result, the attaching operation can be facilitated. Further, since the second and third attaching pawls 12 and 13 are configured in a shape for easy elastic deformation, it is possible in the state in which the first attaching pawl 11 is inserted in the hole 21 that the second and third attaching pawls 12 and 13 are easily engaged with the holes 22 and 23.

Incidentally, in the shock absorber 10 of the present embodying mode, there are disposed, as shown in FIG. 2, the attaching pawls 12 to 13 on the inflected parting line PL to prevent the attaching pawls 12 to 13 from taking positions on a straight line. This makes it possible, as shown in FIG. 11, to prevent the positions at which the shock absorber 10 is attached onto the attaching object 20 from being on a straight line. As a result, it is possible to stably fix the shock absorber 10 onto the attaching object 20. Also, in the first attaching pawl 11, there exists the notch section 11'; further, in the second and third attaching pawl 12 and 13, there exist the concave-shaped notch sections 17; hence, it is possible that by use of the notch sections 11' and 17, the attaching pawls 11 to 13 engage with edges of the holes 21 to 23, to fixedly attach the shock absorber 10 onto the attaching object 20.

<Operation and Effects of Shock Absorber 10 of Present Embodying Mode>

As above, the shock absorber 10 of the present embodying mode is characterized, as shown in FIG. 2, by including a front wall 3D to receive shock, a rear wall 3A opposing the front wall 3D, and peripheral walls (an upper wall 3B, a first sidewall 4, a lower wall 3C, and a second sidewall 5) which connect the peripheries of the front wall 3D and the rear wall 3A to each other, and at least one attaching section (attaching pawls 11 to 13) to attach onto the attaching object 20 is formed to be integral with the rear wall 3A, and shock received by the front wall 3D is propagated via the rear wall 3A to the attaching object 20.

The shock absorber 10 of the present embodying mode can be, since the attaching sections 11 to 13 are formed to be integral with the rear wall 3A, easily attached and the installation space can be reduced.

Further, the shock absorber 10 of the present embodying mode includes a hollow, first attaching pawl 11 and solid, second and third attaching pawls 12 and 13, and by using the first attaching pawl 11 as the start point, the attaching pawls 11 to 13 are engaged with the holes 21 to 23 disposed in the attaching object 20, to attach the shock absorber 10 onto the attaching object 20. This makes it possible that the shock absorber 10 is attached onto the attaching object 20 without using attaching tools such as vis and screws; hence, the attaching operation of the shock absorber 10 can be facilitated.

Also, for the second and third attaching pawls 12 and 13 of the present embodying mode, the coupling sections 14' and 14' in which the central planar section 14 is coupled with the both-end planar sections 15 and 16 are formed as thin sections such that the both-end planar sections 15 and 16 elastically deform by the coupling sections 14' and 14' toward the side of the central planar section 14. This makes it possible to intentionally inflect the second and third attaching pawls 12 and 13 toward the side of the central planar section 14; hence, it is possible to easily insert the second and third attaching pawls 12 and 13 in the holes 22 and 23 of the attaching object 20, and after the insertion, the second and third attaching pawls 12 and 13 can be fixed onto the holes 22 and 23.

Incidentally, in the present embodying mode described above, the attaching pawls 11 to 13 of the shock absorber 10 are engaged with the holes 21 to 23 disposed in the attaching object 20. However, it is also possible that by beforehand forming the holes 21 to 23 corresponding to the attaching pawls 11 to 13 of the shock absorber 10 on a part of a car, the attaching pawls 11 to 13 of the shock absorber 10 are directly attached onto a part (attaching object) of the car.

Also, in the present embodying mode described above, as shown in FIG. 2, the configuration includes the hollow, first attaching pawl 11 and the solid, second and third attaching pawls 12 and 13, and by using the first attaching pawl 11 as the start point, the attaching pawls 11 to 13 are engaged with the holes 21 to 23 disposed in the attaching object 20, to attach the shock absorber 10 onto the attaching object 20.

However, it is also possible that the hollow, first attaching pawl 11 is replaced by a solid attaching pawl to include only solid attaching pawls such that the solid attaching pawls are engaged with the holes disposed in the attaching object 20, to attach the shock absorber 10 onto the attaching object 20.

In addition, it is also possible that the solid, second and third attaching pawls 12 and 13 are replaced by hollow attaching pawls like the hollow, first attaching pawl 11 to include only hollow attaching pawls such that the hollow attaching pawls are engaged with the holes disposed in the attaching object 20, to attach the shock absorber 10 onto the attaching object 20.

Even in such configuration, since the shock absorber 10 can be attached onto the attaching object 20 without using attaching tools such as vis and screws, the attaching operation of the shock absorber 10 can be facilitated. That is, in a construction in which the attaching pawls are formed to be integral with the rear wall 3A and the rear wall 3A can be attached onto the attaching object 20 by use of the attaching pawls, any attaching construction is applicable. Incidentally, the attaching pawls are favorably disposed on the parting line PL. This makes it possible that the rear wall 3A does not easily crack when shock is received by the front wall 3D.

Figure 15:
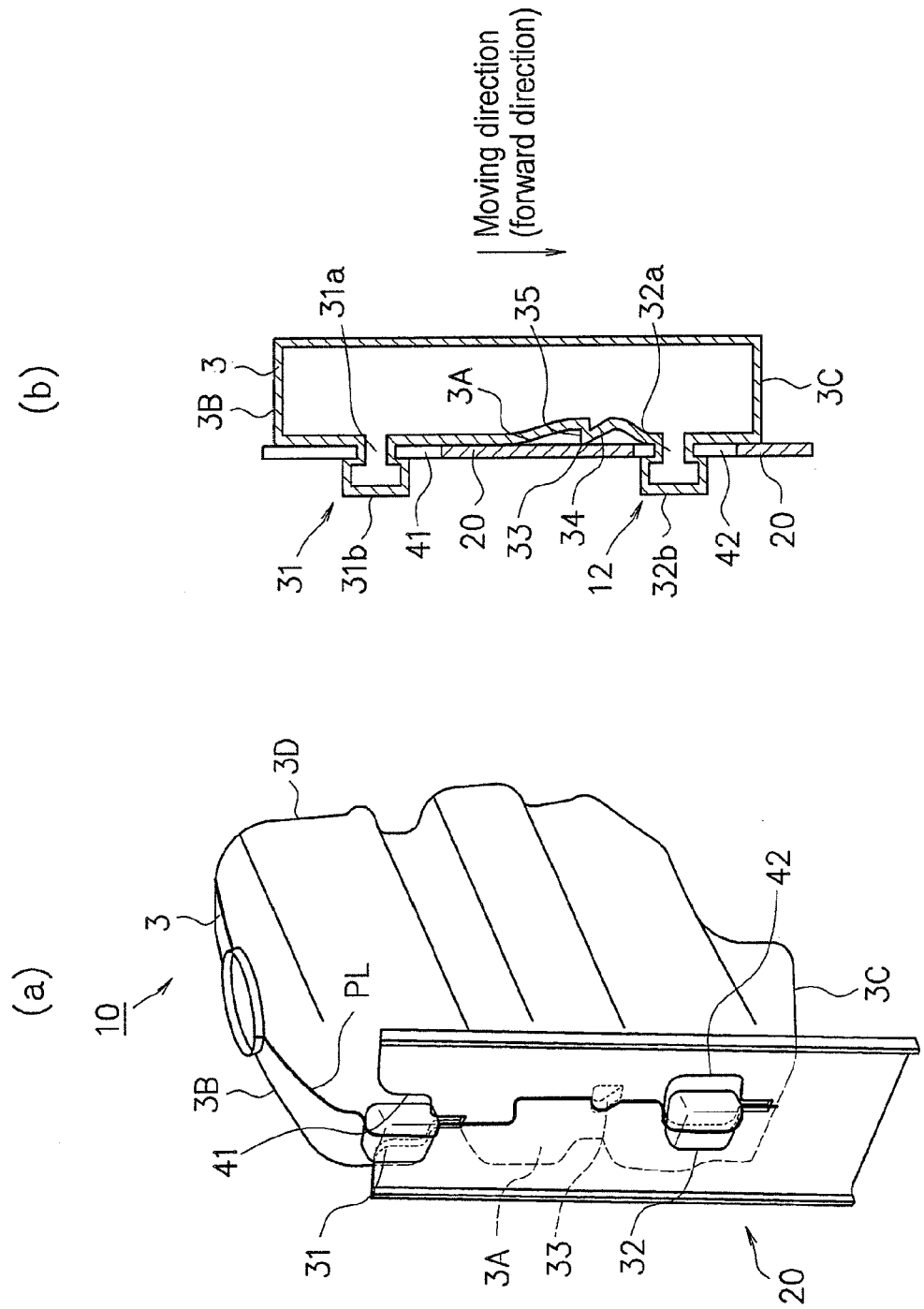
FIG. 15 is a first diagram showing another configuration example of the shock absorber 10 of the first embodying mode and a diagram showing a state in which projections 31 and 32 are inserted in attaching holes 41 and 42.
Figure 16:
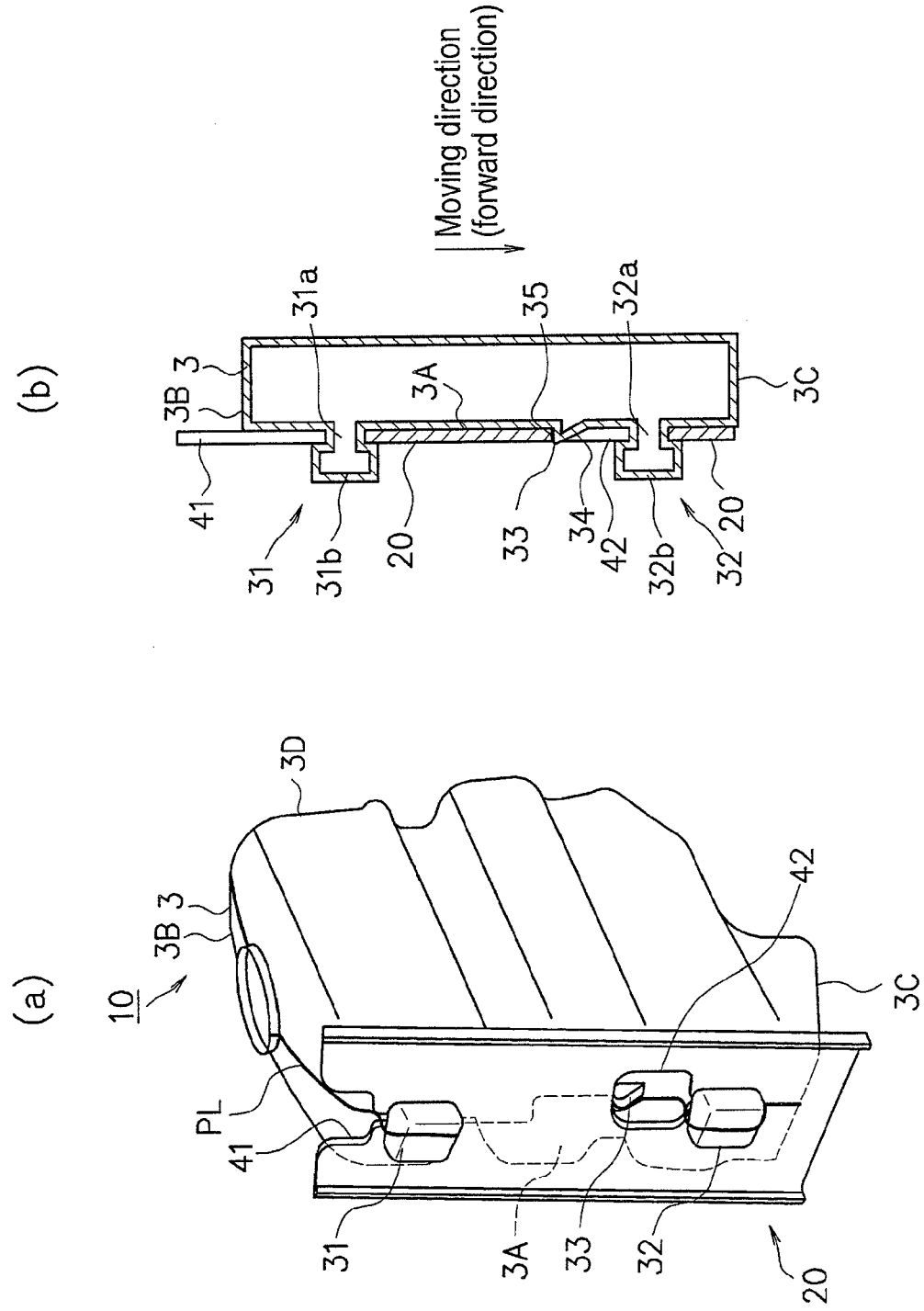
FIG. 16 is a diagram showing a state in which a fixing section 33 shown in FIG. 15 is inserted in the attaching hole 42 for the fixing thereof.

Also, in the present embodying mode described above, as shown in FIG. 2, the rear wall 3A is attached onto the attaching object 20 by use of the attaching pawls 11 to 13 formed to be integral with the rear wall 3A. However, it is also possible, as shown in FIGS. 15 and 16, to attach the rear wall 3A onto the attaching object 20 by use of projections 31 and 32 and a fixing section 33 which are formed to be integral with the rear wall 3A. Also in this case, as for the shock absorber 10 of the present embodying mode described above, the shock absorber 10 can be attached onto the attaching object 20 without using attaching tools such as vis and screws.

When installing the shock absorber 10 shown in FIGS. 15 and 16 in a car, first, as shown in FIG. 15, tip ends 31*b* and 32*b* constituting the projections 31 and 32 are inserted in attaching holes 41 and 42. Next, by using axial sections 31*a* and 32*a* constituting the projections 31 and 32 as the moving axes, the projections 31 and 32 are moved in the areas of the attaching holes 41 and 42 as shown in FIG. 16, to engage the fixing section 33 with the attaching hole 42 and to fix the fixing section 33 on an edge section of the attaching hole 42 such that the fixing section 33 restricts movement of the shock absorber 10 in a reverse direction with respect to the moving direction. This makes it possible to install the shock absorber 10 in the car. The projections 31 and 32 and the fixing section 33 of this embodying mode are formed to be integral with the rear wall 3A. Further, the projections 31 and 32 and the fixing section 33 include hollow sections integral with the hollow section of the body 3 so that air flows between the hollow section of the body 3 and the hollow sections of the projections 31 and 32 and the fixing section 33 in the configuration. The fixing section 33 includes a first inclined section 34 and a second inclined section 35 such that the fixing section 33 conducts a parallel movement while an inclined surface of the first inclined section 34 makes contact with the attaching object 20, and when the fixing section 33 is engaged with the attaching hole 42, an inclined surface of the second inclined section 35 makes contact with the edge section of the attaching hole 42, and the fixing section 33 is fixed on the edge section of the attaching hole 42.

As above, the shock absorber 10 of the present embodying mode shown in FIGS. 15 and 16 includes the projections 31 and 32 and the fixing section 33 which are projected from the rear wall 3A of the body 3, and the projections 31 and 32 are inserted in the attaching holes 41 and 42 disposed in the attaching object 20 and the projections 31 and 32 are moved in the areas of the attaching holes 41 and 42 such that the fixing section 33 is inserted and is fixed in the attaching hole 42 disposed in the attaching object 20. As a result, since the shock absorber 10 can be attached onto the attaching object 20 without using attaching tools such as vis and screws, the attaching operation of the shock absorber 10 is facilitated.

Also, the shock absorber 10 of the present embodying mode shown in FIGS. 15 and 16 can make the body 3 conduct a parallel movement on almost a straight line along the attaching object 20 by using the projections 31 and 32 inserted in the attaching holes 41 and 42 as axes; hence, it is possible to stably move the body 3 with respect to the attaching object 20. Further, the fixing section 33 is inserted and is fixed in the attaching hole 42, to thereby attach the fixing section 33 onto the attaching hole 42; hence, it is possible to visually recognize the state whether or not the shock absorber 10 is attached onto the attaching object 20, and occurrence of attachment failure can be prevented.

In addition, the shape of the shock absorber 10 of the embodying mode shown in FIGS. 15 and 16 is a shape elongated in the moving direction described above; hence, when compared with a case in which the shock absorber 10 is rotated to be attached onto the attaching object 20, it is possible to reduce the attaching space of the shock absorber 10. For example, in the case in which the shock absorber 10 is rotated to be attached onto the attaching object 20, the attaching space is required for the area of the rotation radius of the shock absorber 10, and it is not possible to arrange any other members in the attaching space. In contrast thereto, the shock absorber 10 of the embodying mode shown in FIGS. 15 and 16 conducts a parallel movement in a linear manner along the attaching object 20 to be attached onto the attaching object 20; hence, even when other members exist in the periphery of the attaching hole 42 of the attaching object 20, the shock absorber 10 can be attached.

Incidentally, in the shock absorber 10 of the embodying mode shown in FIGS. 15 and 16, the hole in which the fixing section 33 is inserted to be fixed and the hole in which the projection 32 is inserted are integrally formed. However, it is also possible that an exclusive hole (fixing hole) is disposed to fix the fixing section 33 such that the fixing section 33 is inserted and is fixed in the fixing hole.

Figure 17:
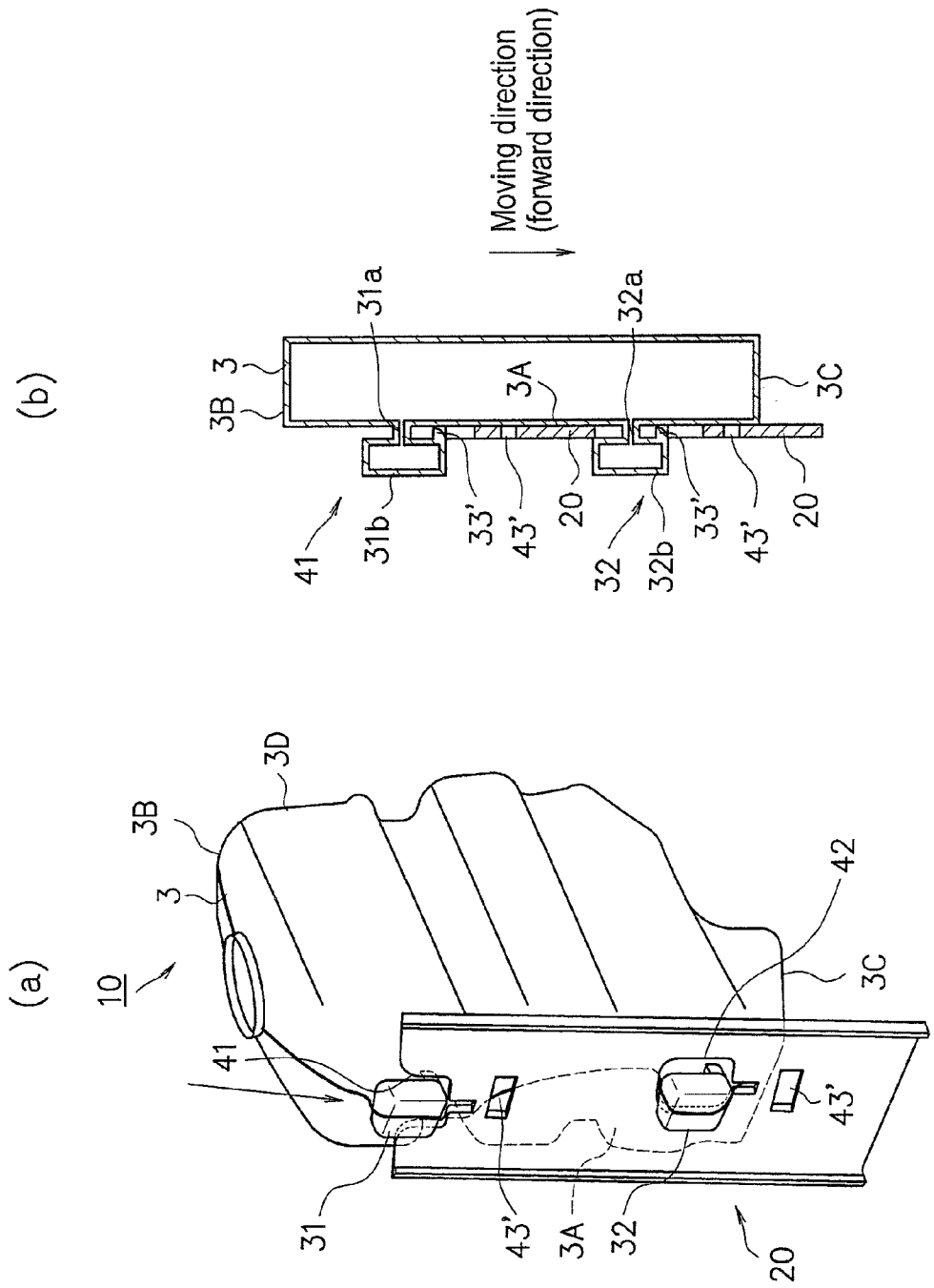
FIG. 17 is a second diagram showing another configuration example of the shock absorber 10 of the first embodying mode and a diagram showing a state in which the projections 31 and 32 are inserted in the attaching holes 41 and 42.
Figure 18:
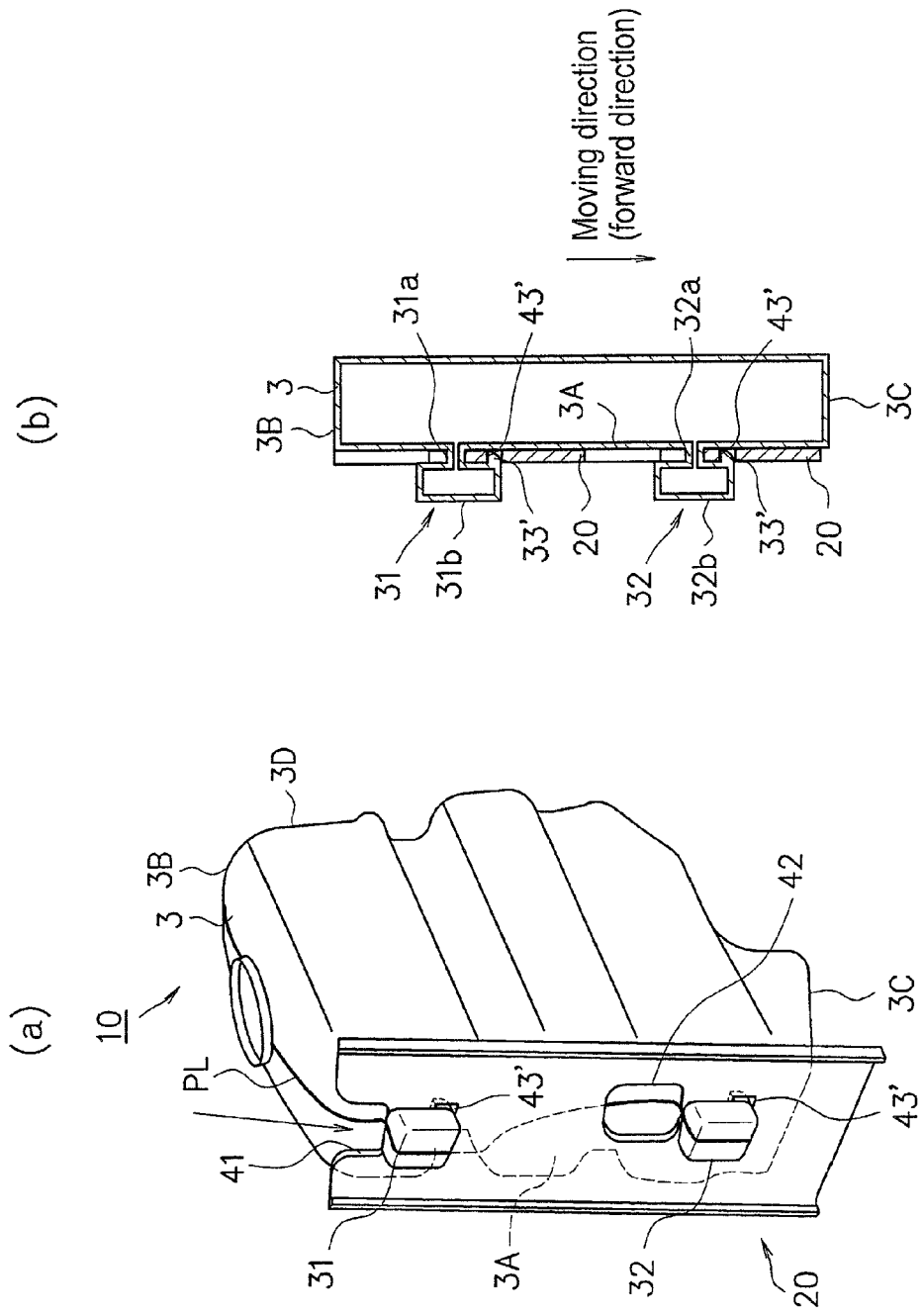
FIG. 18 is a diagram showing a state in which a fixing section 33' shown in FIG. 17 is inserted in an attaching hole 43' for the fixing thereof.

Further, it is also possible that the shock absorber 10 shown in FIGS. 15 and 16 includes fixing sections 33' in the tip ends 31*b* and 32*b* of the projections 31 and 32 as shown in FIGS. 17 and 18 such that the fixing sections 33' are inserted in fixing holes 43' disposed in the attaching object 20, to thereby fix the fixing sections 33' in the fixing holes 43'.

The shock absorber 10 shown in FIGS. 17 and 18 is configured in the same way as for the shock absorber 10 shown in FIGS. 15 and 16 excepting that it includes the fixing sections 33' in the tip ends 31*b* and 32*b* of the projections 31 and 32, and as shown in FIG. 17, the tip ends 31*b* and 32*b* constituting the projections 31 and 32 are inserted in the attaching holes 41 and 42. Next, by using the axial sections 31*a* and 32*a* constituting the projections 31 and 32 as the moving axes, the projections 31 and 32 are moved in the areas of the attaching holes 41 and 42 as shown in FIG. 18, and the fixing section 33' is engaged with the fixing hole 43', to fix the fixing section 33' in the fixing hole 43'. This makes it possible to attach the shock absorber 10 onto the attaching object 20. Incidentally, the shape of the fixing section 33' is favorably a shape to easily get over the attaching object 20. Also, it is favorably a shape such that when the body 3 is moved, the tip ends 31*b* and 32*b* of the projections 31 and 32 elastically deform and the fixing section 33' gets over the attaching object 2 and is easily inserted in the fixing hole 43'. It is hence possible that the attaching object 20 is interposed between part of the bottom surface of the tip end 31*b* (32*b*) of the projection 31, 32 and the surface of the body 3 such that the projections 31 and 32 are not removed from the attaching holes 41 and 42. Incidentally, the positions and the number of the fixing sections 33' disposed in the tip ends 31*b* and 32*b* of the projections 31 and 32 are not particularly limited, and desired positions and a desired number of fixing sections may be arranged. In this case, in association with the positions of the fixing sections 33' disposed in the projections 31 and 32, there are disposed the fixing holes 43' in the attaching object 20 to fix the fixing sections 33'.

Incidentally, in the shock absorber 10 shown in FIGS. 15 to 18 as in the embodying mode described above, the parting line PL extends along the upper wall 3B, the front wall 3D, the lower wall 3C, and the rear wall 3A, and the projections 31 and 32 and the fixing sections 33 and 33' are formed on the parting line PL. Hence, on the parting line PL at the positions of the projections 31 and 32 and the fixing sections 33 and 33', there remain burrs. In a situation in which burrs remain at the positions of the projections 31 and 32 and the fixing sections 33 and 33'; as shown in FIGS. 15 to 18, when the projections 31 and 32 are moved in the areas of the attaching holes 41 and 42 to fix the fixing section 33 in the attaching hole 42 and to fix the fixing section 33' in the fixing hole 43', the projections 31 and 32 and the fixing sections 33 and 33' cannot be brought into contact with edges of the attaching holes 41 and 42 and the fixing hole 43' due to the shape of each of the burrs remaining at the projections 31 and 32 and the fixing sections 33 and 33'; hence, gaps take place between the projections 31 and 32 and the fixing sections 33 and 33' and the edges of the attaching holes 41 and 42 and the fixing hole 43'. When the gaps take place due to the shapes of burrs, the attaching position of the shock absorber 10 onto the attaching object 20 is moved, which leads to a fear of reduction in the attaching precision of the shock absorber 10. Incidentally, even when it is desired to remove the burrs, it is difficult to clearly remove all burrs; hence, some burrs remain at the projections 31 and 32 and the fixing sections 33 and 33' and the situation of the problem above takes place.

Hence, it is desirable that in the attaching object 20 onto which the shock absorber 10 shown in FIGS. 15 to 18 is attached, notch sections are formed on edges of the attaching holes 41 and 42 and the fixing hole 43' which make contact with the parting line PL at the projections 31 and 32 and the fixing sections 33 and 33', and as shown in FIGS. 15 to 18, when the projections 31 and 32 are moved in the areas of the attaching holes 41 and 42 to fix the fixing section 33 in the attaching hole 42 and to fix the fixing section 33' in the fixing hole 43', the parting line PL at the projections 31 and 32 and the fixing sections 33 and 33' is placed at the notch sections, not shown, formed in the edges of the attaching holes 41 and 42 and the fixing hole 43'. Hence, as shown in FIGS. 15 to 18, when the projections 31 and 32 are moved in the areas of the attaching holes 41 and 42 to fix the fixing section 33 in the attaching hole 42 and to fix the fixing section 33' in the fixing hole 43', it is possible that the burrs remaining on the parting line PL at the positions of the projections 31 and 32 and the fixing sections 33 and 33' are accommodated in the notch sections, to thereby bring the projections 31 and 32 and the fixing sections 33 and 33' into contact with the edges of the attaching holes 41 and 42 and the fixing hole 43'. Consequently, the burrs remaining at the projections 31 and 32 and the fixing sections 33 and 33' do not become hindrances, and the projections 31 and 32 and the fixing sections 33 and 33' can be moved to positions to make contact with the edges of the attaching holes 41 and 42 and the fixing hole 43'; hence, it is possible to prevent reduction in the attaching precision of the shock absorber 10. Incidentally, the shape of the notch sections is not particularly limited, but any shape may be used in the configuration only if the shape can accommodate the burrs remaining at the projections 31 and 32 and the fixing sections 33 and 33'.

Incidentally, in the shock absorber 10 shown in FIGS. 15 to 18, the projections 31 and 32 of the shock absorber 10 are inserted in the attaching holes 41 and 42 disposed in the attaching object 20 to fix the fixing sections 33 and 33' of the shock absorber 10 in the attaching hole 42 and the fixing hole 43' disposed in the attaching object 20. However, it is also possible that by beforehand forming the attaching holes 41 and 42 and the fixing hole 43' corresponding to the projections 31 and 32 and the fixing sections 33 and 33' of the shock absorber 10 on a part of a car, the projections 31 and 32 and the fixing sections 33 and 33' of the shock absorber 10 are directly attached onto a part (attaching object) of the car.

Further, in the shock absorber 10 shown in FIGS. 17 and 18, the fixing section 33' of the shock absorber 10 is inserted in the fixing hole 43', to fix the fixing section 33'. However, the structure of the fixing section 33' and the fixing hole 43' is not particularly limited only if the fixing section 33' can be fixed, and a fixing section of any structure may be disposed on the shock absorber 10 and the attaching object 20.

Second Embodying Mode Example

Next, description will be given of a second embodying mode example.

Figure 19:
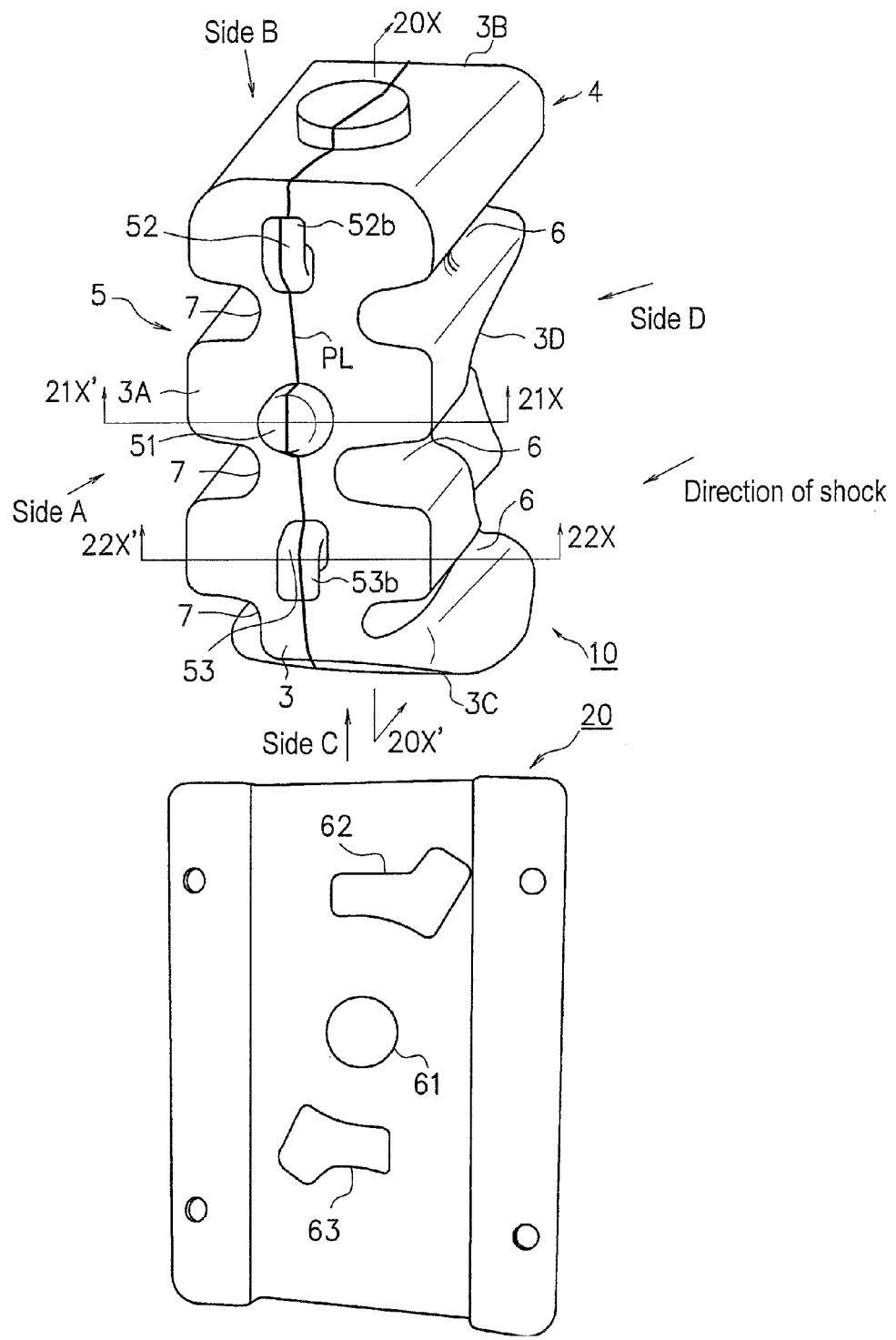
FIG. 19 is a diagram showing an overall configuration example of a shock absorber 10 in a second embodying mode and an attaching object 20 onto which the shock absorber 10 is attached.
Figure 29:
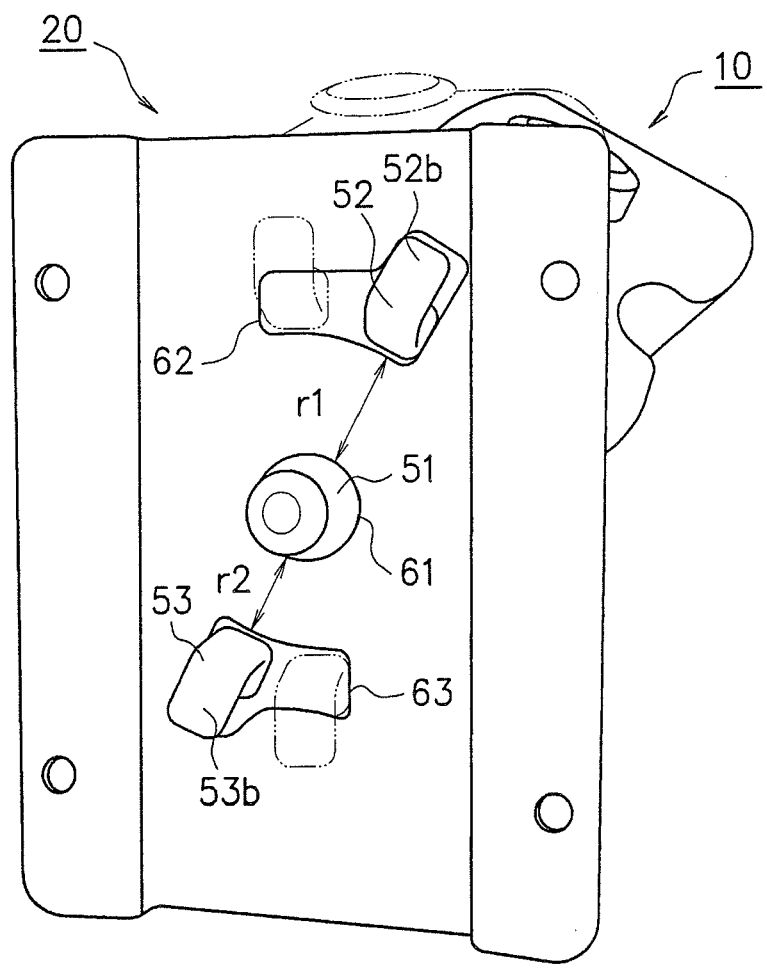
FIG. 29 is a diagram showing a state in which an axial section 11 and removal preventing sections 12 and 13 of a body 3 are inserted in an axial hole 21 and attaching holes 22 and 23 disposed in the attaching object 20.

First, by referring to FIGS. 19, 29, and 30, description will be given of a shock absorber 10 in a second embodying mode. FIG. 19 shows an overall configuration example of a shock absorber 10 of the present embodying mode and an attaching object 20 onto which the shock absorber 10 is attached; FIG. 29 shows a state in which an axial section 51 and removal preventing sections 52 and 53 of a body 3 are inserted in an axial hole 61 and attaching holes 62 and 63 disposed in the attaching object 20, and FIG. 30 shows a state in which the body 3 is rotated about the axial section 51 as a rotary axis to place portions of restricting sections 52b and 53b disposed at tip ends of the removal preventing sections 52 and 53 over the attaching object 20.

Figure 30:
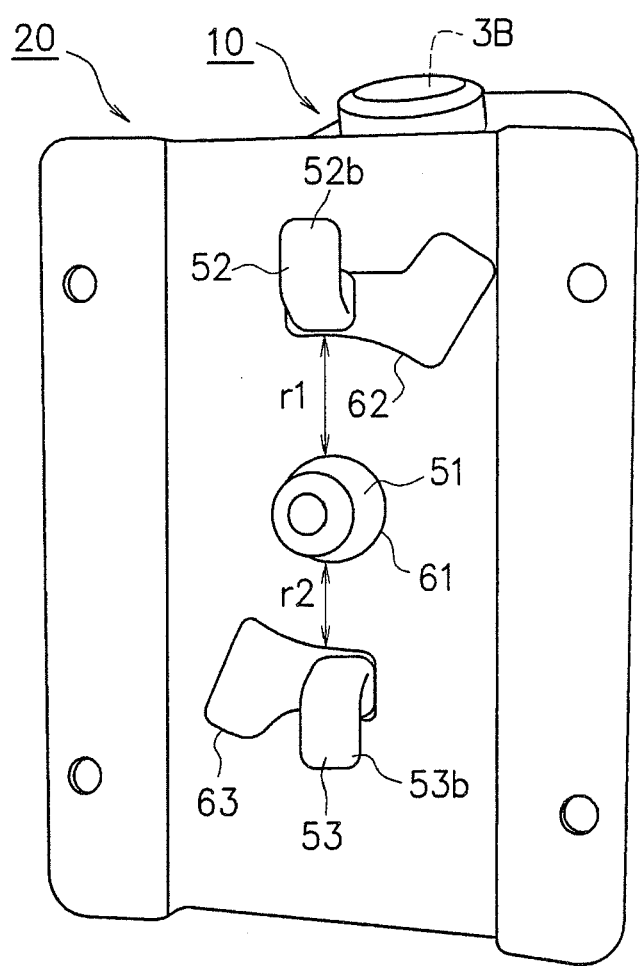
FIG. 30 is a diagram showing a state in which the body 3 is rotated about the axial section 11 as the axis of rotation to place portions of restricting sections 12b and 13b disposed at tip ends of the removal preventing sections 12 and 13 over the attaching object 20.

The shock absorber 10 of the present embodying mode has an aspect to include, as shown in FIG. 19, a body 3, an axial section 51 projecting from the body 3, and removal preventing sections 52 and 53 projecting from the body 3; and the removal preventing sections 52 and 53 include removal restricting sections 52b and 53b which are placed over the attaching object 20 to restrict removal of the axial section 51 from the axial hole 61 when the axial section 51 is inserted in an axial hole 61 disposed in the attaching object 20 as shown in FIG. 29 and the body is rotated as shown in FIG. 30. Incidentally, as in the configuration example described above, when the shock absorber 10 includes the axial section 51 and the removal preventing sections 52 and 53, it is only necessary to include at least one removal preventing section 52, 53.

Further, the shock absorber 10 of the present embodying mode has an aspect to include, as shown in FIG. 19, a body 3 and a plurality of removal preventing sections 52 and 53 projecting from the body 3; and the removal preventing sections 52 and 53 include, as shown in FIG. 29, restricting sections 52b and 53b which are placed over the attaching object 20 to restrict removal of the removal preventing sections 52 and 53 from the attaching holes 62 and 63 when the removal preventing sections 52 and 53 are inserted in attaching holes 62 and 63 disposed in the attaching object 20 and the body 3 is rotated, as shown in FIG. 30, such that the removal preventing sections 52 and 53 are moved along areas of the attaching holes 62 and 63. Incidentally, as in the configuration example described above, when the shock absorber 10 includes a plurality of removal preventing sections 52 and 53, it is only necessary to include at least two removal preventing section 52 and 53.

In the shock absorber 10 of the present embodying mode, when the body 3 is rotated, it is possible to restrict removal of the axial section 51 from the axial hole 61 and to restrict removal of the removal preventing sections 52 and 53 from the attaching holes 62 and 63. As a result, for the shock absorber 10 of the present embodying mode, no attaching tool is required, and the attaching operation can be facilitated. Next, referring to the accompanying drawings, description will be given in detail of the shock absorber 10 of the present embodying mode.

<Configuration Example of Shock Absorber 10>

Figure 20:
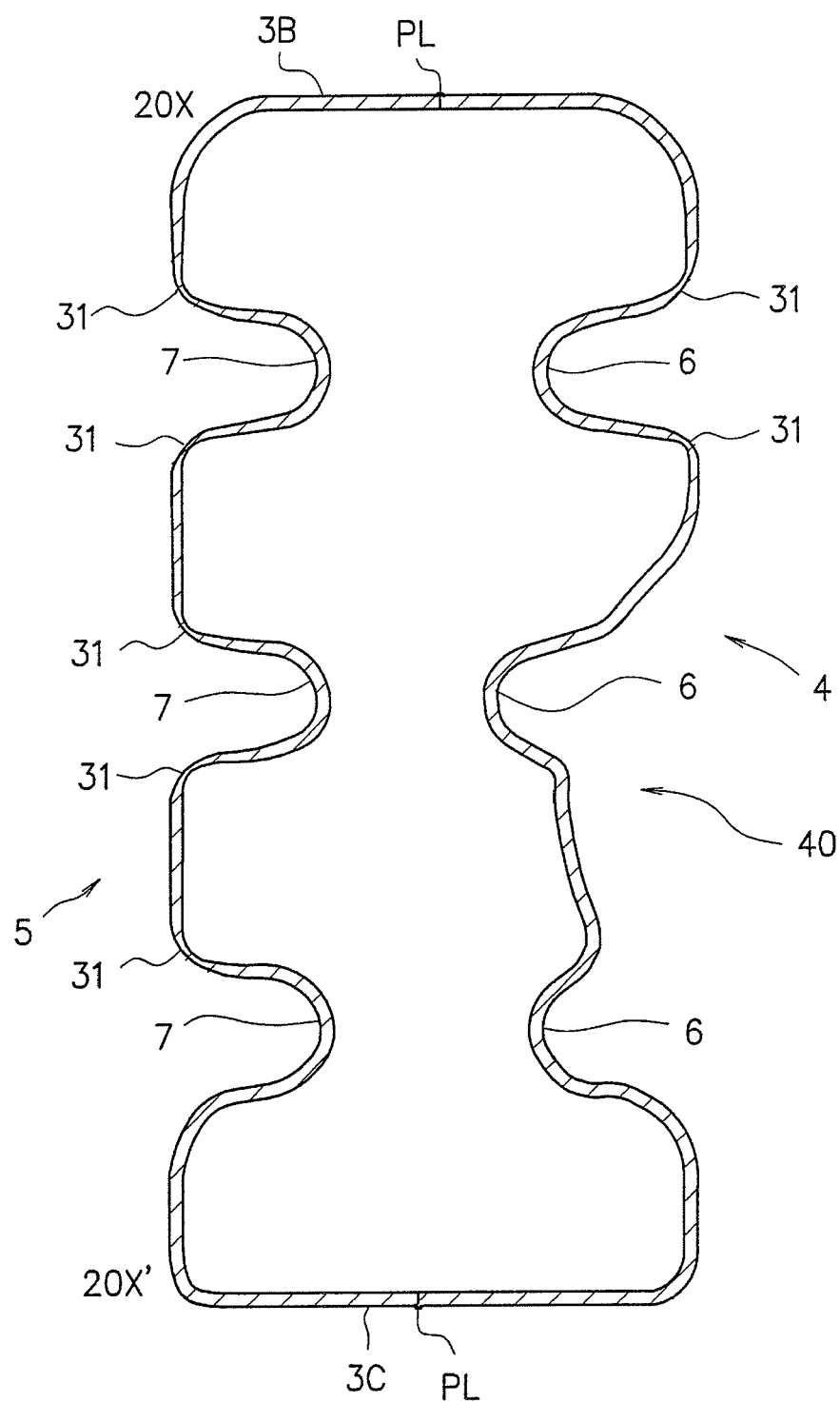
FIG. 20 is a diagram showing a cross-sectional configuration example along line 20X-20X' of the shock absorber 10 shown in FIG. 19.
Figure 21:
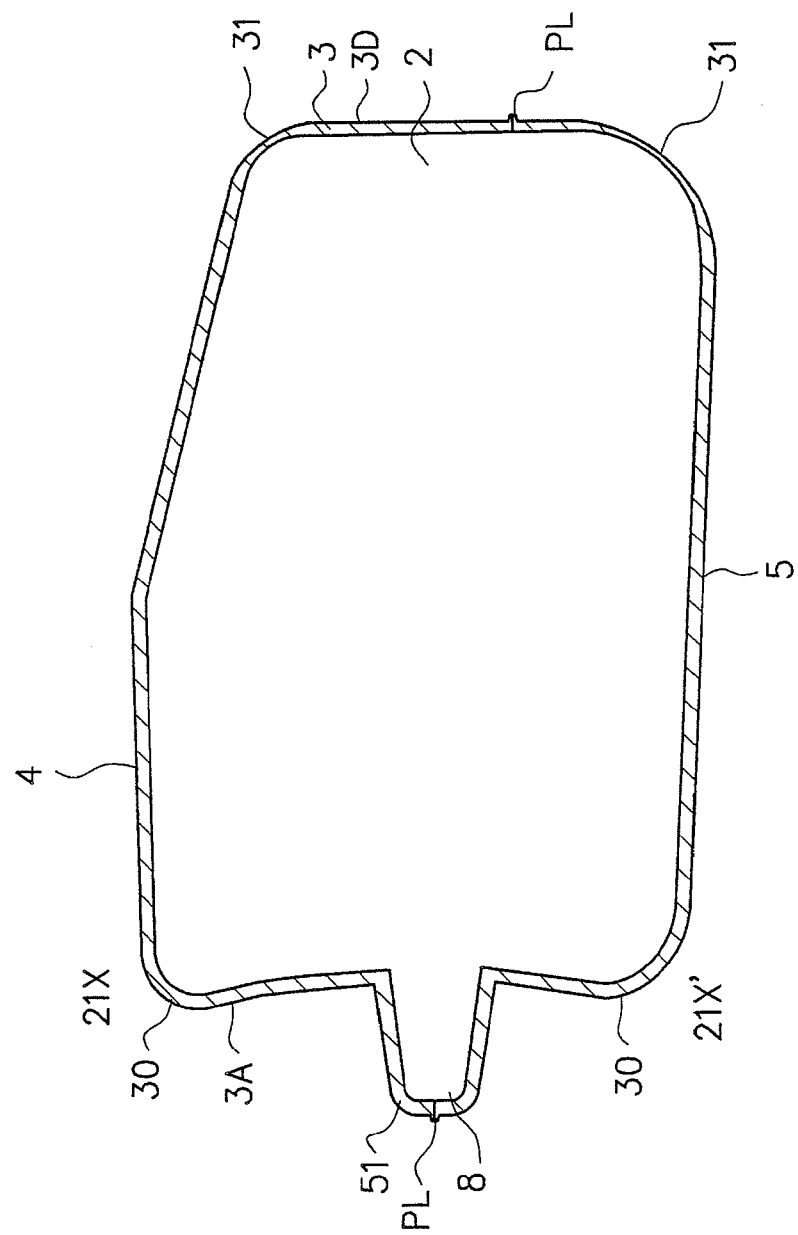
FIG. 21 is a diagram showing a cross-sectional configuration example along line 21X-21X' of the shock absorber 10 shown in FIG. 19.
Figure 22:
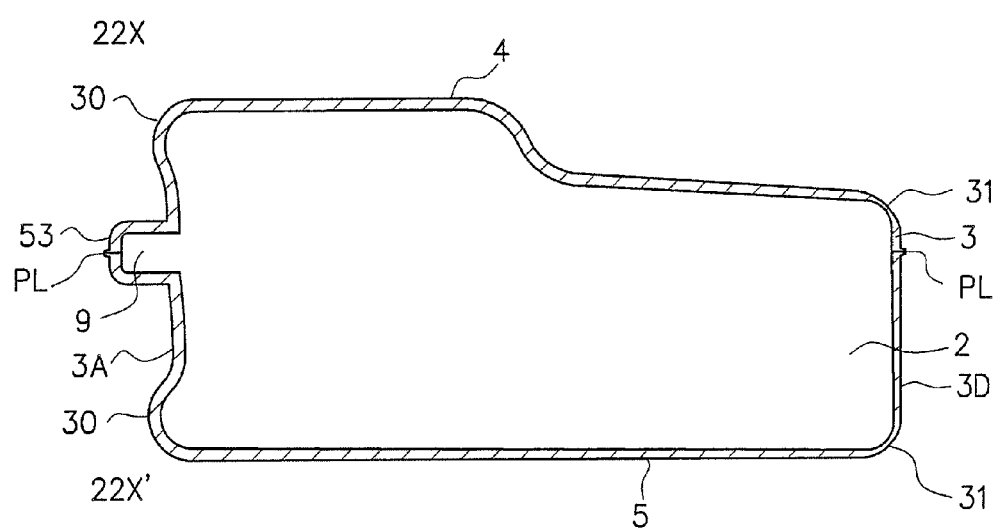
FIG. 22 is a diagram showing a cross-sectional configuration example along line 22X-22X' of the shock absorber 10 shown in FIG. 19.
Figure 23:
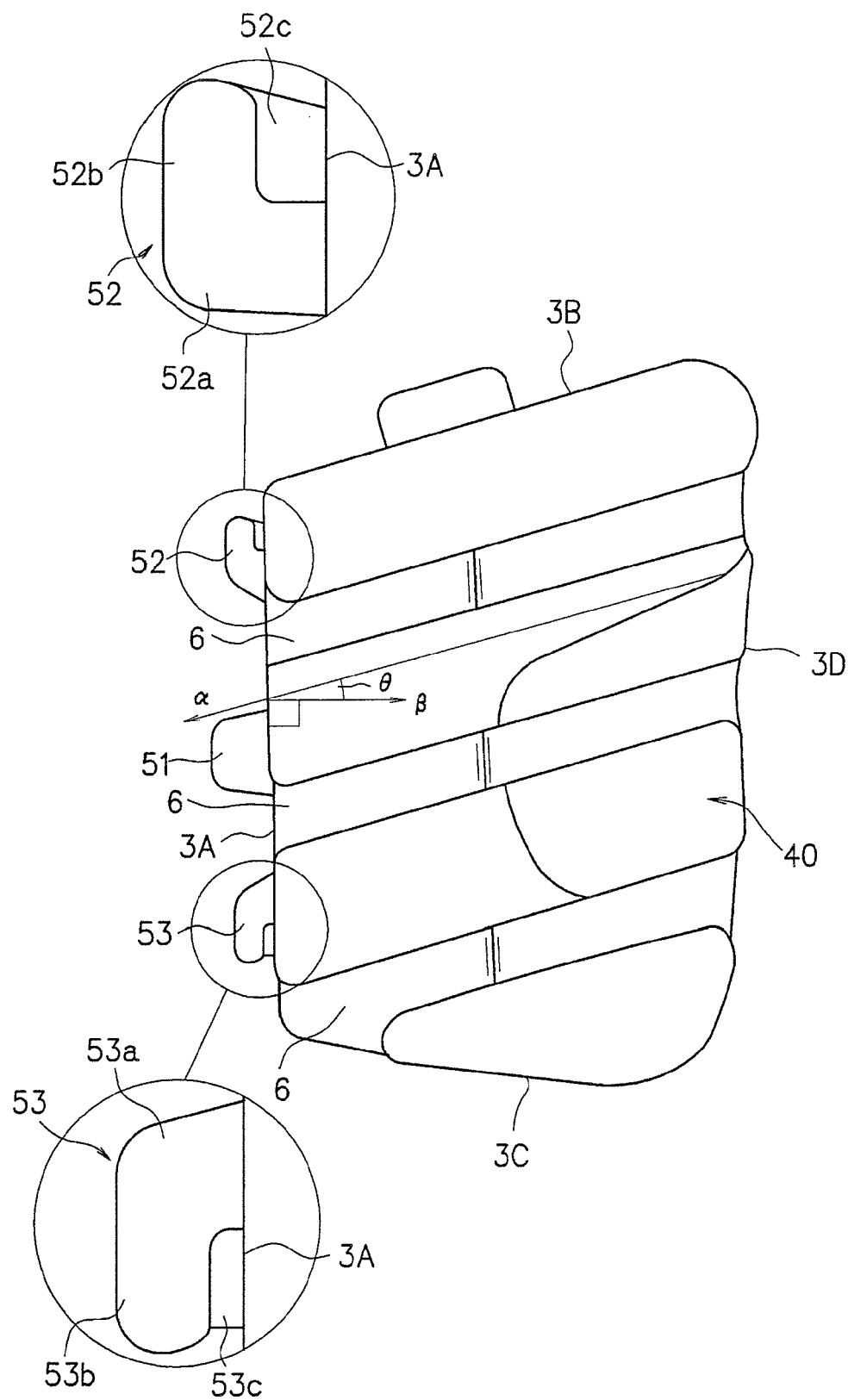
FIG. 23 is a diagram showing a configuration example, on the side of the first sidewall 4, of the shock absorber 10 shown in FIG. 19.
Figure 24:
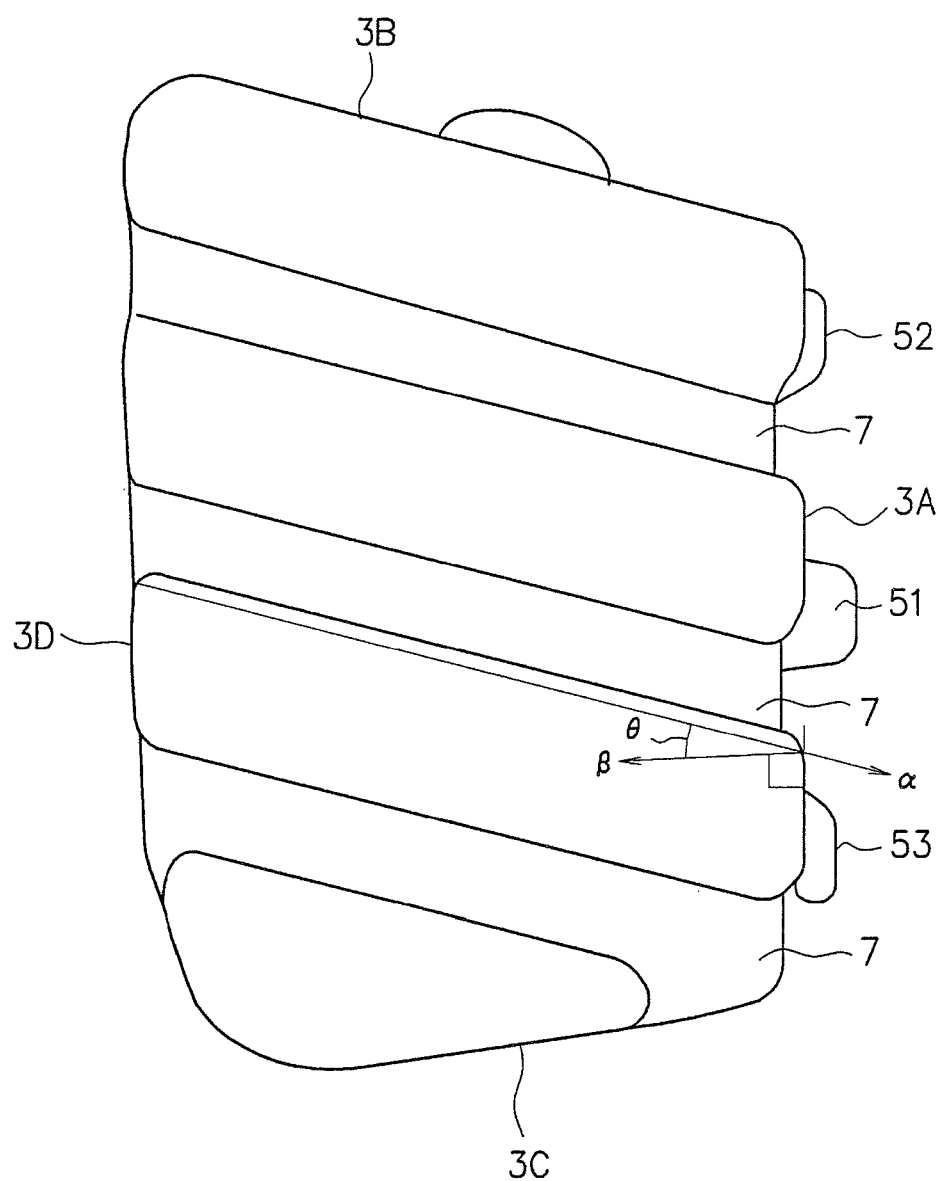
FIG. 24 is a diagram showing a configuration example, on the side of the second sidewall 5, of the shock absorber 10 shown in FIG. 19.
Figure 25:
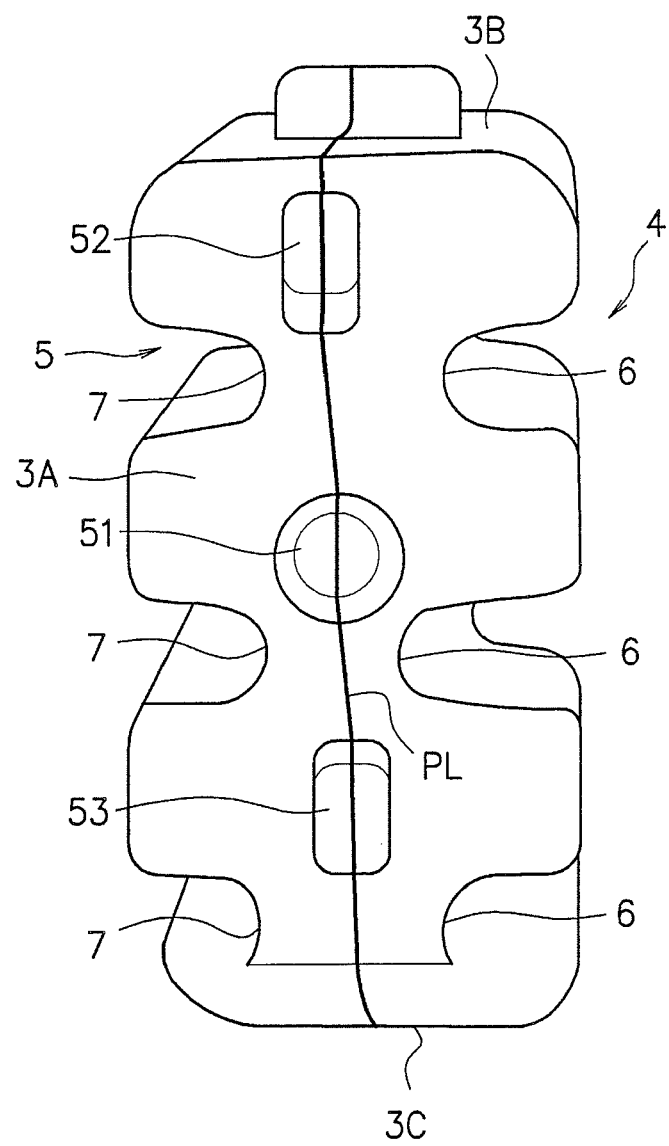
FIG. 25 is a diagram showing a configuration example, on side A (side of the rear wall 3A), of the shock absorber 10 shown in FIG. 19.
Figure 26:
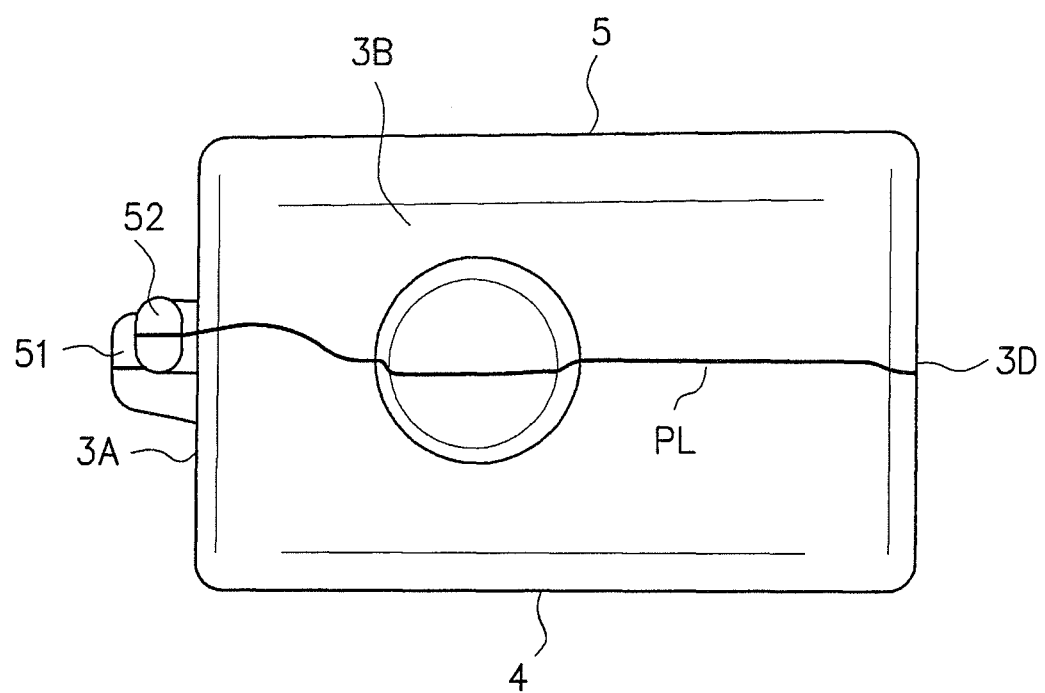
FIG. 26 is a diagram showing a configuration example, on side B (side of the upper wall 3B), of the shock absorber 10 shown in FIG. 19.
Figure 27:
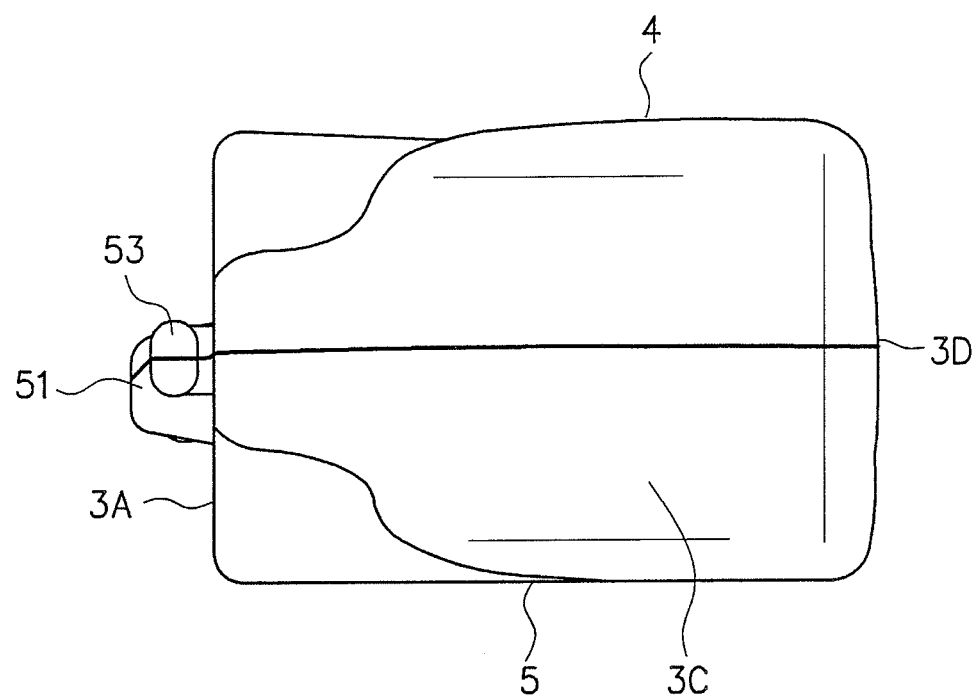
FIG. 27 is a diagram showing a configuration example, on side C (side of the lower wall 3C), of the shock absorber 10 shown in FIG. 19.
Figure 28:
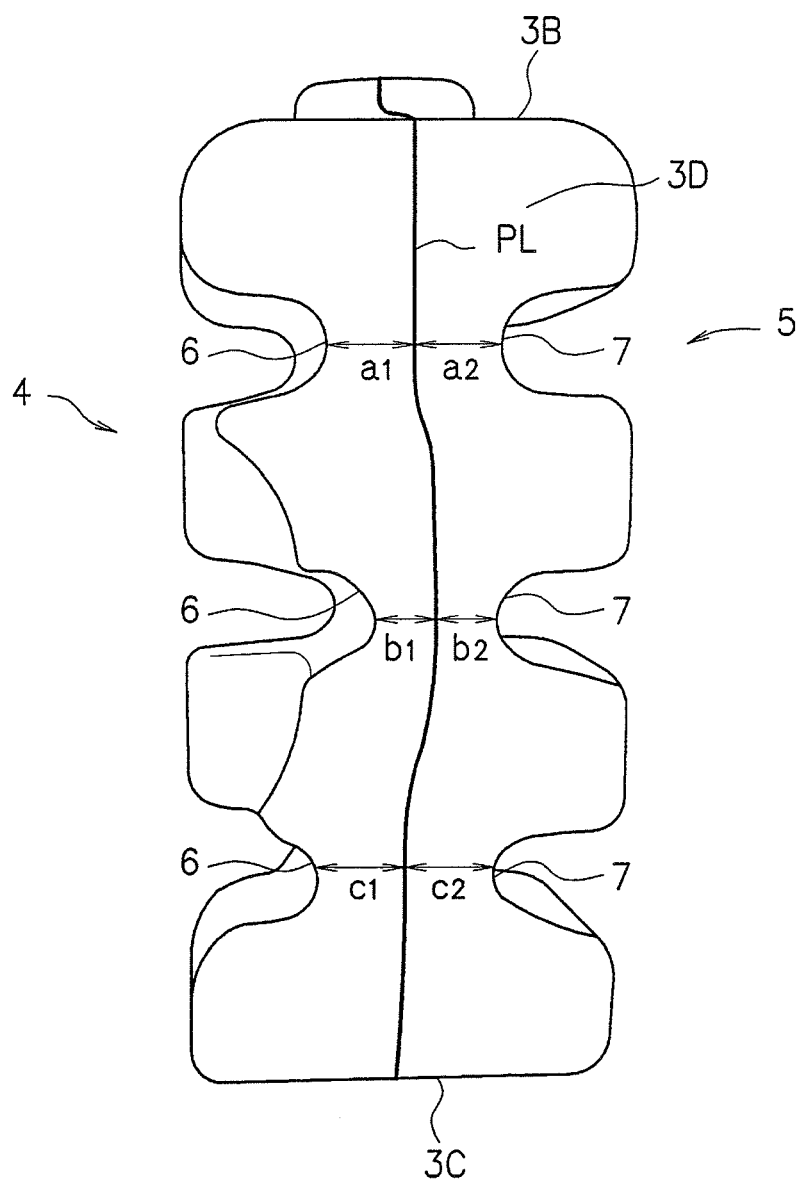
FIG. 28 is a diagram showing a configuration example, on side D (side of the front wall 3D), of the shock absorber 10 shown in FIG. 19.

First, referring to FIGS. 19 to 28, description will be given of a configuration example of the shock absorber 10 of the present embodying mode. FIG. 19 is a diagram showing an overall configuration example of the shock absorber 10 of the present embodying mode and the attaching object 20 onto which the shock absorber 10 is attached, FIG. 20 shows a cross-sectional configuration example along line 20X-20X' of the shock absorber 10 shown in FIG. 19, FIG. 21 shows a cross-sectional configuration example along line 21X-21X' of the shock absorber 10 shown in FIG. 19, and FIG. 22 shows a cross-sectional configuration example along line 22X-22X' of the shock absorber 10 shown in FIG. 19. FIG. 23 shows a configuration example of the shock absorber 10 shown in FIG. 19 on the side of the first sidewall 4 and FIG. 24 shows a configuration example of the shock absorber 10 shown in FIG. 19 on the side of the second sidewall 5. FIG. 25 shows a configuration example of the shock absorber 10 shown in FIG. 19 on side A (side of the rear wall 3A) and FIG. 26 shows a configuration example of the shock absorber 10 shown in FIG. 19 on side B (side of the upper wall 3B). FIG. 27 shows a configuration example of the shock absorber 10 shown in FIG. 19 on side C (side of the lower wall 3C) and FIG. 28 shows a configuration example of the shock absorber 10 shown in FIG. 19 on side D (side of the front wall 3D). Incidentally, in conjunction with the present embodying mode, description will be given of a situation in which a sheet of metal is employed as the attaching object 20. However, the attaching object 20 is not limited to the sheet of metal, but any member may be applicable.

The shock absorber 10 of the present embodying mode is molded in a hollow shape by conducting blow molding on thermoplastic resin and includes, as shown in FIG. 20, a plurality of groove-shaped ribs 6 and 7 formed by depressing, respectively toward the opposing sides, the first sidewall 4 and the second sidewall 5 opposing to each other of the body 3 including a hollow section 2. The groove-shaped ribs 6 and 7 formed on the first sidewall 4 and the second sidewall 5 extend as shown in FIG. 19 from the front wall 3D to the rear wall 3A, and the extending direction thereof is favorably equal to the direction of shock. This makes it possible to increase rigidity against shock from the direction of shock.

In the shock absorber 10 of the present embodying mode, the front wall 3D shown in FIG. 28 receives shock and then the shock received by the front wall 3D is propagated, via the rear wall 3A, which opposes the front wall 3D and which is shown in FIG. 25, to the attaching object 20. In the shock absorber 10 of the present embodying mode, the parting line PL extends along the upper wall 3B, the front wall 3D, the lower wall 3C, and the rear wall 3A, to enhance rigidity of the shock absorber 10. This makes it possible that when the front wall 3D receives shock, the shock absorber 20 is not easily cracked.

When the shock absorber 10 of the present embodying mode is employed as the knee bolster 106 described above, since the contour of the shock absorber 10 becomes small, the position of the load point (hit point) to receive shock is easily moved in the perpendicular direction or in the horizontal direction relative to the ideal position, and the incoming angle of shock at which the shock advances toward the front wall 3D is easily shifted in the perpendicular direction or in the horizontal direction relative to the ideal incoming angle. Incidentally, the movement described above takes place more remarkably in the perpendicular direction than in the horizontal direction. Therefore, in the shock absorber 10 of the present embodying mode, the parting line PL extends along the upper wall 3B, the front wall 3D, the lower wall 3C, and the rear wall 3A. As a result, it is possible that even the front wall 3D receives shock in a state wherein such movement takes place, the shock absorber 10 does not easily crack.

Also, for the front wall 3D, the parting line PL extends, as shown in FIG. 28, along the upper edge (side of the upper wall 3B) and the lower edge (side of the lower wall 3C), to increase rigidity of the front wall 3D. This makes it possible that when the front wall 3D receives shock, the front wall 3D does not easily crack.

Further, in the front wall 3D, the groove-shaped ribs 6 and 7 are disposed such that one and the same distance exists from the bottom sections of the groove-shaped ribs 6 and 7 to the parting line PL (a1=a2, b1=b2,c1=c2). Incidentally, the distances from the bottom sections of the groove-shaped ribs 6 and 7 to the parting line PL are the values measured in a state in which lines connecting the bottom sections of the groove-shaped ribs 6 and 7 to the parting line PL vertically intersect the parting line PL. In the front wall 3D, by equalizing the distance (a1,b1,c1) from the bottom section of the groove-shaped rib 6 disposed in the first sidewall 4 to the parting line PL to the distance (a2,b2,c2) from the bottom section of the groove-shaped rib 7 disposed in the second sidewall 5 to the parting line PL, it is possible to uniformalize the rib-shaped ribs 6 and 7 in thickness. As a result, even when the position of the load point (hit point) to receive shock on the front wall 3D is moved relative to the ideal position or even when the incoming angle of shock at which the shock advances toward the front wall 3D is shifted relative to the ideal incoming angle, a desired load can be stably retained and it is possible to secure a desired quantity of shock absorption.

Incidentally, the contour of the parting line PL is not particularly restricted only if the parting line PL meets the conditions above and extends along the upper edge (side of the upper wall 3B) and the lower edge (side of the lower wall 3C), and it is possible to configure it in any contour such as the contour of a straight line, the contour of a curved line, and the like. However, in the shock absorber 10 of the present embodying mode, since shock is received on the front wall 3D side and the rear wall 3A side is attached onto the attaching object 20, it is desired that no compression section CP remains in the parting line PL passing the front wall 3D and the rear wall 3A to form the surface thereof flat and the compression section CP remains in the parting line PL passing the upper wall 3B and the lower wall 3C. The compression section CP can be formed by welding thermoplastic resin clamped by a split mold when the shock absorber 10 is the molded. It is hence possible to prevent occurrence of crack from the parting line PL and to implement stable shock absorption.

Further, in the first sidewall 4 and the second sidewall 5 which are peripheral walls to link the front wall 3D with the rear wall 3A, there are formed, as shown in FIGS. 23 and 24, the groove-shaped ribs 6 and 7 extending from the front wall 3D to the rear wall 3A. The groove-shaped ribs 6 and 7 are formed in the first sidewall 4 and the second sidewall 5 such that the extending direction α of the groove-shaped ribs 6 and 7 and the vertical direction β vertical to the surface of the rear wall 3A form the predetermined angle θ therebetween. Incidentally, the predetermined angle θ is an angle for which the extending direction α of the groove-shaped ribs 6 and 7 is equal to the direction of shock when the rear wall 3A is attached onto the attaching object 20. This makes it possible that when the front wall 3D receives shock, rigidity thereof against the shock is increased and the groove-shaped ribs 6 and 7 efficiently absorb the shock.

Incidentally, in the present embodying mode, as shown in FIGS. 23 and 24, the slender groove-shaped ribs 6 and 7 are formed in series in the extending direction α; however, the ribs are not limited to the slender groove-shaped ribs 6 and 7, but ribs of any contour may be formed in series in the extending direction α. For example, it is also possible to form triangular or trapezoidal groove-shaped ribs 6 and 7 in series in the extending direction α. In this case, it is favorable that the groove-shaped rib 6 formed on the first sidewall 4 side is equal in the contour to the groove-shaped rib 7 formed on the second sidewall 5 side. This makes it possible that the shock is uniformly absorbed by both groove-shaped ribs 6 and 7.

Further, in the present embodying mode, the slender groove-shaped ribs 6 and 7 are successively formed in series in the extending direction α. However, it is also possible to form, without forming the groove-shaped ribs 6 and 7 in a part of the region in the extending direction α, the groove-shaped ribs 6 and 7 in an intermittent fashion (partly) in the extending direction α. Also in this case, since the extending direction α of the groove-shaped ribs 6 and 7 is equal to the direction of shock, the shock can be efficiently absorbed by the groove-shaped ribs 6 and 7. However, as in the present embodying mode, it is favorable that the groove-shaped ribs 6 and 7 are successively formed in series in the extending direction α. This makes it possible that the groove-shaped ribs 6 and 7 successively formed in the extending direction α are inflected to be convex in a direction to approach the mutually opposing first and second sidewalls 4 and 5 or in a direction to be apart from the mutually opposing first and second sidewalls 4 and 5. As a result, it is possible to further enhance the shock absorbing performance.

As thermoplastic resin to constitute the shock absorber 10 of the present embodying mode, known resin is applicable. The resin may include resin having high mechanical strength such as rigidity, the resin being, for example, polyolefin-based resin including polyethylene and polypropylene, styrene-based resin including polystyrene and ABS resin, polyester-based resin including polyethylene terephthalate, polyamide, and a mixture of these resins.

Also, in the range not to deteriorate mechanical strength (anti-shock property), there may be included one kind or two or more kinds of additives utilized in the relevant field, for example, fillers including silica and the like, pigments, dyes, thermal stabilizers, optical stabilizer, plasticizers, antistatic agents, fire retardants, flame retardants, antiaging agents, ultraviolet-ray absorbers, antioxidants, antifogging agents, and slip additives.

The shock absorber 10 of the present embodying mode includes, as shown in FIG. 19, an axial section 51 and removal preventing sections 52 and 53 which are projecting from the rear wall 3A of the body 3. The axial section 51 and the removal preventing sections 52 and 53 constitute an attaching section to attach the shock absorber 10 onto the attaching object 20. The body 3 includes six walls which are the upper wall 3B, the rear wall 3A, the lower wall 3C, the front wall 3D, the first sidewall 4, and the second sidewall 5; and the upper wall 3B, the first sidewall 4, the lower wall 3C, and the second sidewall 5 configure a peripheral wall of the body 3. The shock absorber 10 of the present embodying mode is configured, as shown in FIG. 19, such that the gap between the upper wall 3B and the lower wall 3C has a longer shape than the gap between the first sidewall 4 and the second sidewall 5.

The axial section 51 is configured in the shape of a frustum of circular cone, and as shown in FIG. 29, the axial section 51 is inserted in the axial hole 61 disposed in the attaching object 20 in association with the axial section 51 and the body 3 is rotated to be moved relative to the attaching object 20 by using the axial section 51 as the axis of rotation as shown in FIG. 30 in the configuration. Incidentally, the axial section 51 is not limited to the shape of a frustum of circular cone, but may be configured in an arbitrary shape such as a cylindrical shape only if the shape allows the rotation of the body 3 by using the axial section 51 as the axis.

Additionally, the removal preventing sections 52 and 53 are configured in a key shape having an inflected tip end, and as shown in FIG. 29, the removal preventing sections 52 and 53 are inserted in the attaching holes 62 and 63 corresponding to the removal preventing sections 52 and 53 disposed in the attaching object 20, and as shown in FIG. 30, when the body 3 is rotated relative to the attaching object 20 by using the axial section 51 as the axis of rotation, the body 3 is moved such that the attaching object 20 is interposed between part of bottom surfaces of the restricting sections 52b and 53b disposed on the tip ends of the removal preventing sections 52 and 53 and the surface of the body 3, and part of bottom surfaces of the restricting sections 52b and 53b disposed on the tip ends of the removal preventing sections 52 and 53 are placed over the attaching object 20, to thereby restrict the removal of the removal preventing sections 52 and 53 from the attaching holes 62 and 63. This makes it possible to install the shock absorber 10 in a car. However, to install the shock absorber 10 of the present embodying mode in a car, it is required that the attaching object 20 is beforehand mounted on a part of the car. As a result, the shock absorber 10 of the present embodying mode can be easily installed in the car without using attaching tools such as vis and screws.

Further, as for the shock absorber 10 of the present embodying mode, the shock absorber 10 can be attached onto the attaching object 20 by use of the axial section 51 and the removal preventing sections 52 and 53 disposed in the rear wall 3A; hence, it is possible to reduce the installation space to attach the shock absorber 10 onto the attaching object 20. For example, as in the prior art, when the attaching section is disposed in the peripheral walls 3B, 4, 3C, and 5 other than the rear wall 3A, there is required an excessive space for the attaching section, and the installation space is enlarged. In contrast thereto, in the shock absorber 10 of the present embodying mode, the attaching sections (the axial section 51, the removal preventing sections 52, 53) are disposed in the rear wall 3A and the shock absorber 10 is attached onto the attaching object 20 by use of the attaching sections 51, 52, 53; hence, it is possible that installation space is reduced and the limited installation space is efficiently utilized. Also, in the shock absorber 10 of the present embodying mode, the shock absorber 10 is attached onto the attaching object 20 by use of the axial section 51 and the removal preventing sections 52, 53 disposed in the rear wall 3A; hence, as shown in FIG. 20, a depression 40 can be formed by depressing part of the first sidewall 4 as the peripheral wall toward the inside. As a result, when the area of the peripheral wall is reduced and the shock absorber 10 is installed in the installation space, it is possible to prevent interference with other car constituting members. The position and the shape to form the depression 40 are not particularly limited and it is possible to arbitrarily form it based on the installation space and the relationship of installation for the other car constituting members.

The axial section 51 of the present embodying mode is formed, as shown in FIG. 21, in a hollow shape by blow molding to enhance rigidity. Incidentally, the hollow section 8 formed in the axial section 51 is integral with the hollow section 2 formed in the body 3 and air is able to flow between the hollow section 2 of the body 3 and the hollow section 8 of the axial section 51 in the configuration.

Also, the axial hole 61 corresponding to the axial section 51 is configured in a shape equal in size to the outer shape of the axial section 51, to rotate the axial section 51 in the axial hole 61. For example, when the axial section 51 is configured in the frustum of circular cone, the axial hole 61 is configured in a circular shape.

Further, the removal preventing sections 52, 53 of the present embodying mode are formed, as shown in FIG. 22, in a hollow shape by blow molding, to enhance rigidity. While FIG. 22 shows a configuration example of one removal preventing section 53, the other one removal preventing section 52 is also configured in almost the same way as for the configuration shown in FIG. 22. In addition, the hollow sections 9 formed in the removal preventing sections 52, 53 are integral with the hollow section 2 formed in the body 3 and air is able to flow between the hollow section 2 of the body 3 and the hollow sections 9 of the removal preventing sections 52, 53 in the configuration.

Also, the removal preventing sections 52, 53 include, as shown in FIG. 23, axial sections 52a and 53a to make contact with the rear wall 3A of the body 3 and the restricting sections 52b and 53b projecting from tip ends of the axial sections 52a and 53a, and as shown in FIGS. 29 and 30, when the body 3 is rotated to be moved by using the axial section 51 as the axis of rotation, the body 3 is placed on one surface of the attaching object 20, the restricting sections 52b and 53b are placed on the other surface of the attaching object 20, and the axial sections 52a and 53a are placed at the attaching holes 62 and 63 in the configuration. As a result, when the body 3 is rotated to be moved by using the axial section 51 as the axis of rotation, part of the restricting sections 52b and 53b overlap with the attaching object 20, to thereby restrict removal of the removal preventing sections 52 and 53 from the attaching holes 62 and 63.

Further, in the removal preventing sections 52, 53 of the present embodying mode, thin sections (burrs) 52c and 53c are formed between the restricting sections 52b and 53b and the body 3, and when the body 3 is rotated to be moved by using the axial section 51 as the axis of rotation, the thin sections (burrs) 52c and 53c are deformed by the attaching object 20 such that the restricting sections 52b and 53b are tightly brought into contact with the surface of the attaching object 20 and the rear surface of the attaching object 20 is tightly brought into contact with the body 3 by use of the thin sections (burrs) 52c and 53c. This makes it possible to fix the attaching object 20 in the state in which part of the restricting sections 52b and 53b overlap with the attaching object 20.

Also, when the shock absorber 10 of the present embodying mode is formed by blow molding, the thin sections (burrs) 52c and 53c are inevitably formed between the restricting sections 52b and 53b disposed in the tip ends of the removal preventing sections 52 and 53 and the body 3; however, when the body 3 is rotated to be moved by using the axial section 51 as the axis of rotation, the thin sections (burrs) 52c and 53c can be deformed by the attaching object 20; hence, it is not required to cut off the thin sections (burrs) 52c and 53c after the blow molding, and the post-processing (the finishing process such as the removing of burrs) after the blow molding can be simplified.

In the shock absorber 10 of the present embodying mode, the axial section 51 and the removal preventing sections 52 and 53 are disposed on the parting line PL. This makes it possible to increase strength of the parting line PL on the rear wall 3A. As a result, when the shock absorber 10 receives shock, it is possible to prevent crack in the parting line PL on the rear wall 3A and the shock absorbing performance can be secured.

In addition, the rear wall 3A of the present embodying mode includes, as shown in FIGS. 21 and 22, a convex section 30 projecting toward the attaching object, not shown. It is favorable that the convex section 30 is formed on both sides (side of the first sidewall 4 and side of the second sidewall 5) of the parting line PL (positions at which the axial section 51 and the removal preventing sections 52 and 53 are disposed) formed on the rear wall 3A. Hence, when the rear wall 3A is attached onto the attaching object, the convex sections 30 formed on both sides (side of the first sidewall 4 and side of the second sidewall 5) of the rear wall 3A, rather than the positions of the parting line PL (positions at which the axial section 51 and the removal preventing sections 52 and 53 are disposed), make contact with the attaching object, to serve as a support of the body 3; hence, the shock absorber 10 does not easily fall down and it is possible to stably fix the shock absorber 10 on the attaching object. Also, even when shock is received by the front wall 3D, since the convex sections 30 formed on both sides (side of the first sidewall 4 and side of the second sidewall 5) of the rear wall 3A opposing the front wall 3D make contact with the attaching object, it is possible to prevent the lateral fall-down and the rotation of the shock absorber 10.

Also, the shock absorber 10 of the present embodying mode includes, as shown in FIGS. 21 and 22, a thin section 31 in a corner to couple the front wall 3D to the sidewalls (the first sidewall 4 and the second sidewall 5). Thickness of the thin section 31 is configured in a range from 30% to 70% of the mean thickness of the wall sections of the shock absorber 10. The thin section 31 can be formed by adjusting the curved shape of the corner which couples the front wall 3D with the sidewalls (the first sidewall 4 and the second sidewall 5). That is, by reducing the radius of curvature of the mold to form the corner, it is possible to produce the corner as a thin section.

Further, the shock absorber 10 of the present embodying mode includes, as shown in FIG. 20, a thin section 31 in the sections of the groove-shaped ribs 6 and 7 formed in the first sidewall 4 and the second sidewall 5. In this case, by increasing the quantity of extension of resin in the sections to form the groove-shaped ribs 6 and 7, it is possible to form the thin section 31. That is, when the curved shape of the mold to form the groove-shaped ribs 6 and 7 is made to be sharp (the radius of curvature is reduced), it is possible to form the thin section 31.

The shock absorber 10 of the present embodying mode includes, as shown in FIGS. 21 and 22, a thin section 31 in a corner to couple the front wall 3D to the sidewalls (the first sidewall 4 and the second sidewall 5) and, as shown in FIG. 20, in the sections of the groove-shaped ribs 6 and 7 formed in the sidewalls (the first sidewall 4 and the second sidewall 5); hence, when the shock absorber 10 receives shock, the positions of the thin section 31 preferentially buckle. As a result, when shock is received, the shock absorber 10 starts buckling without acting against the shock, and it is possible to efficiently absorb the shock. Also, even when the position of the load point (hit point) to receive shock by the front wall 3D is moved relative to the ideal position or the incoming angle of shock at which the shock advances toward the front wall 3D is shifted relative to the ideal incoming angle, the thin section 31 efficiently absorbs the shock; hence, it is possible to prevent the lateral fall-down and the rotation of the shock absorber 10.

The mean thickness of the wall sections constituting of the shock absorber 10 of the present embodying mode is configured in a range from 0.7 mm to 5.0 mm, and the thin section 31 described above is favorably configured with thickness in the range from 30% to 70% of the mean thickness. This makes it possible to efficiently absorb the shock.

Incidentally, the mean thickness can be calculated as below. For example, in the cross-sections at three points in the upper-end side (side of the upper wall 3B), the center, and the lower-end side (side of the lower wall 3C) of the sidewalls (the first sidewall 4 and the second sidewall 5) shown in FIG. 20 (however, the positions where the groove-shaped ribs 6 and 7 are not formed and the positions other than the corners coupling the front wall 3D with the sidewalls (the first sidewall 4 and the second sidewall 5)), thickness is measured by a vernier caliper at portions (six positions in total) of intersecting points of a perpendicular bisector of a straight line connecting two mold split points, and a mean value of the resultant six measured values is calculated as the mean thickness. This makes it possible to calculate the mean thickness of the wall sections constituting the shock absorber 10.

Figure 31:
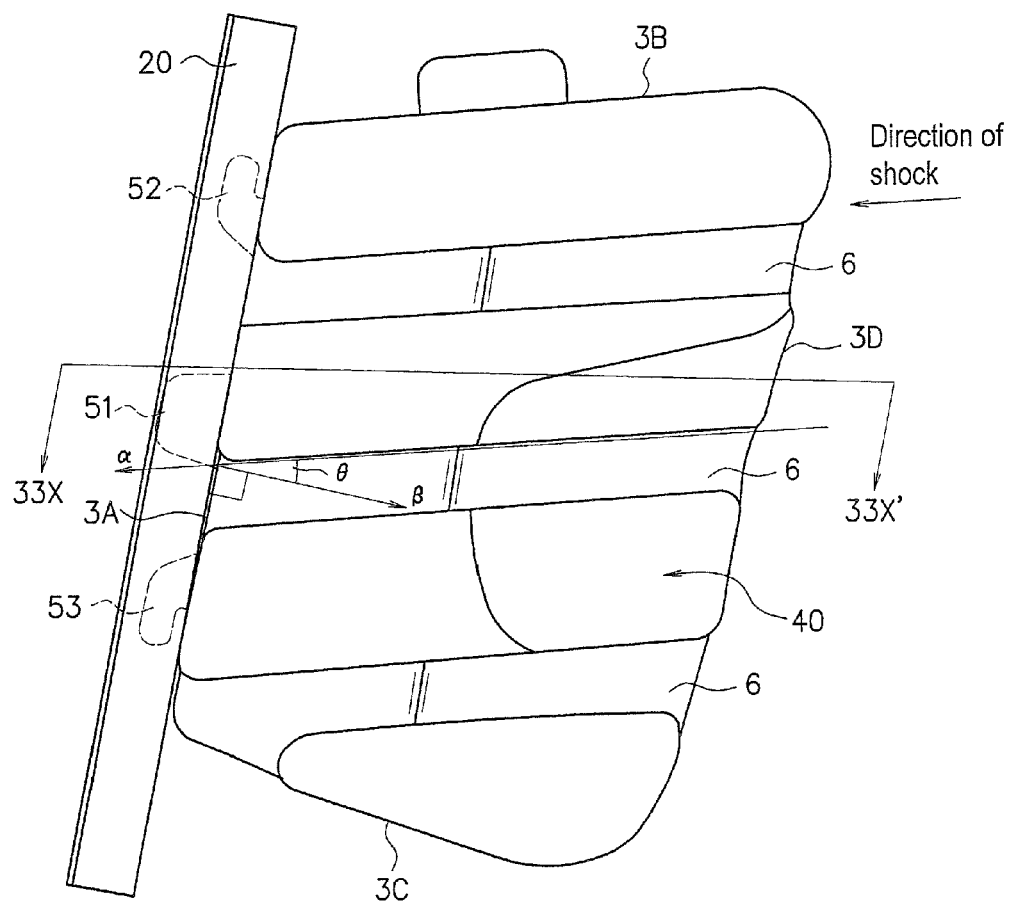
FIG. 31 is a diagram showing a configuration example, on the side of the first sidewall 4, of the shock absorber 10 attached onto the attaching object 20.
Figure 32:
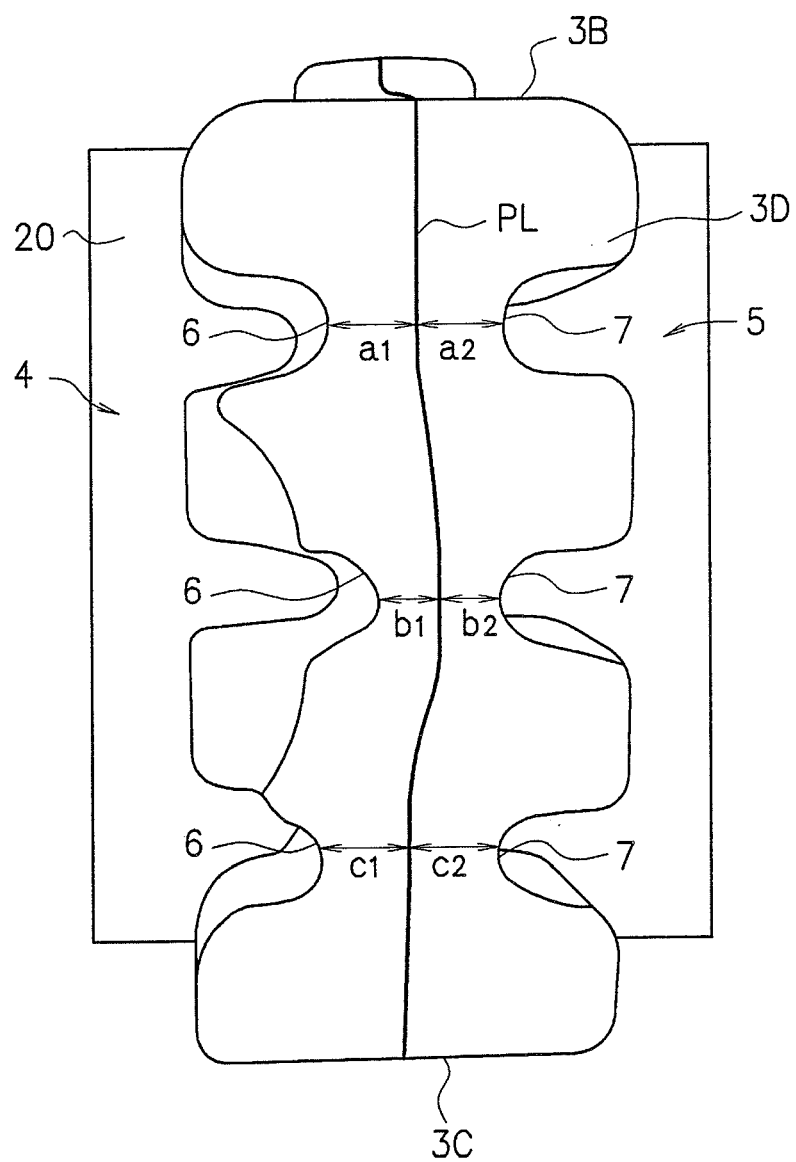
FIG. 32 is a diagram showing a configuration example, on the side of the front wall 3D, of the shock absorber 10 attached onto the attaching object 20.
Figure 33:
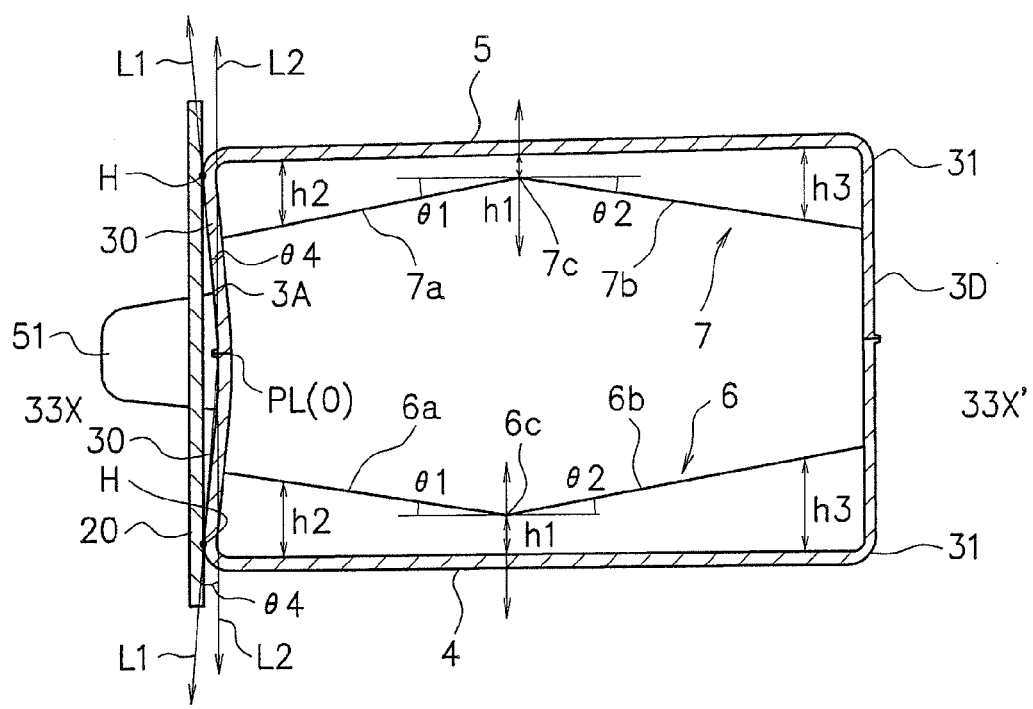
FIG. 33 is a diagram showing a cross-sectional configuration example along line 33X-33X' shown in FIG. 31.

To attach the shock absorber 10 of the present embodying mode onto the attaching object 20, the axial section 51 is inserted in the axial hole 61 and the removal preventing sections 52 and 53 are inserted in the attaching holes 62 and 63 as shown in FIG. 29. Next, by using the axial section 51 as the axis of rotation, the body 3 is rotated to be moved by a predetermined angle (for example, 30°) relative to the attaching object 20 as shown in FIG. 30, to set a state in which part of the restricting sections 52b and 53b disposed at the tip ends of the removal preventing sections 52 and 53 overlap the attaching object 20. This makes it possible to restrict the removal of the axial section 51 and the removal preventing sections 52 and 53 from the axial hole 61 and the attaching holes 62 and 63, and the shock absorber 10 can be attached onto the attaching object 20 as shown in FIGS. 31 to 33. Incidentally, FIGS. 31 to 33 show a state in which the shock absorber 10 is attached onto the attaching object 20; FIG. 31 shows a state viewed from the side of the first sidewall 4 as the peripheral wall of the shock absorber 10, FIG. 32 shows a state viewed from the side of the front wall 3D, and FIG. 33 is a diagram showing a cross-sectional configuration example along line 33X-33X' shown in FIG. 31.

In the shock absorber 10 of the present embodying mode, as shown in FIG. 31, the groove-shaped rib 6 extending from the front wall 3D to the rear wall 3A is formed in the first sidewall 4 such that the extending direction α of the groove-shaped rib 6 and the vertical direction β vertical to the rear wall 3A form the predetermined angle θ therebetween. Hence, the groove-shaped rib 6 extends in a direction inclined relative to the vertical direction β vertical to the rear wall 3A. Consequently, as shown in FIG. 31, when the rear wall 3A is attached onto the attaching object 20, it is possible to make the extending direction α of the groove-shaped rib 6 equal to the direction of shock. As a result, it is possible that when the front wall 3D receives shock, rigidity thereof against the shock is increased and the groove-shaped rib 6 efficiently absorbs the shock. Incidentally, while FIG. 31 shows the extending direction α of the groove-shaped rib 6 on the side of the first sidewall 4, also the extending direction α of the groove-shaped rib 7 on the side of the second sidewall 5 is the same as for the groove-shaped rib 6 on the side of the first sidewall 4. FIG. 31 shows a state viewed from a direction vertical to the first sidewall 4, and the extending direction α of the groove-shaped rib 6 is inclined with respect to the vertical direction β vertical to the rear wall 3A.

Also, in the front wall 3D of the shock absorber 10 of the present embodying mode, as shown in FIG. 32, the parting line PL extends along the upper edge (side of the upper wall 3B) and the lower edge (side of the lower wall 3C), to increase rigidity of the front wall 3D. Hence, it possible that when the front wall 3D receives shock, the front wall 3D does not easily crack. Further, in the front wall 3D, the groove-shaped ribs 6 and 7 are disposed such that one and the same distance exists from the bottom sections of the groove-shaped ribs 6 and 7 to the parting line PL (a1=a2, b1=b2,c1=c2). As a result, even when the position of the load point (hit point) to receive shock on the front wall 3D is moved relative to the ideal position or even when the incoming angle of shock at which the shock advances toward the front wall 3D is shifted relative to the ideal incoming angle, a desired load can be stably retained and it is possible to secure a desired quantity of shock absorption.

Further, in the shock absorber 10 of the present embodying mode, as shown in FIG. 19, the axial section 51 and the removal preventing sections 52 and 53 are integrally formed on the rear surface 3A to be aligned on one straight line. Hence, as shown in FIG. 30, the positions to attach the shock absorber 10 onto the attaching object 20 can be aligned on one straight line.

Additionally, the rear wall 3A of the shock absorber 10 of the present embodying mode includes, as shown in FIG. 33, the convex section 30 projecting toward the attaching object 20; the convex section 30 is formed on both sides (side of the first sidewall 4 and side of the second sidewall 5) of the parting line PL (positions at which the axial section 51 and the removal preventing sections 52 and 53 are disposed) formed on the rear wall 3A. Hence, when the rear wall 3A is attached onto the attaching object 20, the convex sections 30 formed on both sides (side of the first sidewall 4 and side of the second sidewall 5) of the rear wall 3A make contact with the attaching object 20, to serve as a support of the body 3; hence, the shock absorber 10 does not easily fall down and it is possible to stably fix the shock absorber 10 onto the attaching object 20. Also, even when shock is received by the front wall 3D, since the convex sections 30 formed on both sides (side of the first sidewall 4 and side of the second sidewall 5) of the rear wall 3A make contact with the attaching object 20, it is possible to prevent the lateral fall-down and the rotation of the shock absorber 10.

Incidentally, the convex sections 30 formed on both sides of the rear wall 3A of the present embodying mode are configured, as shown in FIG. 33, such that the quantity of projection is continuously increased as they are apart from the parting line PL (positions at which the axial section 51 and the removal preventing sections 52 and 53 are disposed) toward both edges (side of the first sidewall 4 and side of the second sidewall 5). However, they may be configured such that the quantity of projection is partially increased. Incidentally, as for the quantity of projection, it is favorable that angle θ4 formed between line L1 connecting position PL(0) at which the parting line PL is formed on the rear wall 3A to vertex H of the position at which convex section 30 is formed and the unclamping direction L2 of the split mold to form the shock absorber 10 is in a range from 0° to 4°. In this regard, when the angle θ4 is 0°, the quantity of projection is 0. When the quantity of each projection on both edges (side of the first sidewall 4 and side of the second sidewall 5) of the parting line PL is 0, the convex sections 30 formed on both sides of the rear wall 3A are flat, and the surfaces of the rear wall 3A on both sides of the parting line PL are placed on one and the same plane. Also in this case, since the rear wall 3A on both sides (side of the first sidewall 4 and side of the second sidewall 5) of the parting line PL makes contact with the attaching object 20, it is possible to prevent the lateral fall-down and the rotation of the shock absorber 10.

Figure 34:
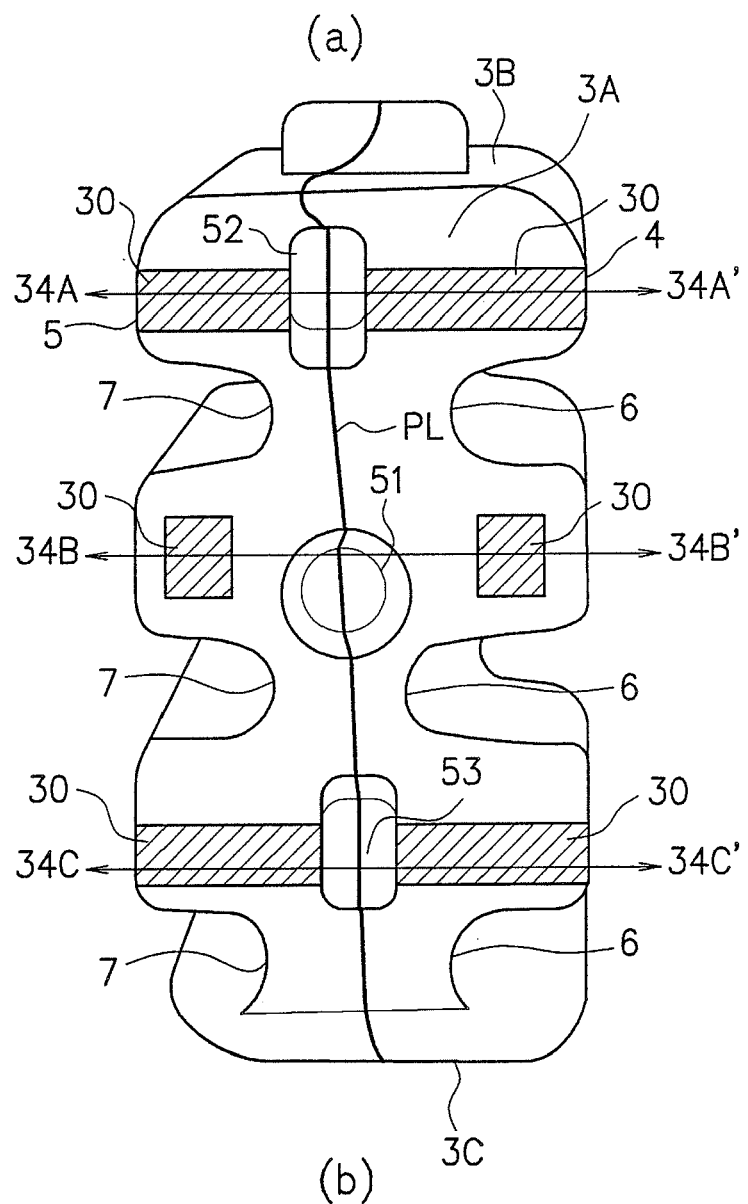
FIG. 34 is a diagram showing a configuration example of the rear wall 3A.
Figure 34:
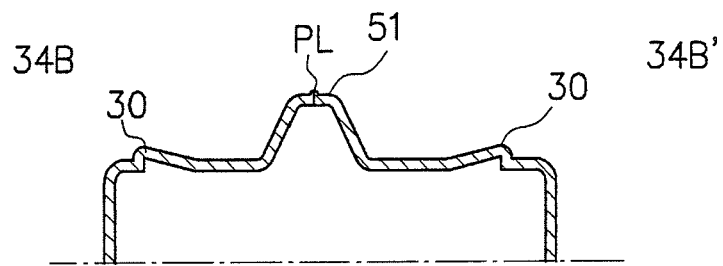

The convex sections 30 formed on the rear wall 3A of the present embodying mode may be formed, for example, in a configuration example shown in FIG. 34 (a). FIG. 34 (a) shows a configuration example on the side of the rear wall 3A and a configuration example in which the convex sections 30 are formed in partial areas of the rear wall 3A. The band-shaped convex section 30 on line 34A-34A' and the band-shaped convex section 30 on line 34C-34C' shown in FIG. 34 (a) may be formed, like the convex sections 30 shown in FIG. 33, in the configuration in which the quantity of projection is continuously increased as they are apart from the parting line PL toward both edges (side of the first sidewall 4 and side of the second sidewall 5). Also, they may be configured such that the quantity of projection is 0 from the parting line PL to both edges (side of the first sidewall 4 and side of the second sidewall 5). Further, they may be configured such that the quantity of projection discontinuously varies between the parting line PL and both edges (side of the first sidewall 4 and side of the second sidewall 5). Incidentally, in the areas other than the convex sections 30, the quantity of projection decreases as they are apart from the parting line PL toward both edges (side of the first sidewall 4 and side of the second sidewall 5) as in the prior art in the configuration; hence, even in a state in which the quantity of projection of the convex sections 30 is 0, it is resultantly possible to configure a state in which the portions of the sections 30 on both sides of the parting line PL are projecting.

Further, the rectangular convex sections 30 on line 34B-34B' shown in FIG. 34 (a) are in a state in which they are formed in some of the intervals from the parting line PL to both edges (side of the first sidewall 4 and side of the second sidewall 5), and the convex sections 30 formed in the intervals may be configured such that the quantity of projection continuously increases from the side of the parting line PL to the sides of both edges (side of the first sidewall 4 and side of the second sidewall 5) or the quantity of projection is 0 (flat shape) from the side of the parting line PL to the sides of both edges. The cross-sectional shape of the rear wall 3A on line 34B-34B' shown in FIG. 34 (a) may be configured, for example, as shown in FIG. 34 (b), by forming the convex sections 30 with an arbitrary quantity of projection in some intervals of the rear wall 3A. The convex sections 30 shown in FIG. 34 (b) show a configuration example of a situation in which the quantity of projection continuously increases from the side of the parting line PL to the sides of both edges (side of the first sidewall 4 and side of the second sidewall 5).

Incidentally, although the convex sections 30 shown in FIG. 34 (a) are formed in partial areas of the rear wall 3A, it is also possible to form them in all areas of the rear wall 3A. In this case, they are configured such that the quantity of projection continuously increases as they are apart from the parting line PL toward both edges (side of the first sidewall 4 and side of the second sidewall 5) or the quantity of projection is 0 from the parting line PL to both edges (side of the first sidewall 4 and side of the second sidewall 5).

Figure 35:
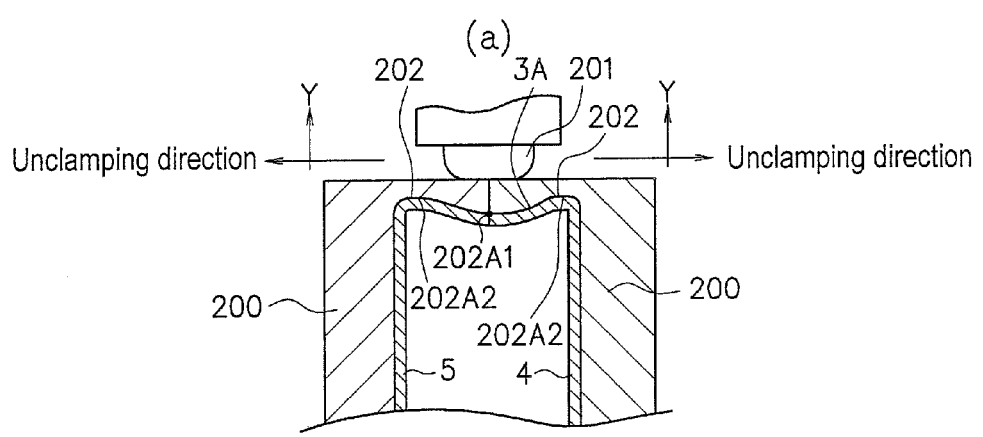
FIG. 35 is a diagram showing a configuration example of a split mold 200 to form the rear wall 3A.
Figure 35:
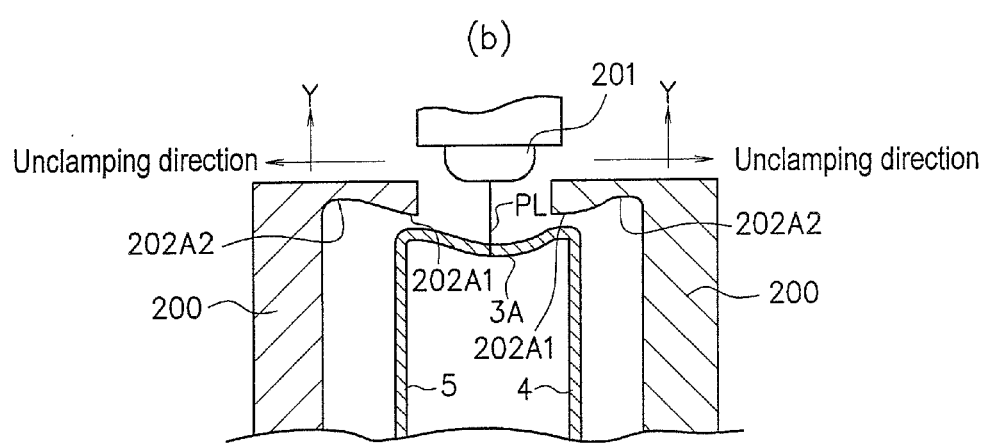

Incidentally, when forming the rear wall 3A including the convex section 30 to prevent the lateral fall-down and the rotation described above, a split mold 200 including a cavity surface 202 shown in FIG. 35 is employed. In the split mold 200 shown in FIG. 35, the cavity surface 202 to form the rear wall 3A including the convex section 30 described above includes a concave section 202A2 depressed in the vertical direction Y vertical to the unclamping direction of the split mold 200. This makes it possible to form the rear wall 3A including the convex sections 30 shown in FIGS. 33 and 34. Incidentally, by forming the concave section 202A2 such that the quantity of depression in the vertical direction Y vertical to the unclamping direction of the split mold 200 continuously increases as it is apart from a cutoff section 202A1 to form the parting line PL, even when the cavity surface 202 includes the concave section 202A2, it is possible that the shock absorber 10 as the molded product is easily removed from the split mold 200.

Additionally, the groove-shaped ribs 6 and 7 of the present embodying mode inflect, as shown in FIG. 33, to be convex in the direction to be apart from the opposing sidewalls (the first sidewall 4 and the second sidewall 5); and even when the incoming angle of shock at which the shock advances toward the front wall 3D is different from the ideal incoming angle, it is possible to absorb the shock. The groove-shaped ribs 6 and 7 shown in FIG. 33 are configured in an inflected shape to be convex in the direction (outside direction) to be apart from the opposing first and second sidewalls 4 and 5, and the inflection angle θ3 of the groove-shaped ribs 6 and 7 is favorably in a range from 1° to 10°. In a case in which the inflection angle θ3 of the groove-shaped ribs 6 and 7 is less than 1°, the shock absorber 10 easily falls down when the incoming angle of shock at which the shock advances toward the front wall 3D is different from the ideal incoming angle; further, when it is equal to or more than 10°, the rigidity is weakened. Hence, it is favorable that the inflection angle θ3 of the groove-shaped ribs 6 and 7 is in a range from 1° to 10°. The groove-shaped ribs 6 and 7 shown in FIG. 33 show the first sidewall 4 and the second sidewall 5 in the portions constituting the bottom sections of the groove-shaped ribs 6 and 7.

The inflection angle θ3 of the groove-shaped ribs 6 and 7 is an angle at which the groove-shaped ribs 6 and 7 themselves are inflected; and for example, the inflection angle θ3 of the groove-shaped rib 6 disposed on the side of the first sidewall 4 is the total (θ3=θ1+θ2) of the angle (θ1,θ2) formed between the first sidewall 4 in the portion constituting the bottom section of the groove-shaped rib 6 and the first sidewall 4 in the portion in which the groove-shaped rib 6 is not formed and which constitutes the flat surface.

The groove-shaped rib 6 includes a first groove-shaped rib 6a and a second groove-shaped rib 6b, and a coupling section 6c between the first groove-shaped rib 6a and the second groove-shaped rib 6b configures an inflected section to be convex in the direction to be apart from the second sidewall 5. The inflection angle θ3 of the groove-shaped rib 6 includes the angle θ1 formed between the first sidewall 4 in the portion constituting the bottom section of the first groove-shaped rib 6a and the first sidewall 4 in the portion in which the groove-shaped rib 6 is not formed and which constitutes the flat surface and the angle θ2 formed between the first sidewall 4 in the portion constituting the bottom section of the second groove-shaped rib 6b and the first sidewall 4 in the portion in which the groove-shaped rib 6 is not formed and which constitutes the flat surface (θ3=θ1+θ2).

Further, the inflection angle θ3 of the groove-shaped rib 7 disposed on the side of the second sidewall 5 is, like the inflection angle θ3 of the groove-shaped rib 6 described above, also the total (θ3=θ1+θ2) of the angle (θ1+θ2) formed between the second sidewall 5 in the portion constituting the bottom section of the groove-shaped rib 7 and the second sidewall 5 in the portion in which the groove-shaped rib 7 is not formed and which constitutes the flat surface.

The groove-shaped rib 7 includes a first groove-shaped rib 7a and a second groove-shaped rib 7b, and a coupling section 7c between the first groove-shaped rib 7a and the second groove-shaped rib 7b configures an inflected section to be convex in the direction to be apart from the first sidewall 4. The inflection angle θ3 of the groove-shaped rib 7 includes the angle θ1 formed between the second sidewall 5 in the portion constituting the bottom section of the first groove-shaped rib 7a and the second sidewall 5 in the portion in which the groove-shaped rib 7 is not formed and which constitutes the flat surface and the angle θ2 formed between the second sidewall 5 in the portion constituting the bottom section of the second groove-shaped rib 7b and the second sidewall 5 in the portion in which the groove-shaped rib 7 is not formed and which constitutes the flat surface (θ3=θ1+θ2).

Incidentally, between the first groove-shaped rib 6a and the second groove-shaped rib 6b constituting the groove-shaped rib 6 of the present embodying mode, there exists symmetry with respect to the plane including the coupling section 6c. Similarly, between the first groove-shaped rib 7a and the second groove-shaped rib 7b constituting the groove-shaped rib 7, there exists symmetry with respect to the plane including the coupling section 7c. Hence, θ1 and θ2 show in FIG. 33 are equal in angle to each other (θ1=θ2).

Moreover, between the groove-shaped rib 6 and the groove-shaped rib 7, there exists symmetry with respect to the plane (the plane parallel to the first sidewall 4 and the second sidewall 5) including an area at a position of an intermediate point between the bottom section of the groove-shaped rib 6 and that of the groove-shaped rib 7. Hence, when shock is received by the front wall 3D, the groove-shaped ribs 6 and 7 uniformly buckle and it is possible to uniformly absorb the shock.

Figure 36:
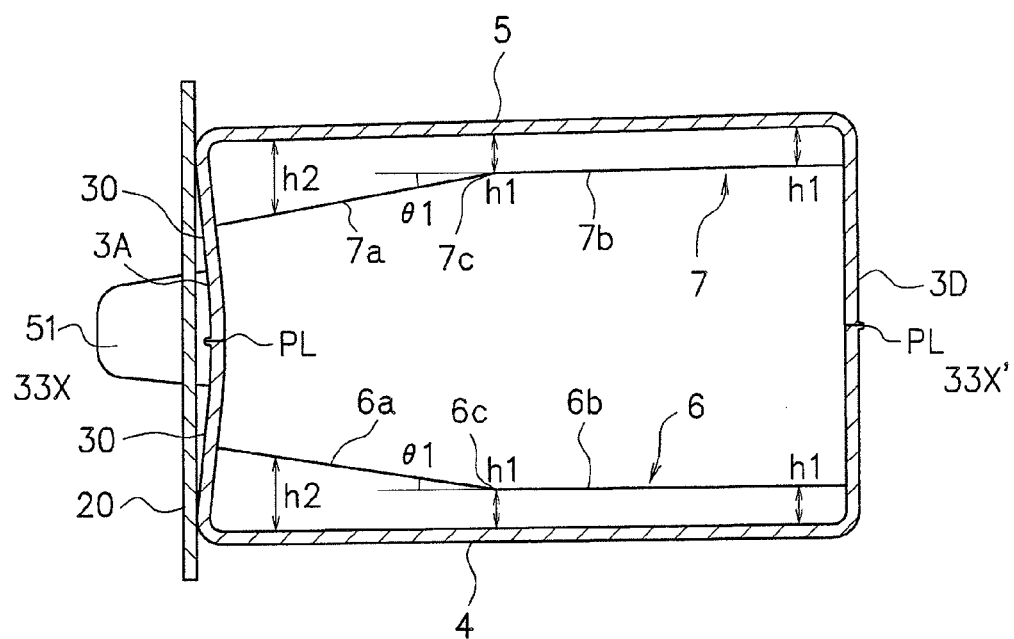
FIG. 36 is a diagram showing an inflection configuration example of groove-shaped ribs 6 and 7.

Incidentally, although the groove-shaped ribs 6 and 7 shown in FIG. 33 are configured in an inflected shape to be convex in the direction (outside direction) to be apart from the opposing first and second sidewalls 4 and 5, they may be configured in an inflected shape to be convex in the direction (inside direction) to approach the opposing first and second sidewalls 4 and 5. Also, the groove-shaped ribs 6 and 7 shown in FIG. 33 are configured in a shape in which depth h2 of the groove-shaped ribs 6 and 7 on the side of the rear wall 3A and depth h3 of the groove-shaped ribs 6 and 7 on the side of the front wall 3D are larger than depth h1 of the groove-shaped ribs 6 and 7 in the vicinity of the center (h1<h2 and h1<h3). However, as shown in FIG. 36, it is also possible that the depth of the groove-shaped ribs 6 and 7 is the same depth h1 from the front wall 3D to the vicinity of the center and the depth h2 of the groove-shaped ribs 6 and 7 on the side of the rear wall 3A is larger in the configuration (h1<h2). Incidentally, the inflection angle θ3 of the groove-shaped ribs 6 and 7 shown in FIG. 36 is the angle θ1 formed between the sidewalls 4 and 5 in the portions constituting the bottom sections of the first groove-shaped ribs 6a and 7a and the sidewalls 4 and 5 in the portions in which the groove-shaped ribs 6 and 7 are not formed and which constitute the flat surfaces.

As above, when the groove-shaped ribs 6 and 7 disposed on the first sidewall 4 and second sidewall 5 which are the peripheral walls coupling the front wall 3D with the rear wall 3A are inflected, the shock can be efficiently absorbed at the inflected positions. Incidentally, the groove-shaped ribs 6 and 7 shown in FIGS. 33 and 36 show a configuration example in which they are inflected in the vicinity of the center between the rear wall 3A and the front wall 3D; however, the positions of the inflection are not limited to the vicinity of the center, but they may also be inflected at an arbitrary position in the configuration example.

Also, in the shock absorber 10 of the present embodying mode, the axial section 51 is disposed in the center of the rear wall 3A and the removal preventing sections 52 and 53 are disposed on both sides of the axial section 51. By disposing the axial section 51 in the center of the rear wall 3A, the radius of rotation of the body 3 can be reduced and it is possible to minimize the space required for the attaching operation of the shock absorber 10. For example, in a situation wherein the axial section 51 is disposed in the vicinity of one edge section of the rear wall 3A and at least one removal preventing section 52 is disposed in the vicinity of the other edge section of the rear wall 3A, the body 3 is rotated by use of the axial section 51 as the axis of rotation, to insert the removal preventing section 52 in the attaching hole 62 corresponding to the removal preventing section 52; hence, the radius of rotation of the body 3 is increased. In contrast thereto, in a situation wherein the axial section 51 is disposed in the vicinity of the center of the rear wall 3A and the removal preventing sections 52 and 53 are disposed in the vicinity of both edges of the rear wall 3A, the body 3 is rotated by use of the axial section 51 as the axis of rotation, to insert the removal preventing sections 52 and 53 in the attaching holes 62 and 63 corresponding to the removal preventing sections 52 and 53; hence, the radius of rotation of the body 3 is reduced. That is, when the axial section 51 is disposed in the center of the rear wall 3A and the removal preventing sections 52 and 53 are disposed on both sides of the axial section 51, it is possible to minimize the radius of rotation of the body 3. Further, by disposing the removal preventing sections 52 and 53 on both sides of the axial section 51, it is possible to easily restrict rotation of the body 3.

Also, the shock absorber 10 of the present embodying mode includes, as shown in FIGS. 29 and 30, two removal preventing sections 52 and 53 such that the distance r1 between the first removal preventing section 52 and the axial section 51 differs from the distance r2 between the second removal preventing section 53 and the axial section 51. Incidentally, also the attaching holes 62 and 63 disposed in the attaching object 20 are configured according to the removal preventing sections 52 and 53. This makes it possible to prevent erroneous insertion of the removal preventing sections 52 and 53. Incidentally, in the present embodying mode, since two removal preventing sections 52 and 53 are configured in the same shape, the distances r1 and r2 with respect to the axial section 51 are different from each other. However, it also possible, by configuring the two removal preventing sections 52 and 53 in the different shapes, to prevent erroneous insertion of the removal preventing sections 52 and 53.

Figure 37:
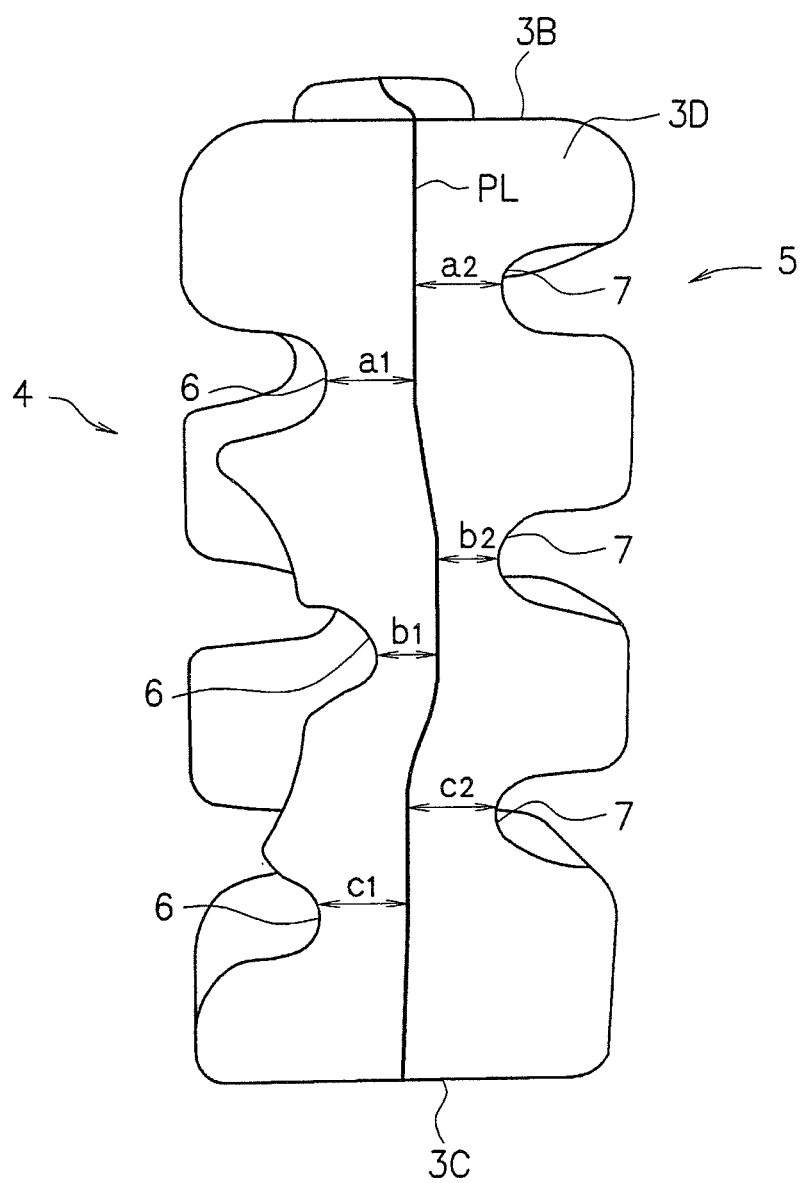
FIG. 37 is a diagram showing another configuration example of the front wall 3D.

Incidentally, the shock absorber 10 described above is configured as shown in FIG. 28 such that the groove-shaped rib 6 disposed on the side of the first sidewall 4 and the groove-shaped rib 7 disposed on the side of the second sidewall 5 oppose each other at the same position. However, they may also be configured as shown in FIG. 37 such that the groove-shaped rib 6 disposed on the side of the first sidewall 4 and the groove-shaped rib 7 disposed on the side of the second sidewall 5 alternately oppose each other. Even in the case of this configuration, it is favorable that the groove-shaped ribs 6 and 7 are disposed such that the distances from the bottom sections of the groove-shaped ribs 6 and 7 to the parting line PL are equal to each other (a1=a2,b1=b2,c1=c2). As a result, even when the position (hit point) to receive shock on the front wall 3D is moved relative to the ideal position or even when the incoming angle of shock at which the shock advances toward the front wall 3D is shifted relative to the ideal incoming angle, a desired load can be stably retained and it is possible to secure a desired quantity of shock absorption. Incidentally, the distances from the bottom sections of the groove-shaped ribs 6 and 7 to the parting line PL are values measured in a state in which the lines connecting the bottom sections of the groove-shaped ribs 6 and 7 to the parting line PL vertically intersect the parting line PL.

Also, the shock absorber 10 described above includes, as shown in FIG. 19, the axial section 51 and the removal preventing sections 52 and 53 in the rear wall 3A, and as shown in FIG. 29, the axial section 51 is inserted in the axial hole 61 and the removal preventing sections 52 and 53 are inserted in the attaching holes 62 and 63. And as shown in FIG. 30, the body 3 is rotated to be moved relative to the attaching object 20 by using the axial section 51 as the axis of rotation such that part of the restricting sections 52b and 53b of the removal preventing sections 52 and 53 are placed over the attaching object 20, to thereby attach the shock absorber 10 onto the attaching object 20. However, at least one removal preventing section 52, 53 is required, and even in the configuration including the axial section 51 and one removal preventing section 52, the shock absorber 10 can be attached onto the attaching object 20.

Further, in the shock absorber 10 described above, the axial section 51 is inserted in the axial hole 61 which is a through hole. However, it is not required that the axial hole 61 is a through hole, but it is possible, only if the axial section 51 can stably rotate, to dispose the axial hole 61 in any shape. Further, it is also possible that without disposing the axial hole 61 in the attaching object 20, the axial section 51 is brought into contact with the attaching object 20, to thereby rotate the axial section 51. Additionally, it is also possible that without disposing the axial section 51 in the rear wall 3A, only two removal preventing sections 52 and 53 are disposed in rear wall 3A such that the two removal preventing sections 52 and 53 are inserted in the attaching holes 62 and 63 and the removal preventing sections 52 and 53 are moved in the areas of the attaching holes 62 and 63, to thereby rotate the body 3 and to place part of the restricting sections 52b and 53b of the removal preventing sections 52 and 53 over the attaching object 20, to thereby attach the shock absorber 10 onto the attaching object 20.

Also, in the shock absorber 10 described above, the axial section 51 is disposed on the side of the rear wall 3A and the axial hole 61 is disposed on the side of the attaching object 20. However, it is also possible that the axial hole 61 is disposed on the side of the rear wall 3A and the axial section 51 is disposed on the side of the attaching object 20.

Figure 38:
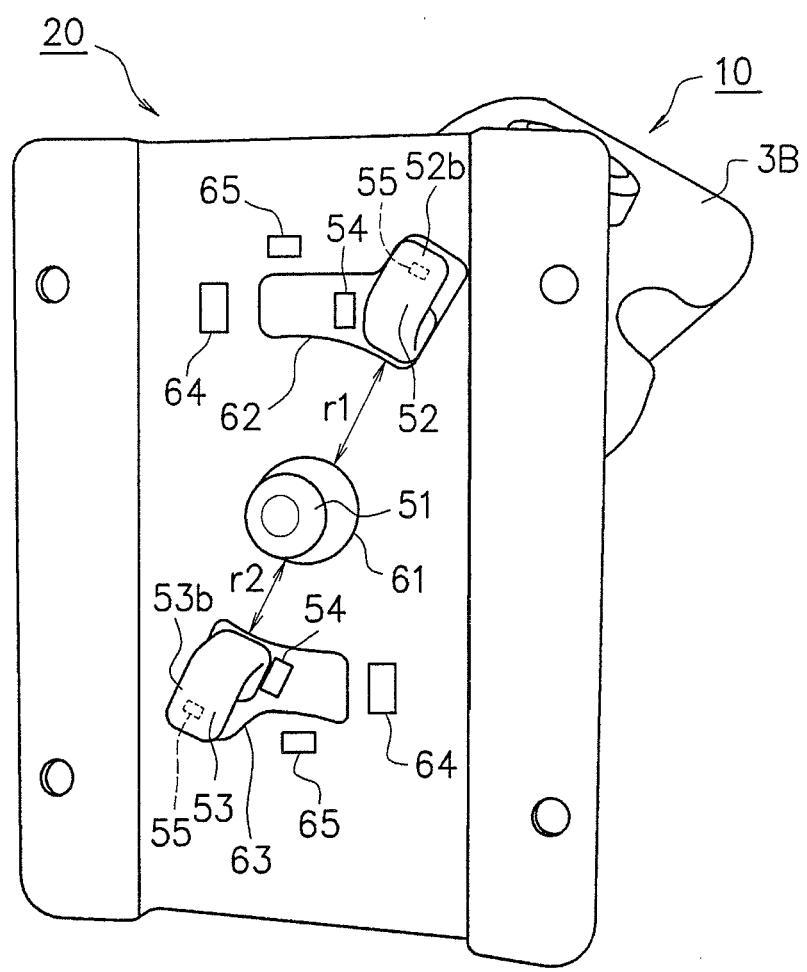
FIG. 38 is a first diagram showing a configuration example in which fixing sections 14 and 15 are disposed.
Figure 39:
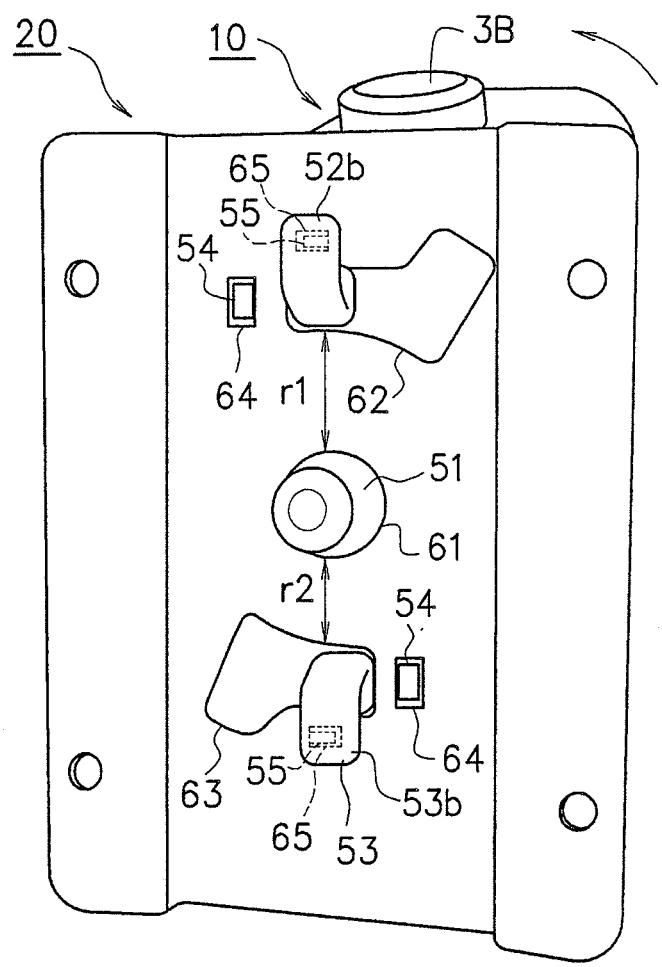
FIG. 39 is a second diagram showing a configuration example in which fixing sections 14 and 15 are disposed.

Moreover, the shock absorber 10 of the present embodying mode may be configured to include, as shown in FIG. 38, at least one fixing section 54, 55 selected from the fixing section 54 projecting from the rear wall 3A and the fixing section 55 projecting from the removal preventing sections 52 and 53, and as shown in FIG. 39, by rotating the body 3, the fixing sections 54 and 55 are fixed in the fixing holes 64 and 65 disposed in the attaching object 20, to thereby restrict rotation in the reverse direction of the body 3. The fixing hole 64 is a hole corresponding to the fixing section 54 projecting from the rear wall 3A and the fixing hole 65 is a hole corresponding to the fixing section 55 projecting from the removal preventing sections 52 and 53.

Incidentally, the fixing sections 54 and 55 are formed in a hollow shape by blow molding to enhance rigidity. Further, the hollow section formed in the fixing section 54 projecting from the rear wall 3A is integral with the hollow section 2 formed in the body 3 and air is able to flow between the hollow section 2 of the body 3 and the hollow section of the fixing section 54 in the configuration. Further, the hollow section formed in the fixing section 55 projecting from the removal preventing sections 52 and 53 is integral with the hollow section 9 formed in the removal preventing sections 52 and 53 and air is able to flow between the hollow section 9 of the removal preventing sections 52 and 53 and the hollow section of the fixing section 55 in the configuration.

Incidentally, for the shapes of the fixing sections 54 and 55 and the fixing holes 64 and 65, any configuration example is applicable only if it is possible that the fixing sections 54 and 55 are inserted in the fixing holes 64 and 65 to fix the fixing sections 54 and 55 by the fixing holes 64 and 65, to thereby restrict rotation in the reverse direction of the body 3. For example, they may be configured in a triangular shape or an arc shape. However, in consideration of the restriction of the rotation in the reverse direction of the body 3, it is favorable that the portions of the fixing sections 54 and 55 to make contact with the fixing holes 64 and 65 are configured in the shape in which planes thereof make contact with the fixing holes 64 and 65.

Figure 40:
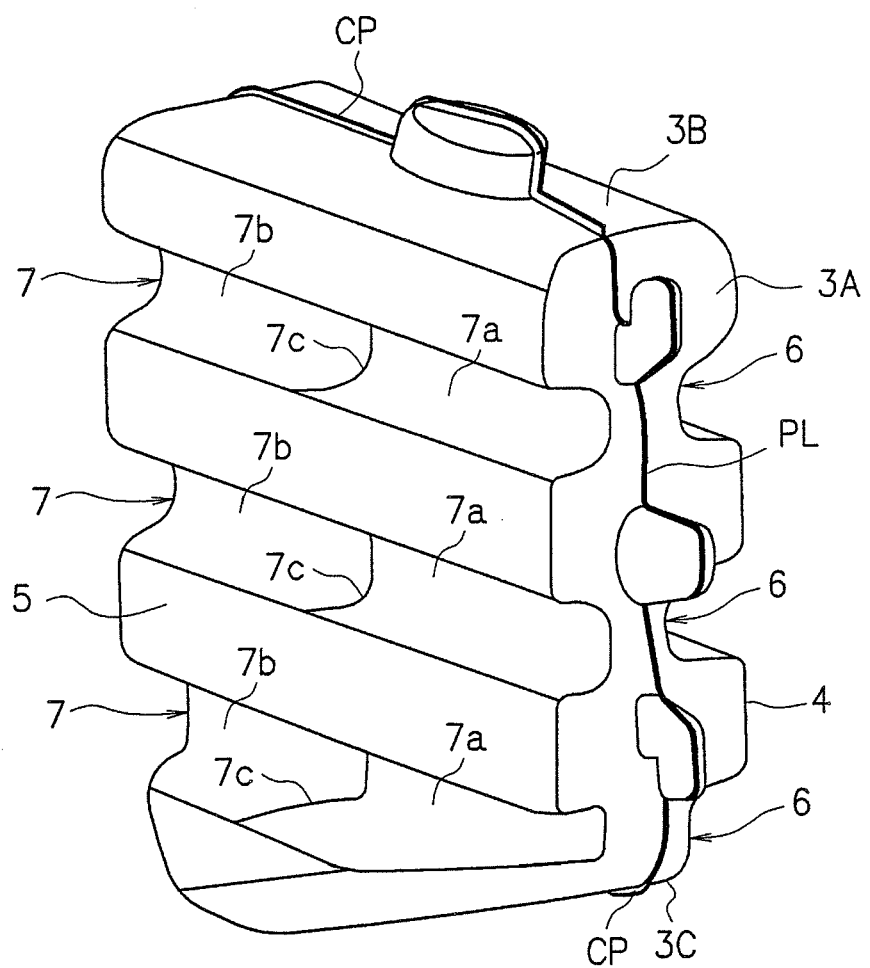
FIG. 40 is a perspective view of the shock absorber 10 viewed from the side of the rear wall 3A.
Figure 41:
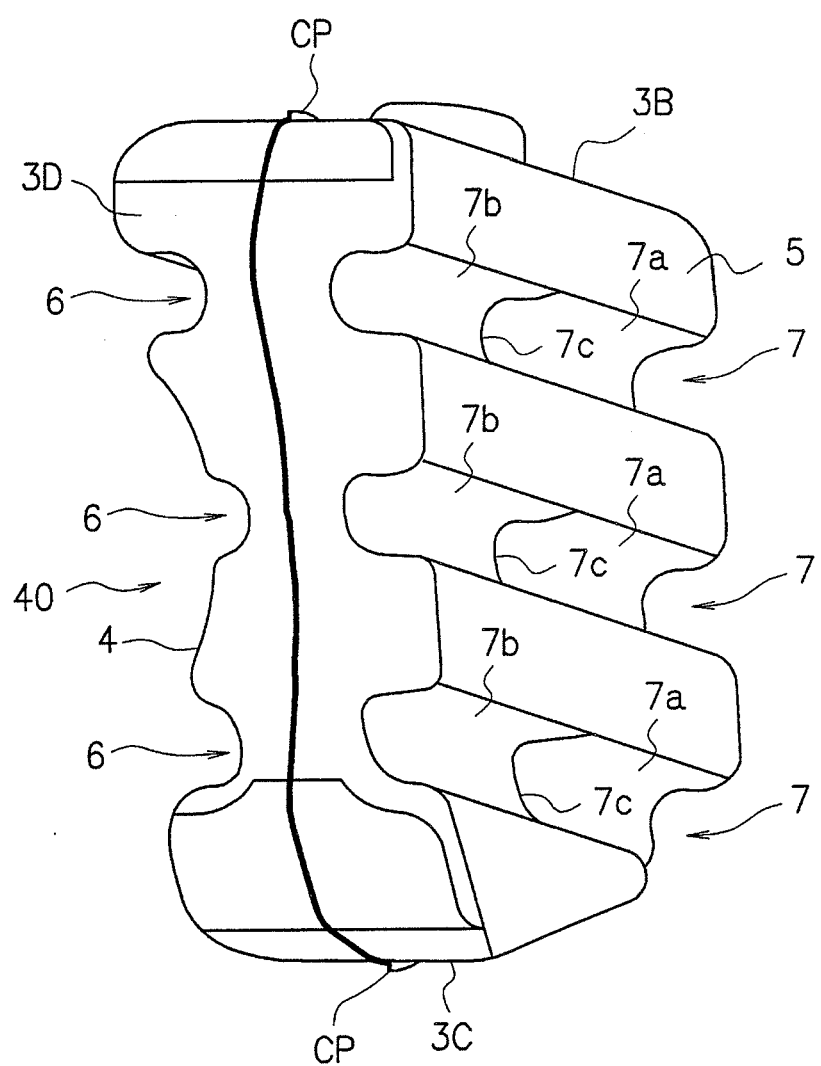
FIG. 41 is a perspective view of the shock absorber 10 viewed from the side of the front wall 3D.

Also, in the shock absorber 10 of the present embodying mode, as shown in FIGS. 40 and 41, the compression section CP remains in the portions of the parting line PL passing the upper wall 3B and the lower wall 3C, to improve strength of the welding between the upper wall 3B and the lower wall 3C. Further, it is favorable that the portions of the parting line PL passing the front wall 3D to receive shock and the rear wall 3A which is attached onto the attaching object 20 are flat. As a result, it is possible that the crack from the parting line PL is prevented and the shock absorption is stably carried out. FIG. 40 is a perspective view of the shock absorber 10 viewed from the side of the rear wall 3A and FIG. 41 is a perspective view of the shock absorber 10 viewed from the side of the front wall 3D.

Additionally, in the shock absorber 10 of the present embodying mode, as shown in FIG. 41, the depression 40 can be formed by depressing part of the first sidewall 4 as the peripheral wall toward the inside. As a result, when the area of the peripheral wall is reduced and the shock absorber 10 is installed in the installation space, it is possible to prevent interference with other car constituting members.

Figure 42:
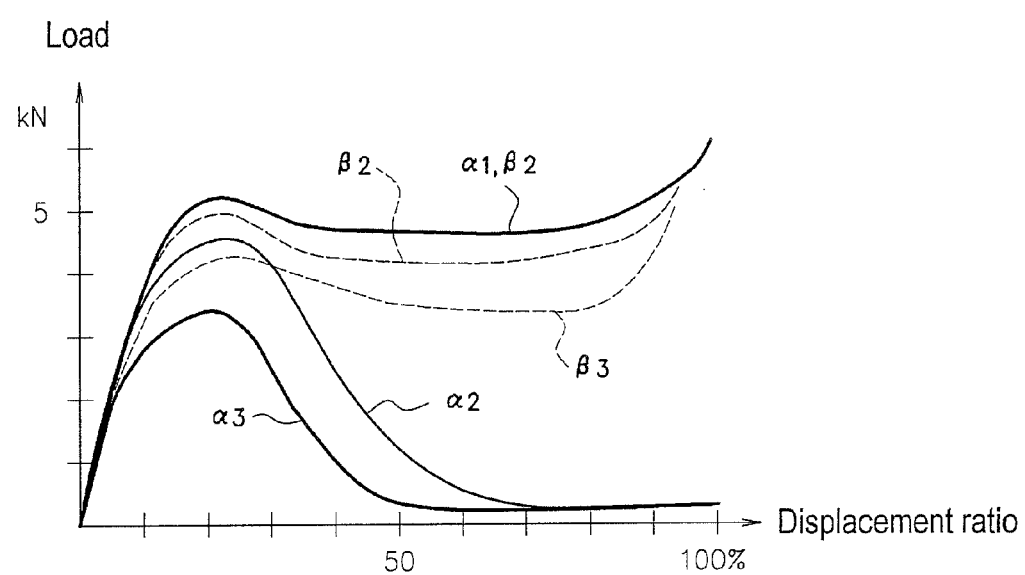
FIG. 42 is a diagram showing measurement results of shock absorbing performance.
Figure 43:
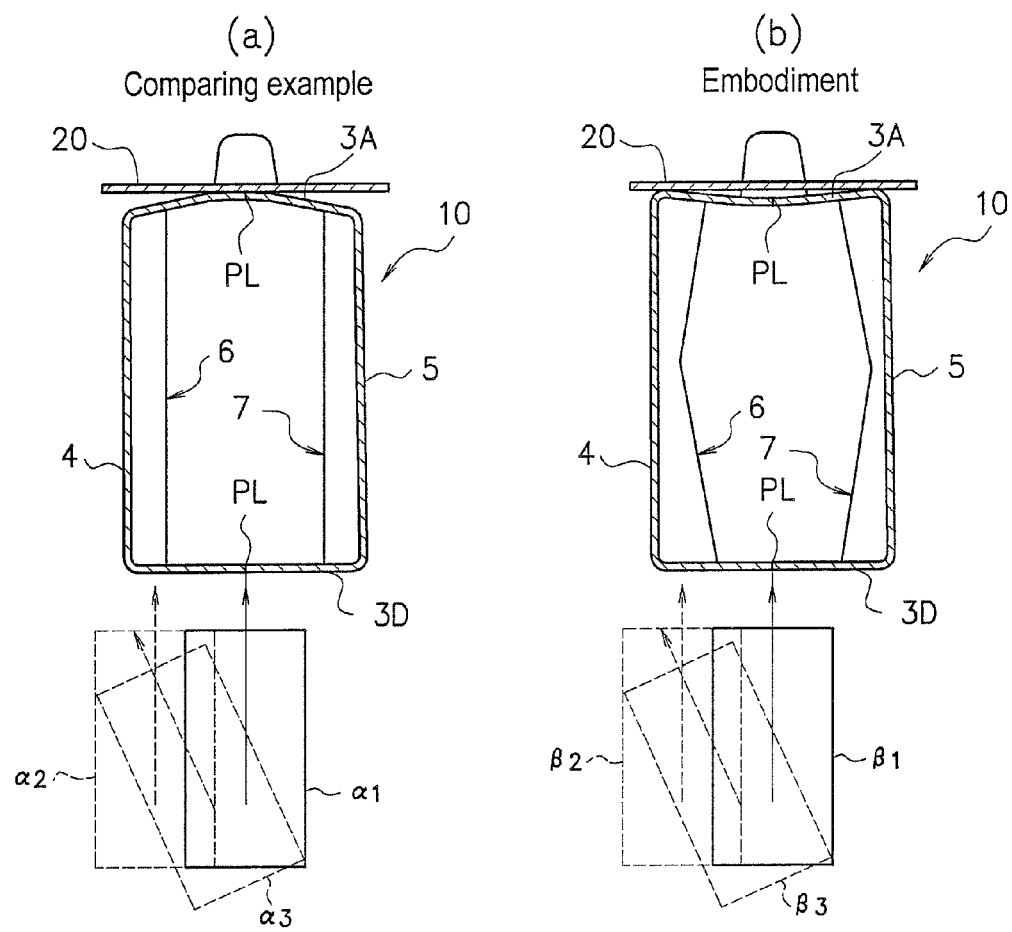
FIG. 43 is a diagram showing a configuration example of a shock absorber employed in measurements and tests of shock absorbing performance.

FIG. 42 is a graph showing test results obtained by use of a collision tester on blow-molded shock absorbers for the embodiment and the comparing example shown in FIG. 43. The test results of FIG. 42 show test results on the shock absorbers for the embodiment and the comparing example in a situation in which shock is received from the ideal position ($\alpha 1, \beta 1$), a situation in which shock is received from a position shifted from the ideal position ($\alpha 2, \beta 2$), and a situation in which shock is received from an incoming angle different from the ideal incoming angle ($\alpha 3, \beta 3$).

For the dimensions of the shock absorber for the comparing example shown in FIG. 43 (a), the front wall 3D is 120 mm×50 mm, the upper wall 3B is 80 mm×50 mm, the rear wall 3A is 90 mm×50 mm, and the lower wall 3C is 70 mm×50 mm. Hence, for the first sidewall 4 and the second side wall 5, the dimension thereof on the side of the upper wall 3B is 80 mm, that on the side of the lower wall 3C is 70 mm, that on the side of the rear wall 3A is 90 mm, and that on the side of the front wall 3D is 120 mm. Also, the mean thickness of the wall sections of the shock absorber is 1.30 mm and the thickness of the thin sections 31 formed in the corners coupling the front wall 3D with the peripheral walls 4, 5, 3B, and 3C is 0.96 mm. Additionally, the groove-shaped ribs 6 and 7 have the shape of a straight line. Further, the rear wall 3A is configured to project more toward the side of the attaching object 20 at the position of the parting line PL than at positions of both side edges (the side of the first sidewall 4 and the side of the second sidewall 5).

The dimensions of the shock absorber for the embodiment shown in FIG. 43 (b) are the same as those of the comparing example, and the mean thickness of the wall sections of the shock absorber is 1.48 mm and the thickness of the thin sections 31 formed in the corners coupling the front wall 3D with the peripheral walls 4, 5, 3B, and 3C is 0.48 mm. Additionally, the groove-shaped ribs 6 and 7 have an inflected shape. Further, the rear wall 3A is configured to project more toward the side of the attaching object 20 at positions of both side edges (the side of the first sidewall 4 and the side of the second sidewall 5) than at the position of the parting line PL.

The shock absorber for the embodiment shown in FIG. 43 (b) is formed by changing the shape of the rear wall 3A, the shape of the groove-shaped ribs 6 and 7, and the thickness of the thin section 31 in order that the shock absorbing performance obtained when shock is received from the ideal position (β1) is the same as for the shock absorber of the comparing example shown in FIG. 43(a).

As the material to configure the shock absorber, polypropylene AD571 (flexural elasticity modulus of 1050 Mpa) produced by Mitsui-Sumitomo Chemical Co., Ltd. is employed.

The collision tester is a collision tester produced by Hodogaya Giken Co., Ltd., and a pillar-shaped collision item having mass of 20 kg, a tip end shape of φ75 mm, and length of 160 mm is employed for collision at a speed of 19 km/h.

As can be clearly seen from the test results shown in FIG. 42, in a situation wherein the target load is 5 KN from the point of view to prevent damages of the persons in the car, it is confirmed that in the case of the shock absorber of the comparing example, the quantity of shock absorption is reduced in the case in which shock is received from a position shifted from the ideal position (α2) and a case in which shock is received from an incoming angle different from the ideal incoming angle (α3).

In contrast thereto, in the case of the shock absorber of the embodiment, it is confirmed that the quantity of shock absorption is not changed even in the case in which shock is received from a position shifted from the ideal position (β2) and even in the case in which shock is received from an incoming angle different from the ideal incoming angle (β3) and a stable quantity of shock absorption can be secured. Incidentally, the quantity of shock absorption is represented by the area surrounded by a curve below the curve and the abscissa (however, excepting the range exceeding the target load).

Therefore, as in the shock absorber of the embodiment shown in FIG. 43 (a), in a situation wherein the thin section 31 is formed in the corners coupling the front wall 3D with the peripheral walls 4, 5, 3B, and 3C, the groove-shaped ribs 6 and 7 are in an inflected shape, and the rear wall 3A is configured to project more toward the side of the attaching object 20 at positions of both side edges (the side of the first sidewall 4 and the side of the second sidewall 5) than at the position of the parting line PL; even in a case in which shock is received from a position shifted from the ideal position and even in a case in which shock is received from an incoming angle different from the ideal incoming angle, it is possible that the stable quantity of shock absorption is secured and the desired shock absorbing performance is obtained.

<Operation and Effects of Shock Absorber 10 of Present Embodying Mode>

As above, the shock absorber 10 of the present embodying mode is characterized, as shown in FIG. 19, by including a front wall 3D to receive shock, a rear wall 3A opposing the front wall 3D, and peripheral walls (an upper wall 3B, a first sidewall 4, a lower wall 3C, and a second sidewall 5) which connect the peripheries of the front wall 3D and the rear wall 3A to each other, and at least one attaching section (an axial section 51 and removal preventing sections 52, 53) to attach onto the attaching object 20 is formed to be integral with the rear wall 3A, and shock received by the front wall 3D is propagated via the rear wall 3A to the attaching object 20.

The shock absorber 10 of the present embodying mode can be, since the attaching sections 51 to 53 are formed to be integral with the rear wall 3A, easily attached and the installation space can be reduced.

Moreover, the shock absorber 10 of the present embodying mode is characterized by including a body 3, an axial section 51 projecting from the body 3, and removal preventing sections 52 and 53 projecting from the body 3; and the removal preventing sections 52 and 53 include restricting sections 52b and 53b which are placed, when the axial section 51 is inserted in an axial hole 61 disposed in the attaching object 20 and the body 3 is rotated, over the attaching object 20 to restrict removal of the axial section 51 from the axial hole 61. Further, the shock absorber 10 of the present embodying mode is characterized by including a body 3 and a plurality of removal preventing sections 52 and 53 projecting from the body 3; and the removal preventing sections 52 and 53 include restricting sections 52b and 53b which are placed over the attaching object 20, when the removal preventing sections 52 and 53 are inserted in attaching holes 62 and 63 disposed in the attaching object 20 and the body 3 is rotated such that the removal preventing sections 52 and 53 are moved along areas of the attaching holes 62 and 63, to restrict removal of the removal preventing sections 52 and 53 from the attaching holes 62 and 63.

As a result, as for the shock absorber 10 of the present embodying mode, it possible that the shock absorber 10 is attached onto the attaching object 20 without using attaching tools such as vis and screws; hence, the attaching operation of the shock absorber 10 can be facilitated. In addition, the removal preventing sections 52 and 53 are inserted in the attaching holes 62 and 63 such that part of the restricting sections 52b and 53b of the removal preventing sections 52 and 53 overlap the attaching object 20; hence, it is possible to visually recognize the state whether or not the shock absorber 10 is attached onto the attaching object 20, and occurrence of attachment failure can be prevented.

Also, the shock absorber 10 of the present embodying mode includes the axial section 51 projecting from the rear wall 3A, and by using the axial section 51 as the axis of rotation, the body 3 can be rotated to be moved relative to the attaching object 20; hence, the body 3 can be stably rotated to be moved.

Incidentally, in the embodying mode described above, the removal preventing sections 52 and 53 of the shock absorber 10 are inserted in the attaching holes 62 and 63 disposed in the attaching object 20. However, it is also possible that by beforehand forming the configuration of the attaching object 20 in a part of a car, the shock absorber 10 is attached directly onto a part (attaching object) of the car. For example, it is also possible that by beforehand forming the attaching holes 62 and 63 in a part of a car, the removal preventing sections 52 and 53 of the shock absorber 10 are attached directly onto a part (attaching object) of the car.

Third Embodying Mode Example

Next, description will be given of a third embodying mode example.

In conjunction with the first and second embodying modes, description has been given of a shock absorber 10 suitable for a knee bolster.

In conjunction with the third embodying mode, description will be given of a shock absorber 10 suitable for a bumper absorber.

<Configuration Example of Shock Absorber 10>

Figure 44:
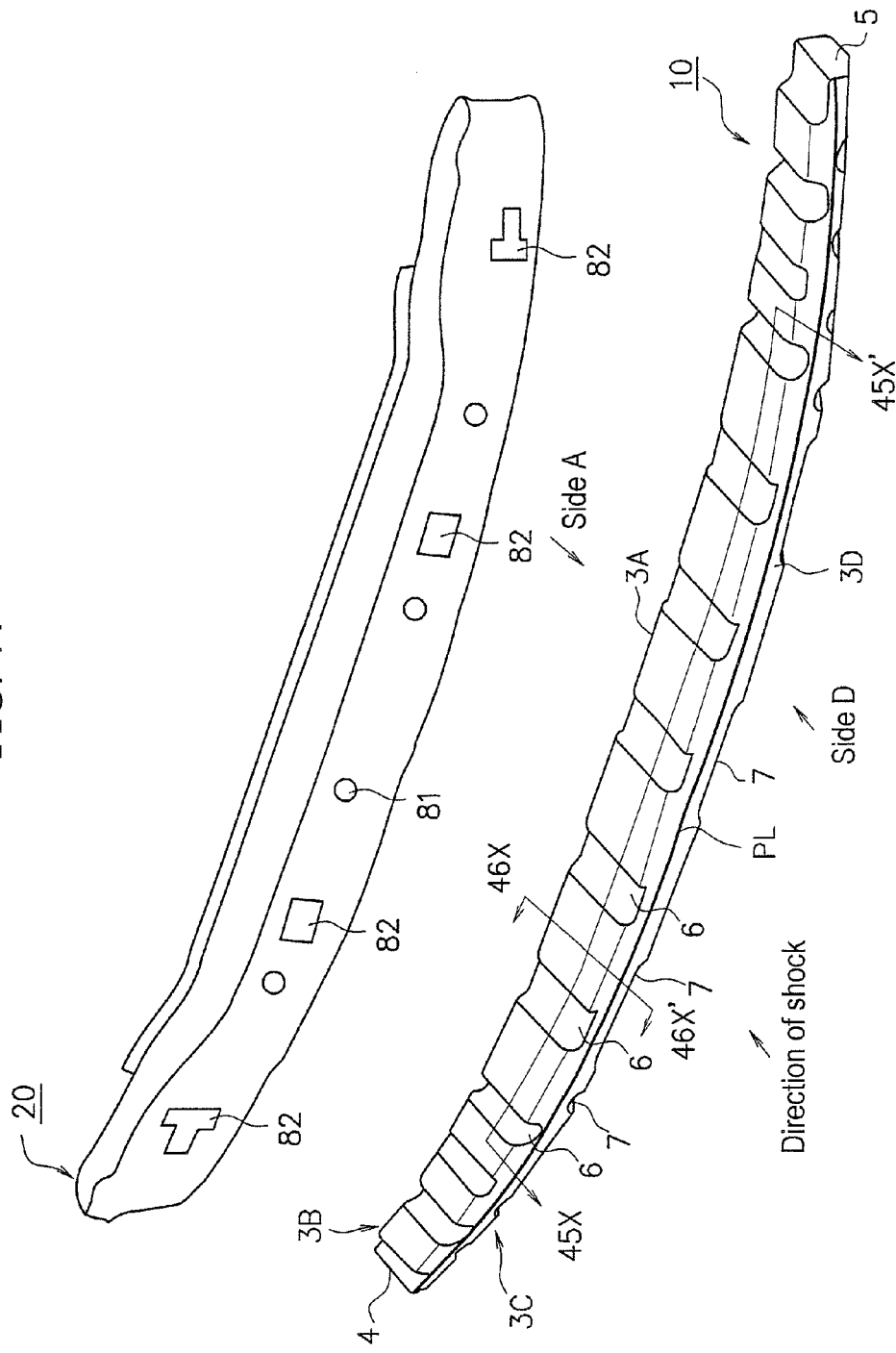
FIG. 44 is a diagram showing an overall configuration example of a shock absorber 10 in a third embodying mode and an attaching object 20 onto which the shock absorber 10 is attached.
Figure 45:
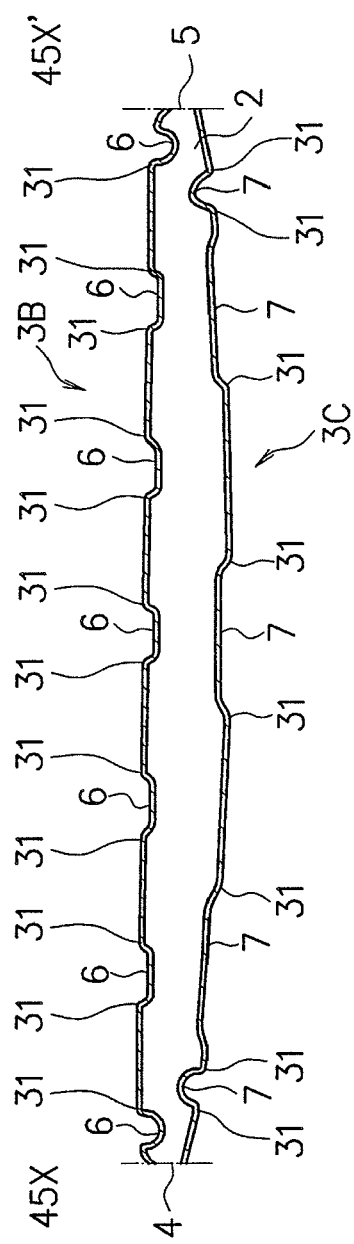
FIG. 45 is a diagram showing a cross-sectional configuration example along line 45X-45X' of the shock absorber 10 shown in FIG. 44.
Figure 46:
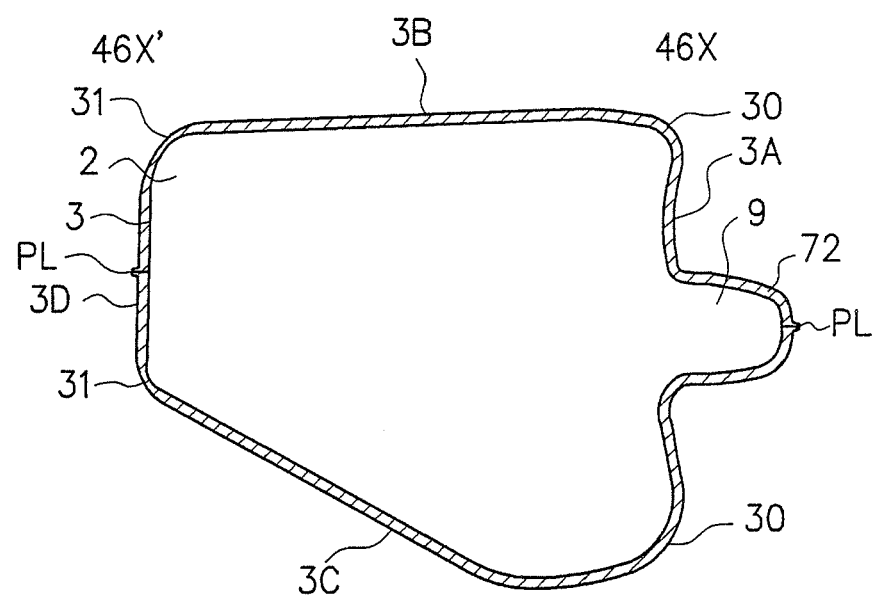
FIG. 46 is a diagram showing a cross-sectional configuration example along line 46X-46X' of the shock absorber 10 shown in FIG. 44.
Figure 47:
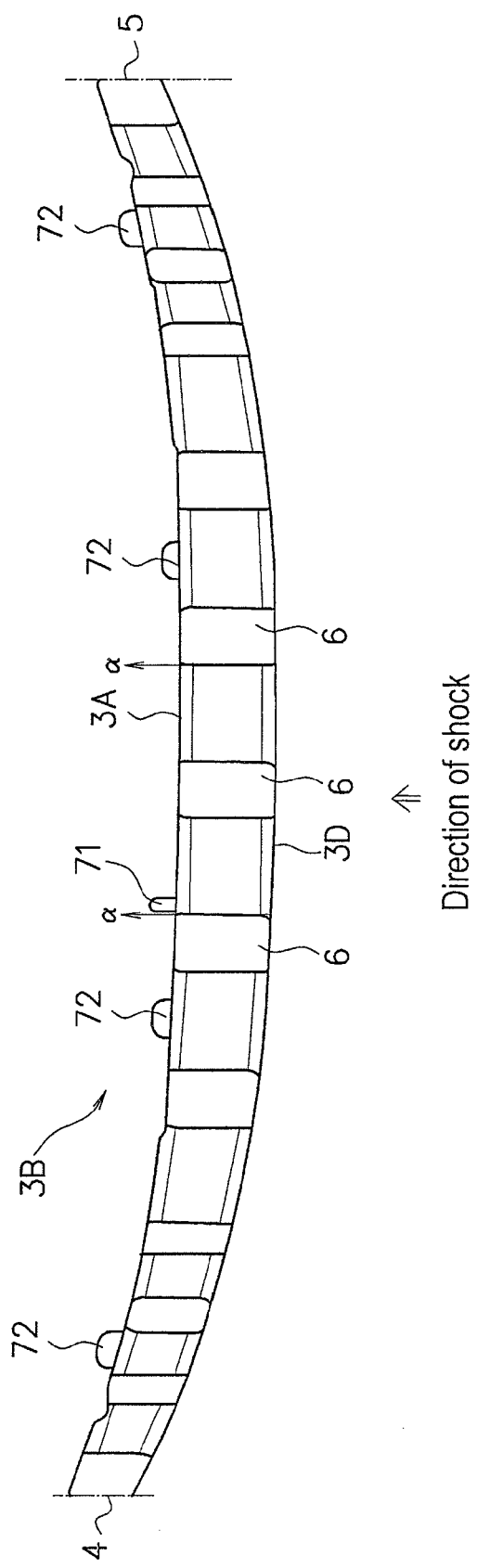
FIG. 47 is a diagram showing a configuration example, on the side of an upper surface 3B, of the shock absorber 10 shown in FIG. 44.
Figure 48:
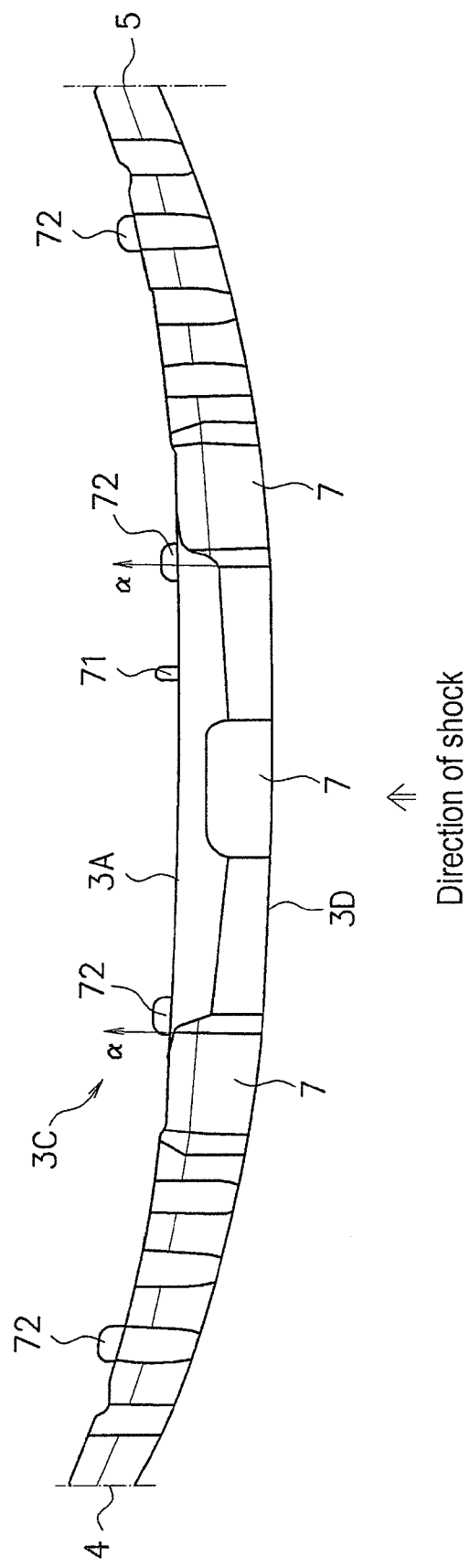
FIG. 48 is a diagram showing a configuration example, on the side of a lower surface 3C, of the shock absorber 10 shown in FIG. 44.
Figure 49:
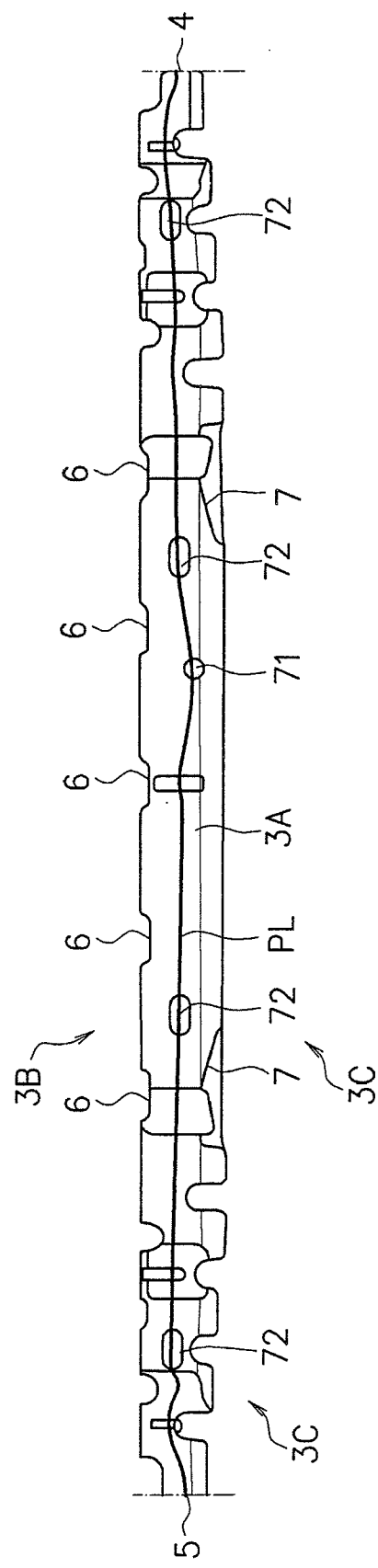
FIG. 49 is a diagram showing a configuration example, on side A (side of a rear surface 3A), of the shock absorber 10 shown in FIG. 44.

First, referring to FIGS. 44 to 50, description will be given of a configuration example of the shock absorber 10 of the present embodying mode. FIG. 44 is a diagram showing an overall configuration example of the shock absorber 10 of the present embodying mode and the attaching object 20 onto which the shock absorber 10 is attached, FIG. 45 shows a cross-sectional configuration example along line 45X-45X' of the shock absorber 10 shown in FIG. 44 and FIG. 46 shows a cross-sectional configuration example along line 46X-46X' of the shock absorber 10 shown in FIG. 44. FIG. 47 shows a configuration example of the shock absorber 10 shown in FIG. 44 on the side of an upper wall 3B and FIG. 48 shows a configuration example of the shock absorber 10 shown in FIG. 44 on the side of a lower wall 3C. FIG. 49 shows a configuration example of the shock absorber 10 shown in FIG. 44 on side A (side of the rear wall 3A) and FIG. 50 shows a configuration example of the shock absorber 10 shown in FIG. 44 on side D (side of the front wall 3D).

The shock absorber 10 of the present embodying mode is molded in a hollow shape by conducting blow molding on thermoplastic resin and includes, as shown in FIG. 45, a plurality of groove-shaped ribs 6 and 7 formed by depressing, respectively toward the opposing sides, the upper wall 3B and the lower wall 3C opposing to each other of the body 3 including a hollow section 2. The groove-shaped ribs 6 and 7 formed on the upper wall 3B and the lower wall 3C extend as shown in FIG. 44 from the front wall 3D to the rear wall 3A, and the extending direction thereof is favorably equal to the direction of shock. This makes it possible to increase rigidity against shock from the direction of shock.

Figure 50:
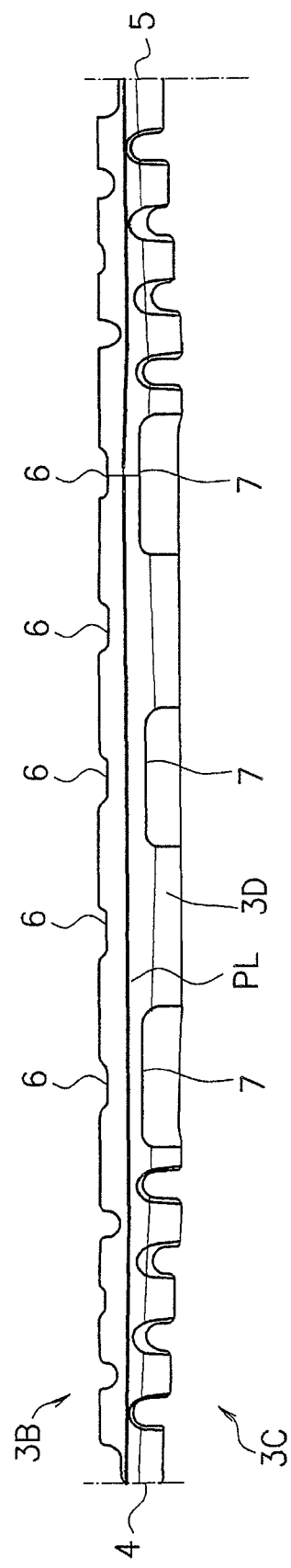
FIG. 50 is a diagram showing a configuration example, on side D (side of a shock receiving surface 3D), of the shock absorber 10 shown in FIG. 44.

In the shock absorber 10 of the present embodying mode, the front wall 3D shown in FIG. 50 receives shock and then the shock received by the front wall 3D is propagated, via the rear wall 3A, which opposes the front wall 3D and which is shown in FIG. 49, to the attaching object 20. In the shock absorber 10 of the present embodying mode, the parting line PL extends along the first sidewall 4, the front wall 3D, the second sidewall 5, and the rear wall 3A, to enhance rigidity of the shock absorber 10. This makes it possible that when the front wall 3D receives shock, the shock absorber 10 is not easily cracked.

Also, for the front wall 3D, the parting line PL extends, as shown in FIG. 50, along both side edges (the first sidewall 4 side and the second sidewall 5 side), to increase rigidity of the front wall 3D. This makes it possible that when the front wall 3D receives shock, the front wall 3D does not easily crack.

Further, in the front wall 3D, the groove-shaped ribs 6 and 7 are disposed such that distances from the bottom sections of the groove-shaped ribs 6 and 7 to the parting line PL are equal to each other. In the front wall 3D, by equalizing the distance from the bottom section of the groove-shaped rib 6 disposed in the upper wall 3B to the parting line PL to the distance from the bottom section of the groove-shaped rib 7 disposed in the lower wall 3C to the parting line PL, it is possible to uniformalize the rib-shaped ribs 6 and 7 in thickness. As a result, even when the position of the load point (hit point) to receive shock on the front wall 3D is moved relative to the ideal position or even when the incoming angle of shock at which the shock advances toward the front wall 3D is shifted relative to the ideal incoming angle, a desired load can be stably retained and it is possible to secure a desired quantity of shock absorption. Incidentally, the distances from the bottom sections of the groove-shaped ribs 6 and 7 to the parting line PL are the values measured in a state in which lines connecting the bottom sections of the groove-shaped ribs 6 and 7 to the parting line PL vertically intersect the parting line PL. Incidentally, the contour of the parting line PL is not particularly restricted only if the parting line PL meets the conditions above and extends along both side edges, and it is possible to configure it in any contour such as the contour of a straight line, the contour of a curved line, and the like.

Further, in the upper wall 3B and the lower wall 3C, there are formed, as shown in FIGS. 47 and 48, the groove-shaped ribs 6 and 7 extending from the front wall 3D to the rear wall 3A. The groove-shaped ribs 6 and 7 are formed such that the extending direction α of the groove-shaped ribs 6 and 7 is equal to the direction of shock. This makes it possible that when the front wall 3D receives shock, rigidity thereof against the shock is increased and the groove-shaped ribs 6 and 7 efficiently absorb the shock. Incidentally, in the present embodying mode, as shown in FIGS. 47 and 48, the longitudinal ribs 6 and 7 and rectangular ribs 6 and 7 are formed in the extending direction α; however, the ribs are not limited to the longitudinal ribs 6 and 7 and rectangular ribs 6 and 7, but ribs of any contour may be formed in the extending direction α. For example, it is also possible to form circular groove-shaped ribs 6 and 7 in an intermittent way in the extending direction α. That is, if the ribs are formed in the extending direction α, the contour of the ribs are not particularly limited, and any ribs may be formed. However, as shown in FIGS. 47 and 48, it is favorable to successively form the groove-shaped ribs 6 and 7 in series in the extending direction α. This makes it possible that the groove-shaped ribs 6 and 7 successively formed in the extending direction α are inflected to be convex in a direction to approach the mutually opposing upper and lower walls 3B and 3C or in a direction to be apart from the mutually opposing upper and lower walls 3B and 3C.

As thermoplastic resin to constitute the shock absorber 10 of the present embodying mode, known resin is applicable. The resin may include resin having high mechanical strength such as rigidity, the resin being, for example, polyolefin-based resin including polyethylene and polypropylene, styrene-based resin including polystyrene and ABS resin, polyester-based resin including polyethylene terephthalate, polyamide, and a mixture of these resins.

Also, in the range not to deteriorate mechanical strength (anti-shock property), there may be included one kind or two or more kinds of additives utilized in the relevant field, for example, fillers including silica and the like, pigments, dyes, thermal stabilizers, optical stabilizer, plasticizers, antistatic agents, fire retardants, flame retardants, antiaging agents, ultraviolet-ray absorbers, antioxidants, antifogging agents, and slip additives.

The shock absorber 10 of the present embodying mode includes, as shown in FIG. 49, an axial section 71 and an attaching section 72 which are projecting from the rear wall 3A of the body 3. The axial section 71 and the attaching section 72 constitute an attaching section to attach the shock absorber 10 onto the attaching object 20. The body 3 includes six walls which are the upper wall 3B, the rear wall 3A, the lower wall 3C, the front wall 3D, the first sidewall 4, and the second sidewall 5; and the upper wall 3B, the first sidewall 4, the lower wall 3C, and the second sidewall 5 configure a peripheral wall of the body 3.

The shock absorber 10 of the present embodying mode is configured, as shown in FIG. 44, such that the gap between the first sidewall 4 and the second sidewall 5 has a longer shape than the gap between the upper wall 3B and the lower wall 3C.

Figure 51:
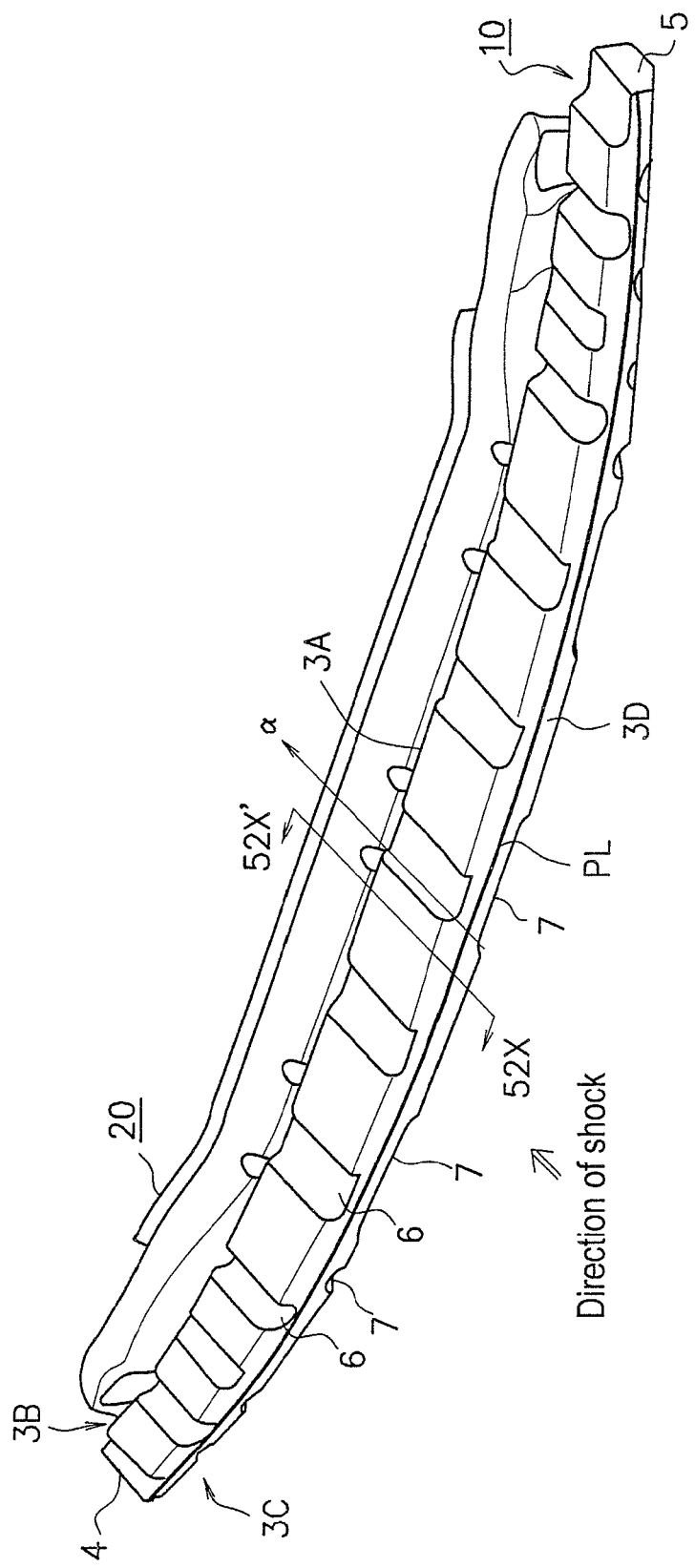
FIG. 51 is a diagram showing a state of the shock absorber 10 attached onto the attaching object 20, viewed from the side of the shock receiving surface 3D.

In the shock absorber 10 of the present embodying mode, the axial section 71 projecting from the rear wall 3A is inserted in the axial hole 81 corresponding to the axial section 71 and the attaching section 72 projecting from the rear wall 3A is inserted in the attaching hole 82 corresponding to the attaching section 72 disposed on the attaching object 20, to attach the body 3 onto the attaching object 20 as shown in FIG. 51 in the configuration. This makes it possible to install the shock absorber 10 in a car. However, to install the shock absorber 10 of the present embodying mode in a car, it is required that the attaching object 20 is beforehand mounted on a part of the car. As a result, the shock absorber 10 of the present embodying mode can be easily installed in the car without using attaching tools such as vis and screws.

The attaching section 72 of the present embodying mode is formed, as shown in FIG. 46, in a hollow shape by blow molding to enhance rigidity. In addition, the hollow section 9 formed in the attaching section 72 is integral with the hollow section 2 formed in the body 3 and air is able to flow between the hollow section 2 of the body 3 and the hollow section 9 of the attaching section 72 in the configuration. Incidentally, like the attaching section 72 described above, the axial section 71 is also formed in a hollow shape by blow molding. The shapes of the attaching section 72 and the axial section 71 of the present embodying mode are not particularly limited, but they may be configured in any shapes.

In the shock absorber 10 of the present embodying mode, the axial section 71 and the attaching 72 described above are disposed on the parting line PL. This makes it possible to increase strength of the parting line PL on the rear wall 3A. As a result, when the shock absorber 10 receives shock, it is possible to prevent crack in the parting line PL on the rear wall 3A and the shock absorbing performance can be secured.

In addition, the rear wall 3A of the present embodying mode includes, as shown in FIG. 46, a convex section 30 projecting toward the attaching object, not shown. It is favorable that the convex section 30 is formed on both sides of the parting line PL (positions at which the axial section 71 and the attaching section 72 are disposed) formed on the rear wall 3A. Hence, when the rear wall 3A is attached onto the attaching object, the convex sections 30 formed on the upper and lower sides (side of the upper wall 3B and side of the lower wall 3C) of the rear wall 3A, rather than the positions of the parting line PL (positions at which the axial section 71 and the attaching section 72 are disposed), make contact with the attaching object, to serve as a support of the body 3; hence, the shock absorber 10 does not easily fall down and it is possible to stably fix the shock absorber 10 on the attaching object. Also, even when shock is received by the front wall 3D, since the convex sections 30 formed on the upper and lower sides (side of the upper wall 3B and side of the lower wall 3C) of the rear wall 3A opposing the front wall 3D make contact with the attaching object 20, it is possible to prevent the fall-down of the shock absorber 10 in the perpendicular direction.

Also, the shock absorber 10 of the present embodying mode includes, as shown in FIG. 46, a thin section 31 in a corner to couple the front wall 3D to the upper and lower walls (the upper wall 3B and the lower wall 3C). Thickness of the thin section 31 is configured in a range from 30% to 70% of the mean thickness of the wall sections of the shock absorber 10. The thin section 31 can be formed by adjusting the curved shape of the corner which couples the front wall 3D with the upper and lower walls (the upper wall 3B and the lower wall 3C). That is, by reducing the radius of curvature of the mold to form the corner, it is possible to produce the corner as a thin section.

Further, the shock absorber 10 of the present embodying mode includes, as shown in FIG. 45, a thin section 31 in the sections of the groove-shaped ribs 6 and 7 formed in the upper wall 3B and the lower wall 3C. In this case, by increasing the quantity of extension of resin in the sections to form the groove-shaped ribs 6 and 7, it is possible to form the thin section 31. That is, when the curved shape of the mold to form the groove-shaped ribs 6 and 7 is made to be sharp (the radius of curvature is reduced), it is possible to form the thin section 31.

The shock absorber 10 of the present embodying mode includes, as shown in FIG. 46, a thin section 31 in a corner to couple the front wall 3D to the upper and lower walls (the upper wall 3B and the lower wall 3C) and, as shown in FIG. 45, in the sections of the groove-shaped ribs 6 and 7 formed in the upper and lower walls (the upper wall 3B and the lower wall 3C); hence, when the shock absorber 10 receives shock, the positions of the thin section 31 preferentially buckle. As a result, when shock is received, the shock absorber 10 starts buckling without acting against the shock, and it is possible to efficiently absorb the shock. Also, even when the position of the load point (hit point) to receive shock by the front wall 3D is moved relative to the ideal position or the incoming angle of shock at which the shock advances toward the front wall 3D is shifted relative to the ideal incoming angle, the thin section 31 efficiently absorbs the shock; hence, it is possible to prevent the fall-down of the shock absorber 10 in the perpendicular direction.

The means thickness of the wall sections constituting the shock absorber 10 of the present embodying mode is configured in a range from 0.3 mm to 6.0 mm, and it is favorable to configure the thin section 31 in a range from 30% to 70% of the mean thickness. This makes it possible to efficiently absorb the shock.

Incidentally, the mean thickness can be calculated as below. For example, in the cross-sections at three points on one edge side (the first sidewall 4 side), the center, and the other edge side (the second sidewall 5 side) of the upper and lower walls (the upper wall 3B and the lower wall 3C) shown in FIG. 45 (however, the positions where the groove-shaped ribs 6 and 7 are not formed and the positions other than the corners coupling the front wall 3D with the upper and lower walls (the upper wall 3B and the lower wall 3C)), thickness is measured by a vernier caliper at portions (six positions in total) of intersecting points of a perpendicular bisector of a straight line connecting two mold split points, and a mean value of the resultant six measured values is calculated as the mean thickness. This makes it possible to calculate the mean thickness of the wall sections constituting the shock absorber 10.

Figure 52:
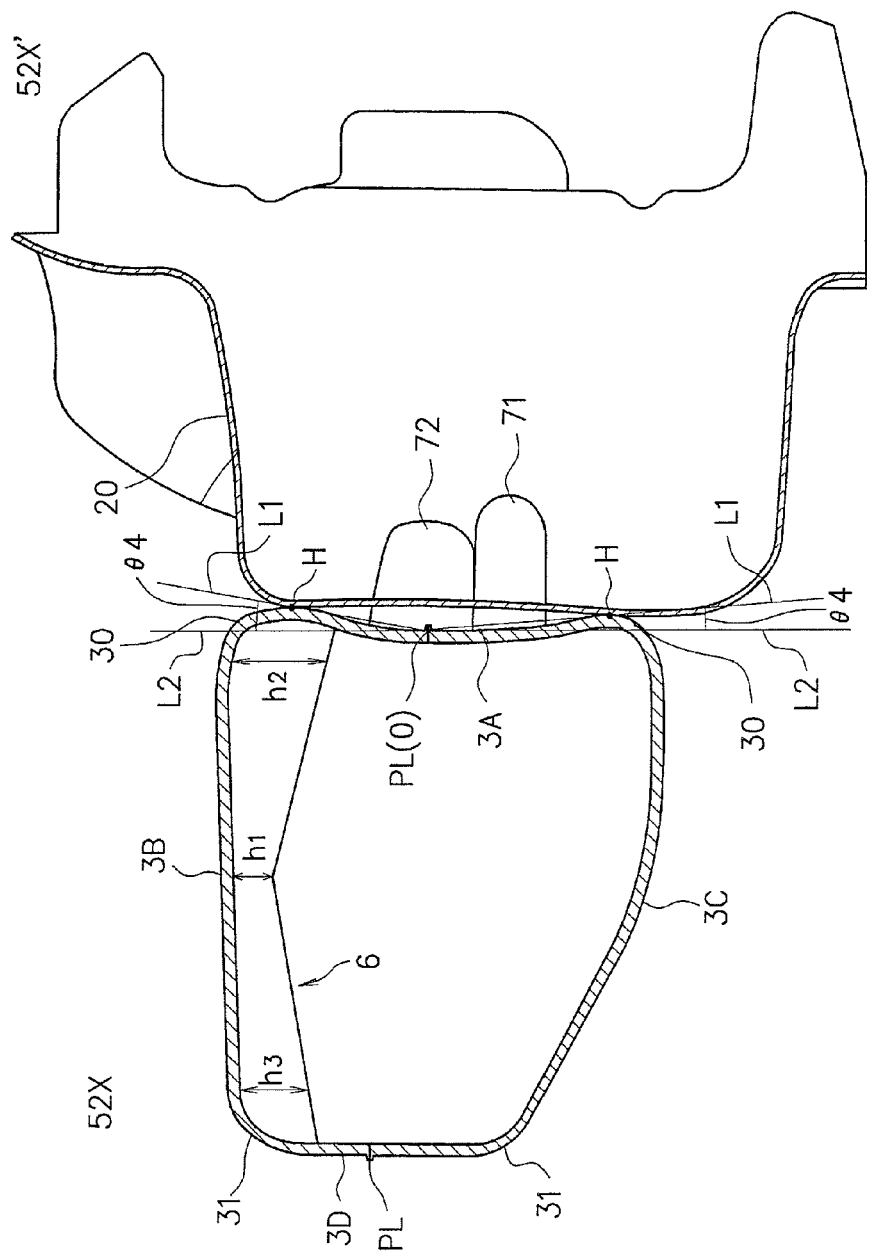
FIG. 52 is a diagram showing a cross-sectional configuration example along line 52X-52X' shown in FIG. 51.

To attach the shock absorber 10 of the present embodying mode onto the attaching object 20, the axial section 71 is inserted in the attaching hole 81 and the attaching section 72 is inserted in the attaching hole 82. As a result, as shown in FIGS. 51 and 52, the shock absorber 10 can be attached onto the attaching object 20. Incidentally, FIGS. 51 and 52 show a state in which the shock absorber 10 is attached onto the attaching object 20; FIG. 51 shows a state viewed from the side of the front wall 3D and FIG. 52 is a diagram showing a cross-sectional configuration example along line 52X-52X' shown in FIG. 51.

In the shock absorber 10 of the present embodying mode, as shown in FIG. 51, the groove-shaped ribs 6 and 7 extending from the front wall 3D to the rear wall 3A are formed in the upper and lower walls (the upper wall 3B and the lower wall 3C) such that the extending direction α of the groove-shaped ribs 6 and 7 is equal to the direction of shock. As a result, it is possible that when the front wall 3D receives shock, rigidity thereof against the shock is increased and the groove-shaped ribs 6 and 7 efficiently absorb the shock. Incidentally, while FIG. 51 shows the extending direction α of the groove-shaped rib 6 on the side of the upper wall 3B, also the extending direction α of the groove-shaped rib 7 on the side of the lower wall 3C is the same as for the groove-shaped rib 6 on the side of the upper wall 3B.

Also, in the front wall 3D constituting the shock absorber 10 of the present embodying mode, the parting line PL extends in series, as shown in FIG. 51, along the first sidewall 4 side and the second sidewall 5 side, to enhance rigidity of the front wall 3D. This makes it possible that when the front wall 3D receives shock, the front wall 3D is not easily cracked. Further, in the front wall 3D, the groove-shaped ribs 6 and 7 are disposed such that the distances from the bottom sections of the groove-shaped ribs 6 and 7 to the parting line PL are equal to each other. As a result, even when the position of load (hit point) to receive shock on the front wall 3D is moved relative to the ideal position or even when the incoming angle of shock at which the shock advances toward the front wall 3D is shifted relative to the ideal incoming angle, a desired load can be stably retained and it is possible to secure a desired quantity of shock absorption.

Additionally, the rear wall 3A of the shock absorber 10 of the present embodying mode includes, as shown in FIG. 52, the convex section 30 projecting toward the attaching object 20; the convex section 30 is formed on the upper and lower sides (side of the upper wall 3B and side of the lower wall 3C) of the parting line PL (positions at which the axial section 71 and the attaching section 72 are disposed) formed on the rear wall 3A. Hence, when the rear wall 3A is attached onto the attaching object 20, the convex sections 30 formed on the upper and lower sides (side of the upper wall 3B and side of the lower wall 3C) of the rear wall 3A make contact with the attaching object 20, to serve as a support of the body 3; hence, the shock absorber 10 does not easily fall down and it is possible to stably fix the shock absorber 10 onto the attaching object 20. Also, even when shock is received by the front wall 3D, since the convex sections 30 formed on the upper and lower sides (side of the upper wall 3B and side of the lower wall 3C) of the rear wall 3A make contact with the attaching object 20, it is possible to prevent the fall-down of the shock absorber 10 in the perpendicular direction.

Incidentally, the convex sections 30 formed on the upper and lower sides of the rear wall 3A of the present embodying mode are configured, as shown in FIG. 52, such that the quantity of projection is continuously increased as they are apart from the parting line PL (positions at which the axial section 71 and the attaching section 72 are disposed) toward the upper and lower sides (side of the upper wall 3B and side of the lower wall 3C). However, they may be configured such that the quantity of projection is partially increased. Incidentally, as for the quantity of projection, it is favorable that angle θ4 formed between line L1 connecting position PL(0) at which the parting line PL is formed on the rear wall 3A to vertex H of the position at which convex section 30 is formed and the unclamping direction L2 of the split mold to form the shock absorber 10 is in a range from 0° to 4°. In this regard, when the angle θ4 is 0°, the quantity of projection is 0. When the quantity of each projection on both edges with respect to the parting line PL is 0, the convex sections 30 formed on the upper and lower sides of the rear wall 3A are flat, and the surfaces of the rear wall 3A on the upper and lower sides with respect to the parting line PL are placed on one and the same plane. Also in this case, since the rear wall 3A on the upper and lower sides with respect to the parting line PL makes contact with the attaching object 20, it is possible to prevent the fall-down of the shock absorber 10 in the perpendicular direction.

Additionally, the groove-shaped rib 6 of the present embodying mode inflects, as shown in FIG. 52, to be convex in the direction to be apart from the opposing walls (the upper wall 3B and the lower wall 3C); and even when the incoming angle of shock at which the shock advances toward the front wall 3D is different from the ideal incoming angle, it is possible to absorb the shock. The inflection angle θ3 of the groove-shaped rib 6 is favorably in a range from 1° to 10°.

Incidentally, although the groove-shaped rib 6 shown in FIG. 52 is configured in a shape inflected in the direction (outside direction) to be apart from the opposing lower wall 3C, it may also be configured in a shape inflected in the direction (inside direction) to approach the opposing lower wall 3C. Also, the groove-shaped rib 6 shown in FIG. 52 is configured in a shape in which depth h2 of the groove-shaped rib 6 on the side of the rear wall 3A and depth h3 of the groove-shaped rib 6 on the side of the front wall 3D are larger than depth h1 of the groove-shaped rib 6 in the vicinity of the center (h1<h2 and h1<h3). However, it is also possible that the depth of the groove-shaped rib 6 is the same depth h1 from the front wall 3D to the vicinity of the center and the depth h2 of the groove-shaped rib 6 on the side of the rear wall 3A is larger in the configuration (h1<h2). As above, when the groove-shaped rib 6 disposed on the upper wall 3B as the peripheral wall coupling the front wall 3D with the rear wall 3A is inflected, the shock can be efficiently absorbed at the inflected position. Incidentally, the groove-shaped rib 6 shown in FIG. 52 shows a configuration example in which it is inflected in the vicinity of the center between the rear wall 3A and the front wall 3D; however, the inflecting position is not limited to the vicinity of the center, but it is also possible to obtain a configuration example in which it is inflected at an arbitrary point. Incidentally, also the groove-shaped rib 7 disposed on the side of the lower wall 3C is configured to be inflected in the same way as for the groove-shaped rib 6 disposed on the side of the upper wall 3B described above.

Incidentally, in the shock absorber 10 described above, as shown in FIG. 44, the groove-shaped rib 6 disposed on the side of the upper wall 3B and the groove-shaped rib 7 disposed on the side of the lower wall 3C are configured to be respectively at different positions. However, it is also possible to configure the groove-shaped rib 6 disposed on the side of the upper wall 3B and the groove-shaped rib 7 disposed on the side of the lower wall 3C to mutually oppose each other at the same positions. Even in this configuration, it is favorable for the groove-shaped ribs 6 and 7 that the distances from bottom sections of the groove-shaped ribs 6 and 7 to the parting line are equal to each other. As a result, even when the position of the point (hit point) to receive shock on the front wall 3D is moved relative to the ideal position or even when the incoming angle of shock at which the shock advances toward the front wall 3D is shifted relative to the ideal incoming angle, a desired load can be stably retained and it is hence possible to secure a desired quantity of shock absorption.

<Operation and Effects of Shock Absorber 10 of Present Embodying Mode>

As above, the shock absorber 10 of the present embodying mode is characterized by including, as shown in FIG. 44, a front wall 3D to receive shock, a rear wall 3A opposing the front wall 3D, and peripheral walls (an upper wall 3B, a first sidewall 4, a lower wall 3C, and a second sidewall 5) which connect the peripheries of the front wall 3D and the rear wall 3A to each other, and as shown in FIG. 49, at least one attaching section (an axial section 71, an attaching section 72) to attach onto the attaching object 20 is formed to be integral with the rear wall 3A, and shock received by the front wall 3D is propagated via the rear wall 3A to the attaching object 20.

As a result, since the attaching sections 71 and 72 are formed to be integral with the rear wall 3A, the shock absorber 10 of the present embodying mode can be easily attached, and the installation space can be reduced. Moreover, the shock absorber 10 of the present embodying mode can be attached onto the attaching object 20 without using attaching tools such as vis and screws; hence, the attaching operation of the shock absorber 10 can be facilitated.

Incidentally, in the embodying mode described above, the attaching section 72 of the shock absorber 10 is inserted in the attaching hole 82 disposed in the attaching object 20. However, it is also possible that by beforehand forming the configuration of the attaching object 20 in a part of a car, the shock absorber 10 is attached directly onto a part (attaching object) of the car. For example, it is also possible that by beforehand forming the attaching hole 82 in a part of a car, the attaching section 72 of the shock absorber 10 is attached directly onto a part (attaching object) of the car.

Incidentally, the embodying modes described above are favorable embodying modes of the present invention and the scope of the present invention is not limited only to these embodying modes, but various changes may be made therein without departing from the gist of the present invention.

This application is based upon and claims the benefit of priority from Japanese patent application No. 2011-083970, filed on Apr. 5, 2011, the disclosure of which is incorporated herein its entirety by reference.

DESCRIPTION OF REFERENCE NUMERALS

10 Shock absorber
2, 8, 9 Hollow section
3 Body
3A Rear wall
3B Upper wall
3C Lower wall
3D Front wall
4 First sidewall
5 Second sidewall
6, 7 Groove-shaped rib
6a, 7a First groove-shaped rib
6b, 7b Second groove-shaped rib
6c, 7c Coupling section
PL Parting line
CP Compression section
11 First attaching pawl
11', 17 Notch section
12 Second attaching pawl
13 Third attaching pawl
14 Central planar section
14' Coupling section
15, 16 Both-end planar section
20 Attaching object
21, 22, 23 Hole
31, 32 Projection
33, 33' Fixing section
41, 42 Attaching hole
43' Fixing hole
51 Axial section
52, 53 Removal preventing section
54, 55 Fixing section
61 Axial hole
62, 63 Attaching hole
64, 65 Fixing hole
71 Axial section
72 Attaching section
81 Axial hole
82 Attaching hole
100 Car

The invention claimed is:

1. A shock absorber, comprising:
a front wall to receive shock;
a rear wall opposing the front wall; and
peripheral walls connecting peripheries of the front wall and the rear wall to each other, wherein
at least two attaching sections configured to attach onto an attaching object is formed to be integral with the rear wall, the at least two attaching sections comprising at least a hollow first attaching section and a solid second attaching section, a body of the shock absorber is formed in a hollow shape and a hollow section of the body is integral with a hollow section of the first attaching section, and
shock received by the front wall is propagated via the rear wall to the attaching object,
wherein a parting line extends along one edge and other one edge of the rear wall, the at least two attaching sections being formed on the parting line, and
the parting line extends with inflection from one edge to other one edge in a longitudinal direction of the rear wall, and
positions of the at least two attaching sections formed on the parting line are different from each other in a transverse direction of the rear wall.

2. The shock absorber in accordance with claim 1, wherein the first attaching section projects farther from the rear wall than the second attaching section.

3. The shock absorber in accordance with claim 2, wherein the second attaching section comprises at least two planar sections, and the at least two planar sections being coupled with each other by a coupling section formed in a thinner section that is thinner than the planar sections.

4. The shock absorber in accordance with claim 1, wherein the second attaching section comprises at least two planar sections, and the at least two planar sections being coupled with each other by a coupling section formed in a thinner section that is thinner than the planar sections.

5. A shock absorber, comprising:
a front wall configured to receive shock;
a rear wall opposing the front wall;
and peripheral walls connecting peripheries of the front wall and the rear wall to each other, wherein at least two attaching sections configured to attach onto an attaching object is formed to be integral with the rear wall, the at least two attaching sections comprising at least a hollow first attaching section that comprises a hollow concaved-shaped notch section depressed toward an inside of the first attaching section, a body of the shock absorber is formed in a hollow shape and a hollow section of the body is integral with a hollow section of the first attaching section, and shock received by the front wall is propagated via the rear wall to the attaching object, wherein a parting line extends along one edge and other one edge of the rear wall, the at least two attaching sections being formed on the parting line, and the parting line extends with inflection from one edge to other one edge in a longitudinal direction of the rear wall, and positions of the at least two attaching sections formed on the parting line are different from each other in a transverse direction of the rear wall.

6. The shock absorber in accordance with claim 5, wherein the notch section opens toward a direction that the attaching section other than the first attaching section is not formed.

7. The shock absorber in accordance with claim 5, wherein the at least two attaching sections comprises a solid second attaching section.

8. The shock absorber in accordance with claim 7, wherein the first attaching section projects farther from the rear wall that the second attaching section.

9. The shock absorber in accordance with claim 7, wherein the second attaching section comprises at least two planar sections, and the at least two planar sections being coupled with each other by a coupling section formed in a thinner section that is thinner than the planar sections.

* * * * *